(12) United States Patent
Kwak et al.

(10) Patent No.: US 12,243,430 B2
(45) Date of Patent: Mar. 4, 2025

(54) METHOD FOR CONTROLLING PLATOONING BY DEVICE IN WIRELESS COMMUNICATION SYSTEM SUPPORTING SIDELINK, AND APPARATUS THEREFOR

(71) Applicant: LG ELECTRONICS INC., Seoul (KR)

(72) Inventors: Minsung Kwak, Seoul (KR); Seungryul Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 292 days.

(21) Appl. No.: 17/634,234

(22) PCT Filed: Sep. 4, 2020

(86) PCT No.: PCT/KR2020/011933
§ 371 (c)(1),
(2) Date: Feb. 9, 2022

(87) PCT Pub. No.: WO2021/045558
PCT Pub. Date: Mar. 11, 2021

(65) Prior Publication Data
US 2022/0284818 A1    Sep. 8, 2022

(30) Foreign Application Priority Data

Sep. 4, 2019   (KR) .................. 10-2019-0109459
Oct. 31, 2019  (KR) .................. 10-2019-0137571

(51) Int. Cl.
*G08G 1/00* (2006.01)
*B60W 60/00* (2020.01)
*H04W 4/46* (2018.01)

(52) U.S. Cl.
CPC ............... *G08G 1/22* (2013.01); *H04W 4/46* (2018.02); *B60W 60/001* (2020.02); *B60W 2554/804* (2020.02); *B60W 2556/45* (2020.02)

(58) Field of Classification Search
CPC .... G08G 1/22; H04W 4/46; B60W 2554/804; B60W 2556/45; B60W 60/001
See application file for complete search history.

(56) References Cited

U.S. PATENT DOCUMENTS 10,424,197 B2 *  9/2019  Narasimha ............. G08G 1/094
11,653,332 B2 *  5/2023  Zeng ....................... H04W 4/40
                                                              370/329

(Continued)

FOREIGN PATENT DOCUMENTS

KR      1020150084125 A      7/2015
KR      1020160029323 A      3/2016

(Continued)

*Primary Examiner* — Dale W Hilgendorf
*Assistant Examiner* — Hana Lee
(74) *Attorney, Agent, or Firm* — BRYAN CAVE LEIGHTON PAISNER LLP

(57) ABSTRACT

Various embodiments provide a method for controlling platooning of a first platooning group by a first device in a wireless communication system, and an apparatus therefor. The method comprises the steps of: receiving, from a second device, information on a second platooning group controlled by the second device; on the basis of the information on the second platooning group, transmitting a merging request message for merging with the second platooning group; and on the basis of merging of a first platooning group with the second platooning group, updating platooning information related to platooning, wherein the platooning information is updated to include first platooning information relating to the existing first platooning group, which corresponds to sub-group information, and second platooning information (Continued)

relating to the merged first platooning group and the second platooning group.

10 Claims, 40 Drawing Sheets

(56) References Cited

U.S. PATENT DOCUMENTS

| | | | |
|---|---|---|---|
| 2013/0080041 A1* | 3/2013 | Kumabe | G05D 1/024 |
| | | | 701/117 |
| 2018/0176750 A1* | 6/2018 | Xu | H04W 4/027 |
| 2018/0188746 A1 | 7/2018 | Lesher et al. | |
| 2020/0021451 A1* | 1/2020 | Pinheiro | H04W 4/40 |
| 2020/0298882 A1* | 9/2020 | Kobayashi | B60W 40/04 |
| 2020/0300649 A1* | 9/2020 | Kim | G08G 1/0968 |
| 2022/0217568 A1* | 7/2022 | Mach | H04W 24/10 |

FOREIGN PATENT DOCUMENTS

| | | |
|---|---|---|
| KR | 1020170143222 A | 12/2017 |
| KR | 1020180093546 A | 8/2018 |

\* cited by examiner

FIG. 6
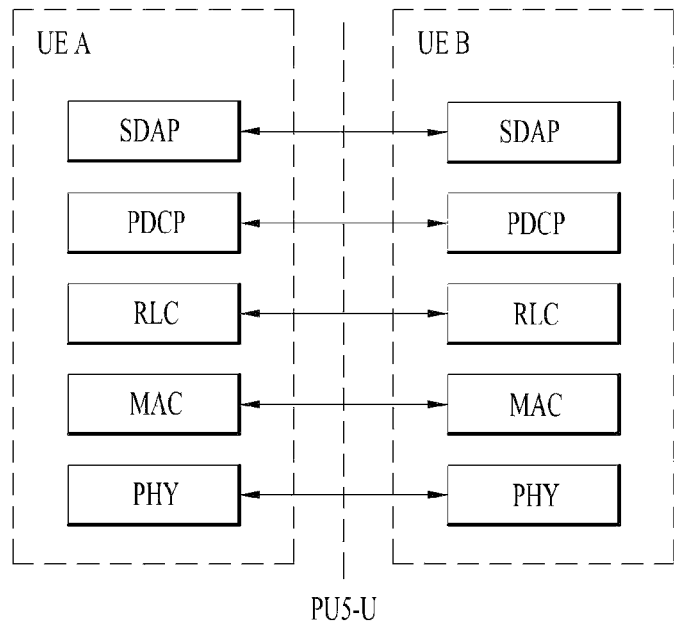
(a)
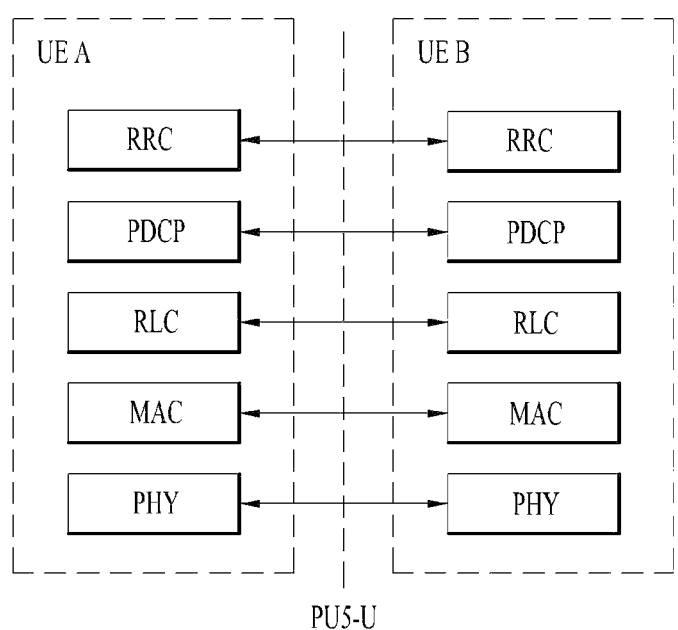
(b)

FIG. 9
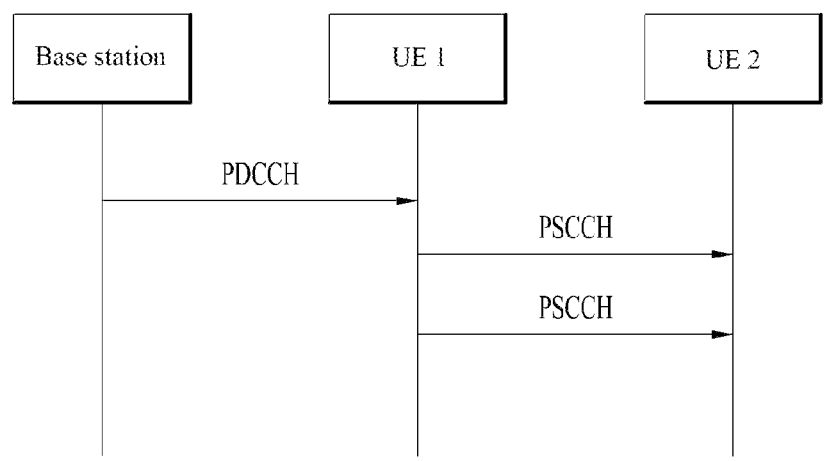
(a)
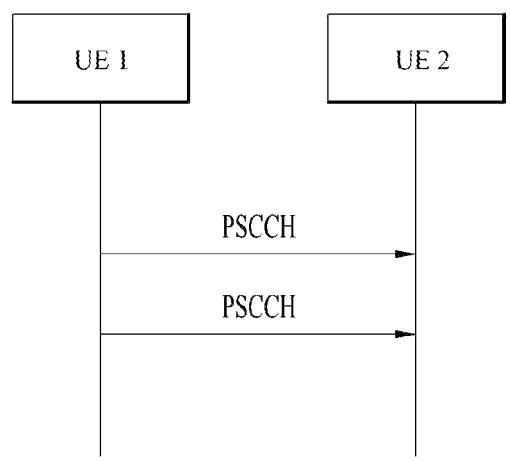
(b)

FIG. 22
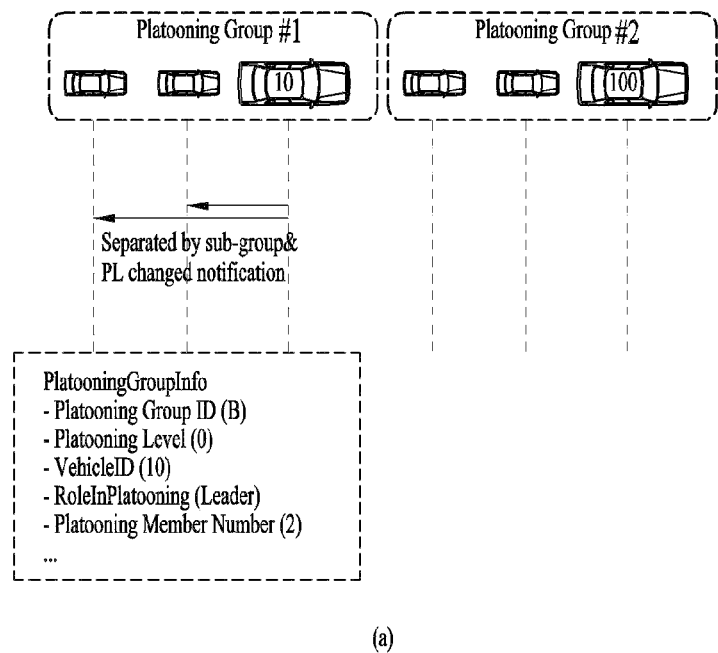
(a)
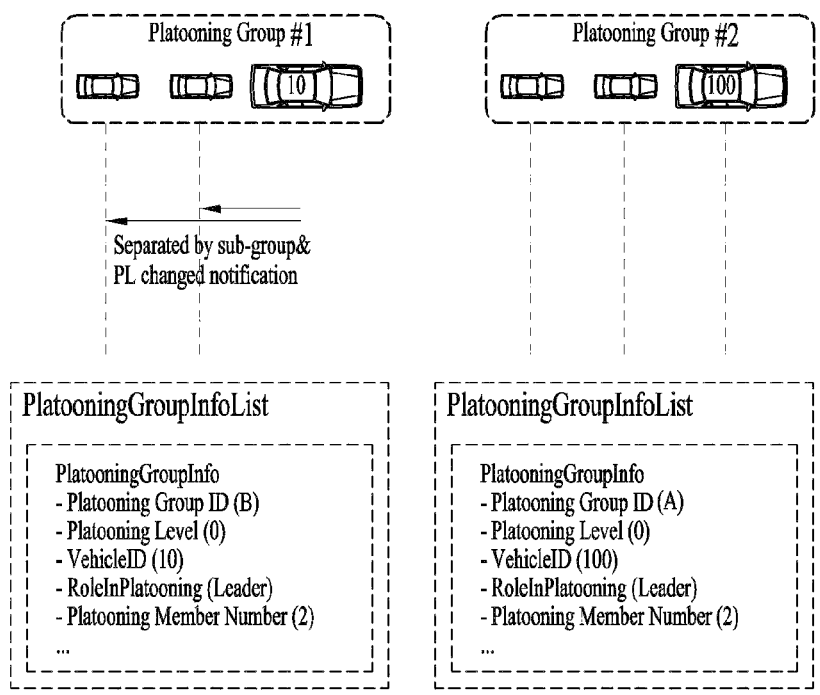
(b)

FIG. 23
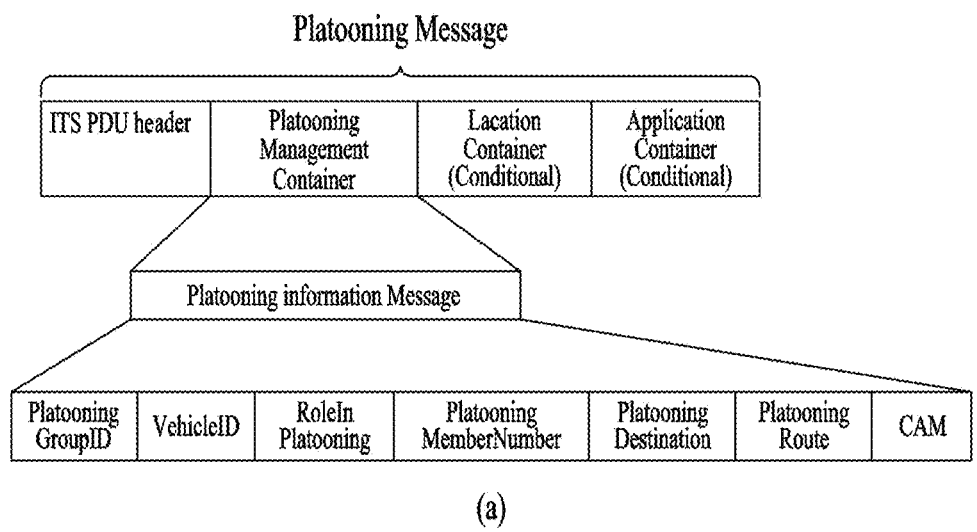
(a)
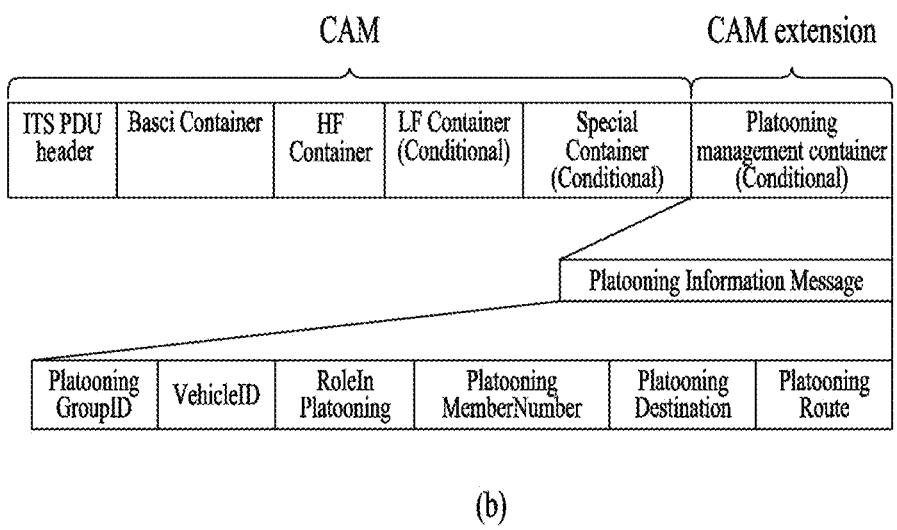
(b)

FIG. 26
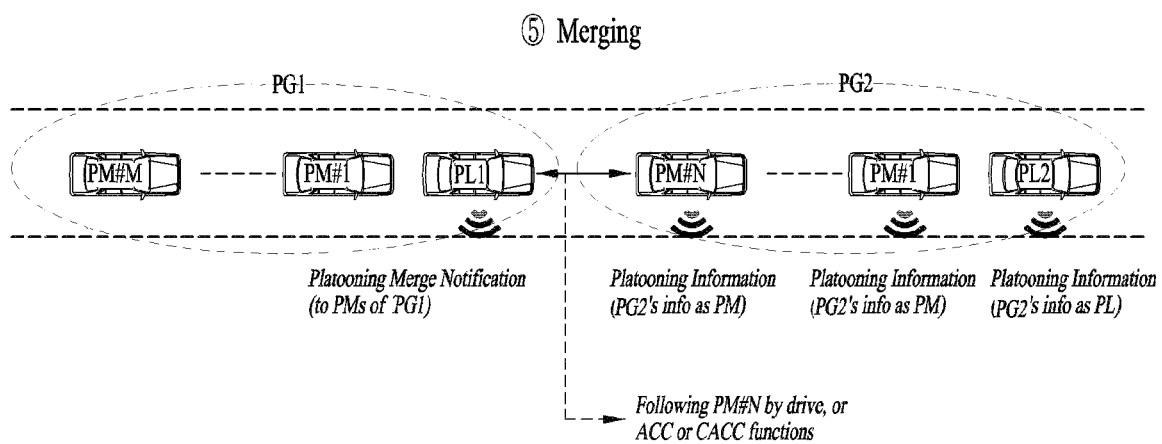
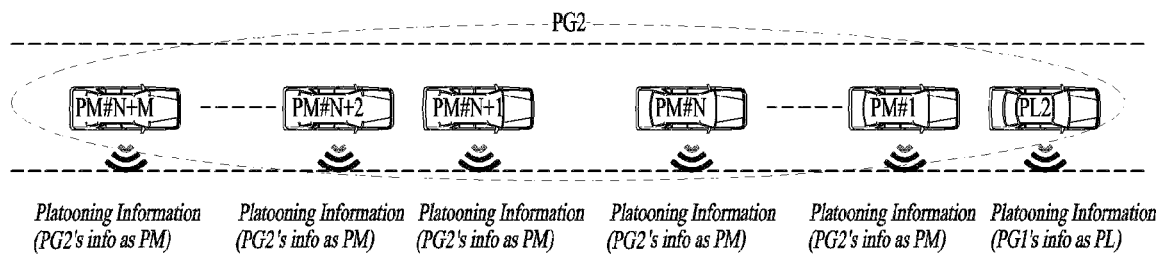

FIG. 27
③ Merge response
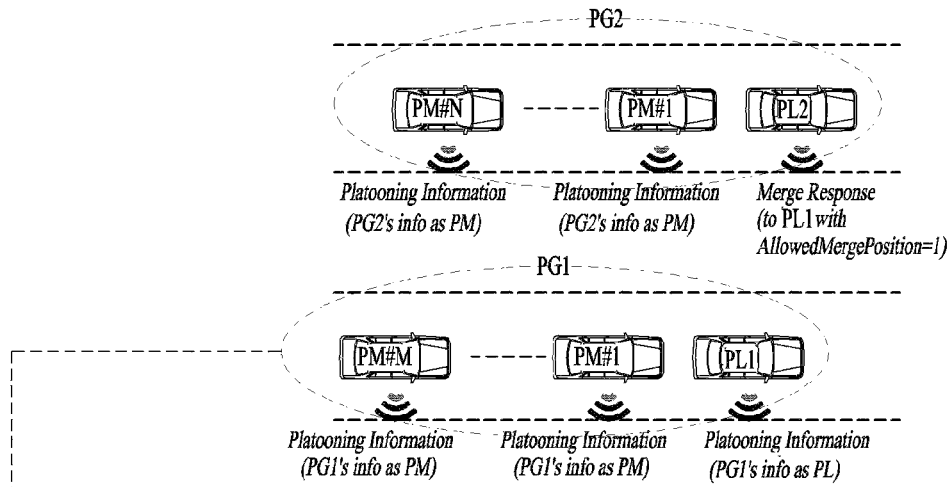
⑤ Merging
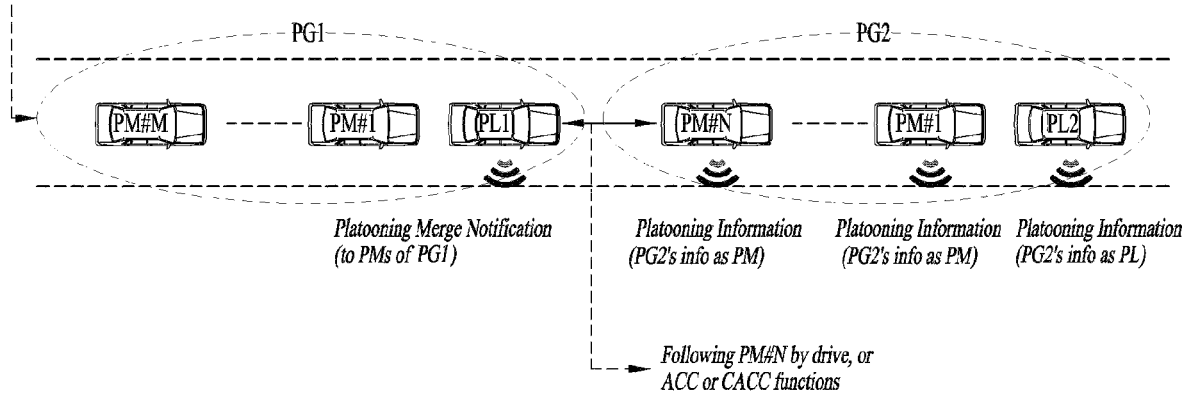
⑥ Merge Completed
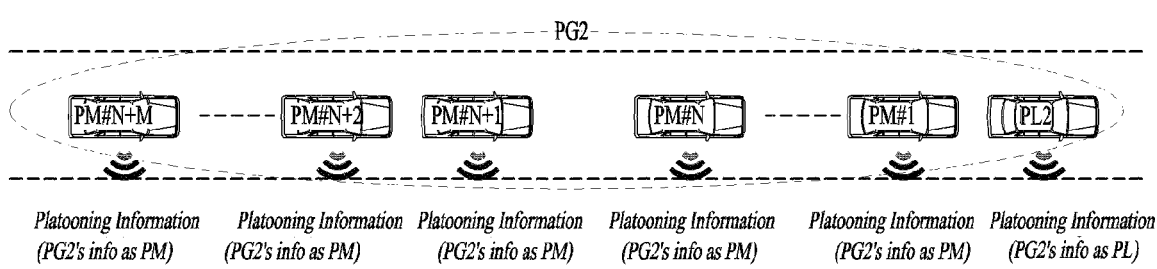

FIG. 28
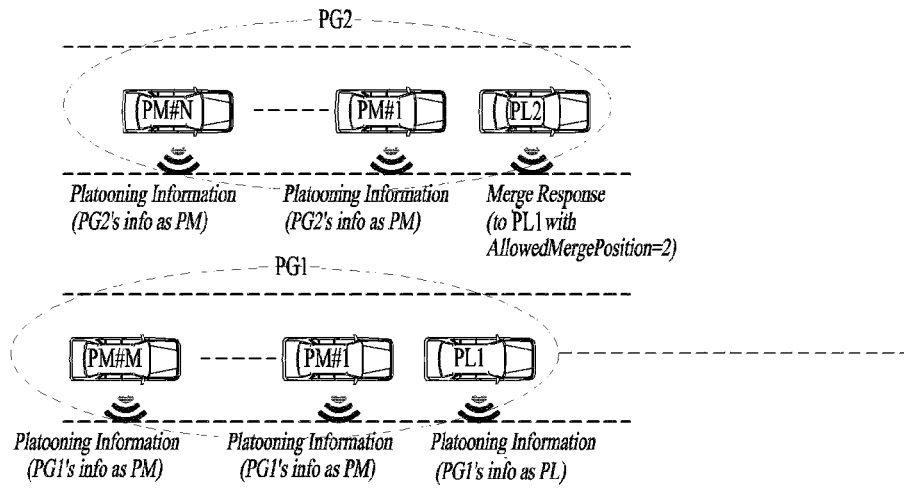
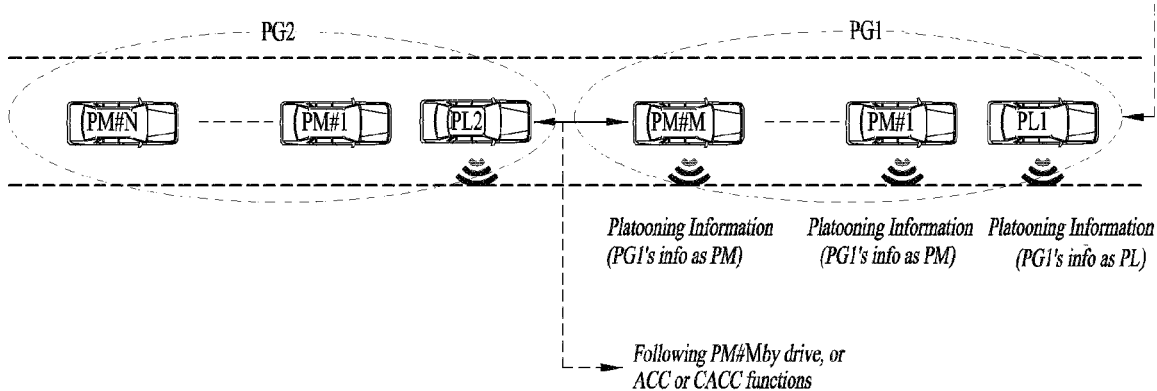
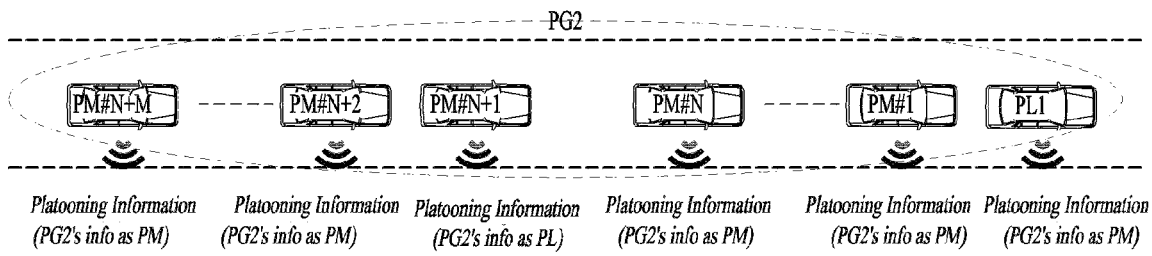

FIG. 29

③ Merge response

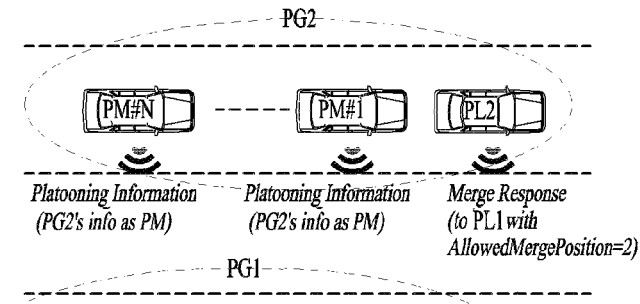

Platooning Information (PG2's info as PM)    Platooning Information (PG2's info as PM)    Merge Response (to PL1 with AllowedMergePosition=2)

Platooning Information (PG1's info as PM)    Platooning Information (PG1's info as PM)    Platooning Information (PG1's info as PL)

⑤ Merging

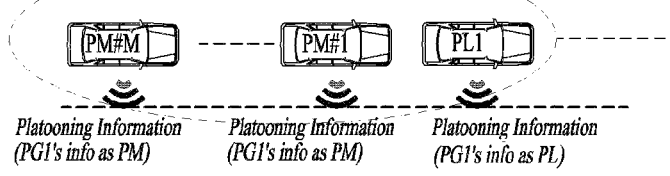

Platooning Information (PG2's info as PM)    Platooning Merge Notification (to PMs of PG1)    Platooning Information (PG2's info as PM)    Platooning Information (PG2's info as PL)

⑥ Merge Completed

Platooning Information (PG2's info as PM)    Platooning Information (PG2's info as PM)    Platooning Information (PG2's info as PM)    Platooning Information (PG2's info as PM)    Platooning Information (PG2's info as PM)    Platooning Information (PG2's info as PL)

FIG. 31
① Concatenation
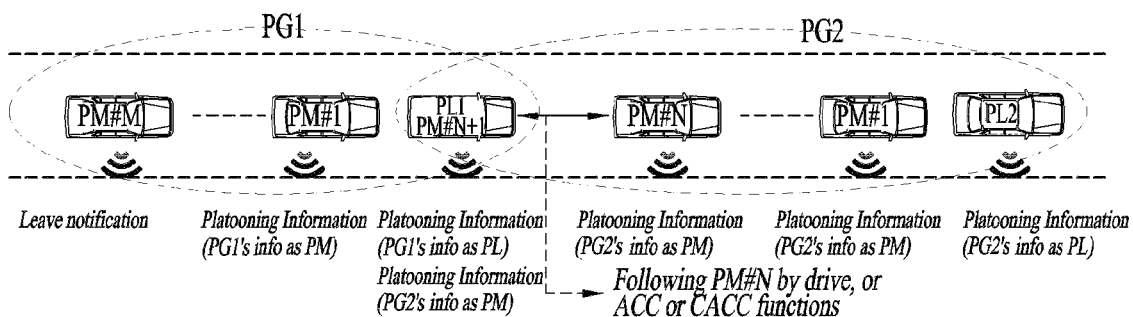
② Merging
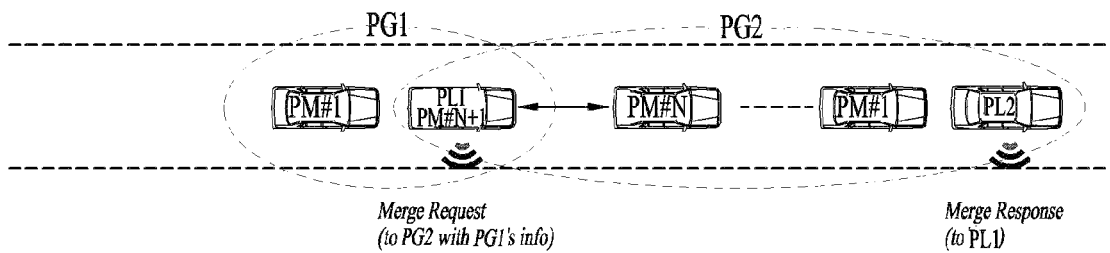
③ Merge Completed
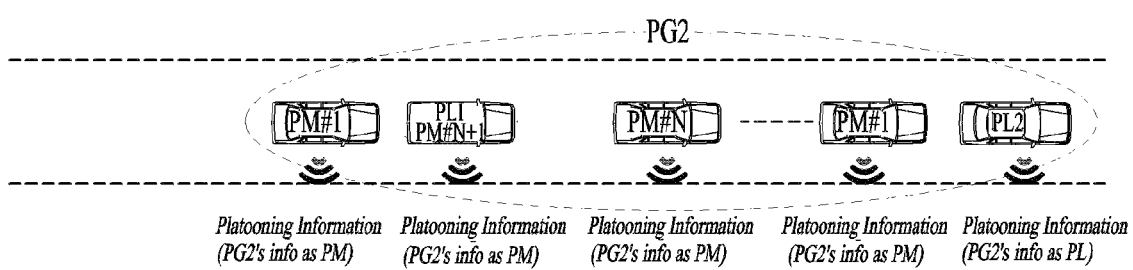

FIG. 32
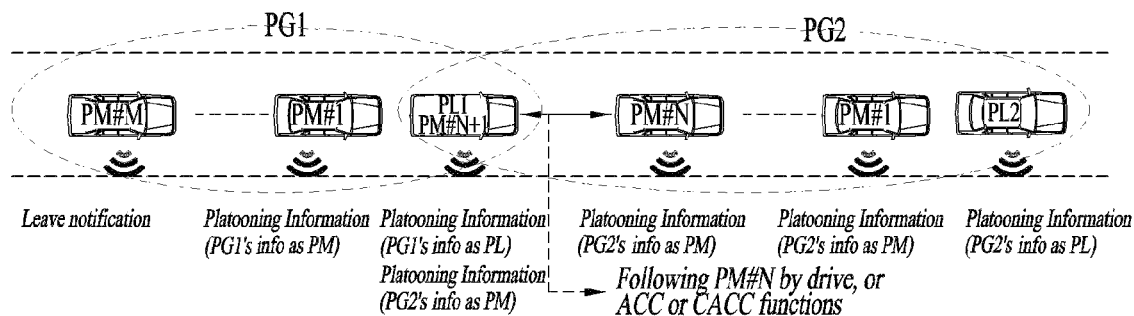
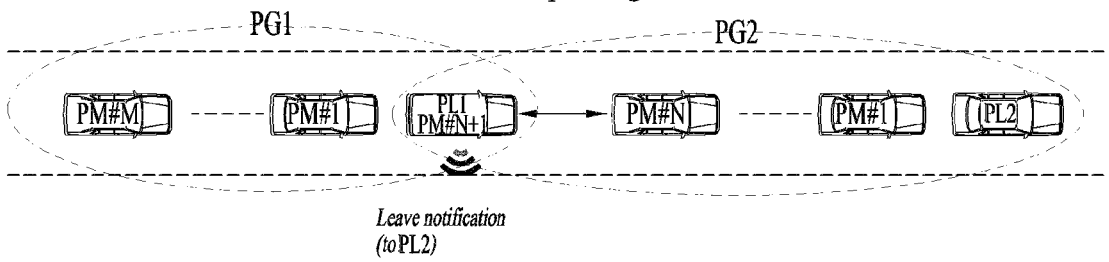
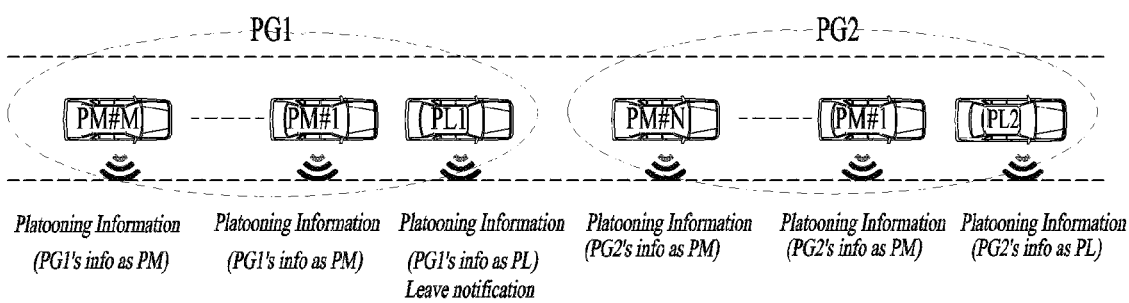

FIG. 35
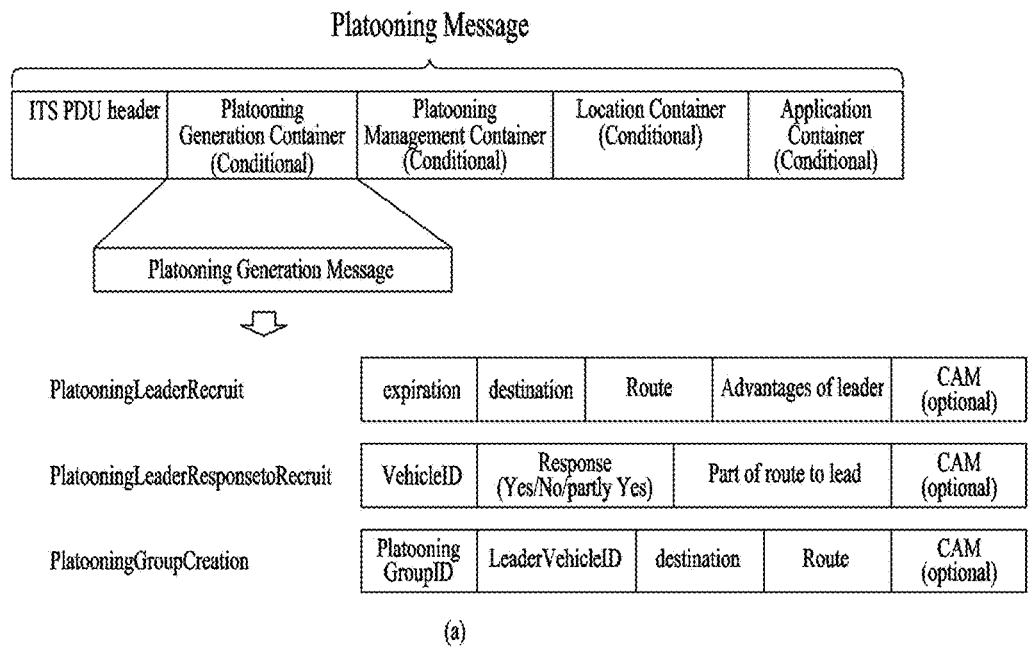
(a)
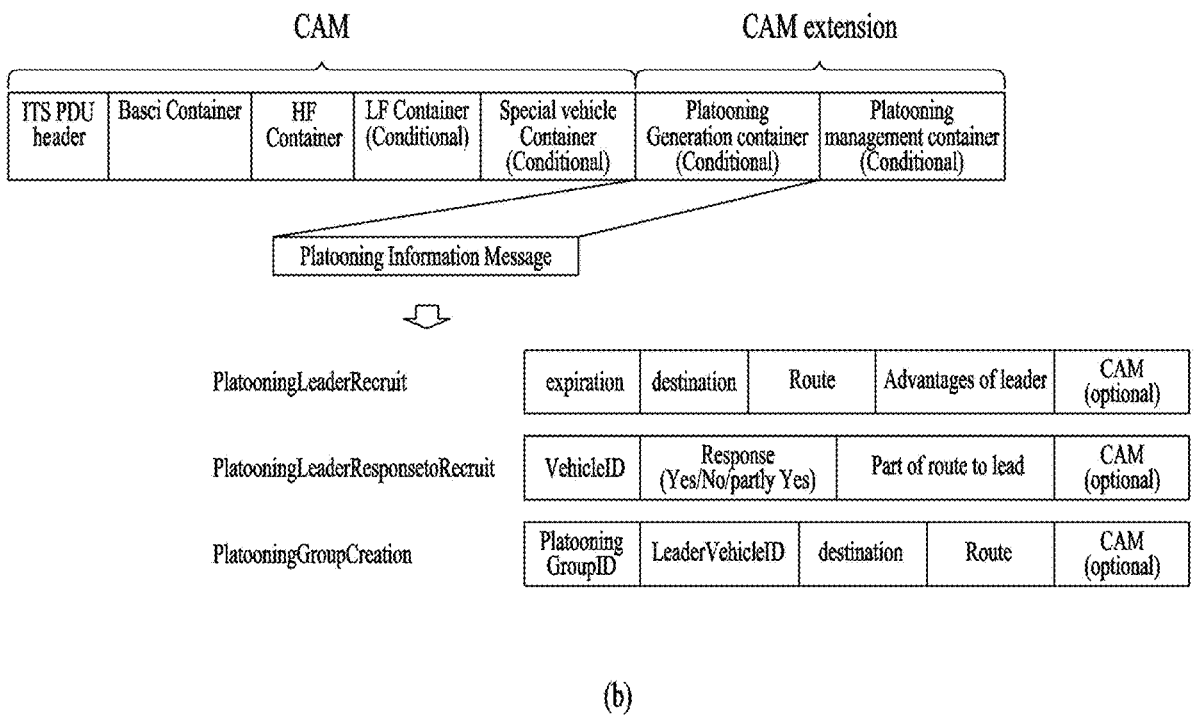
(b)

METHOD FOR CONTROLLING PLATOONING BY DEVICE IN WIRELESS COMMUNICATION SYSTEM SUPPORTING SIDELINK, AND APPARATUS THEREFOR

This application is the National Stage filing under 35 U.S.C. 371 of International Application No. PCT/KR2020/011933, filed on Sep. 4, 2020, which claims the benefit of and priority to Korean Application No. 10-2019-0109459, filed on Sep. 4, 2019 and Korean Application No. 10-2019-0137571, filed on Oct. 31, 2019, the contents of which are all hereby incorporated by reference herein in their entirety.

TECHNICAL FIELD

The present disclosure relates to a method for controlling platooning in which a device performs merging of a platoon group thereof with another platoon group in a wireless communication system supporting sidelink, and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DISCLOSURE

Technical Task

The present disclosure is to address at least the above-mentioned problems and/or disadvantages and to provide a method and apparatus for easily separating an existing platooning group from another platooning group by maintaining and separating platooning information on the existing platooning group as sub-group information through a platooning level even after platooning group merging with the other platooning groups is performed.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solutions

A method for controlling, by a first device, platooning of a first platooning group in a wireless communication system supporting sidelink according to one aspect includes receiving information on a second platooning group controlled by a second device from the second device, transmitting a merge request message for merging with the second platooning group on the basis of the information on the second platooning group, and updating platooning information related to the platooning on the basis of merging of the first platooning group and the second platooning group, wherein the updated platooning information includes first platooning information on the previous first platooning group, which is sub-group information, and second platooning information on the merged first and second platooning groups.

Further, a platooning level different from a platooning level of the second platooning information may be set in the first platooning information.

Further, the first device may notify platooning members included in the first platooning group of the merging or change of a platooning leader by using platooning levels set in the first platooning information and the second platooning information.

Further, the merge request message may be transmitted using a platooning message set to a predefined PlatooningMessageType.

Further, the first device may receive a merge response message for the merge request message from the second device and determine a platooning member to follow from among platooning members belonging to the second platooning group on the basis of mergePosition defined in the merge response message.

Further, when a plurality of values is set in the mergePosition, the first device may determine a platooning member to follow from among the platooning members belonging to the second platooning group on the basis of a communication range of the second device.

Further, the first device may separate the first platooning group from the second platooning group by sending a separation request message to the second device when preset separation conditions are satisfied.

Further, the first device may notify platooning members included in the first platooning group of separation from the second platooning by changing the platooning level of the first platooning information.

Further, the preset separation conditions may include at least one of a case where a movement route related to the second platooning group does not match a movement route related to the first platooning group, a case where the first platooning group deviates from a communication range of the second device, a case where the second device executes a platooning function that is not supported by the first device, and a case where the second device travels at a speed out of a threshold speed set in the first platooning group.

Further, the merge request message may be transmitted through a platooning message including an ITS PDU (Intelligent Transportation System protocol data unit) header, a platooning management field, a location field, and an application field.

Further, the merge request message may be transmitted through an extension field of CAM (Cooperative Awareness Messages) or DENM (Decentralized Environmental Notification Message).

Further, the first device may be determined to serve as a leader of the first platooning group on the basis of a platooning leader recruit message from a platooning management center.

According to another aspect, a method for performing platooning by a third device that is a platooning member of a first platooning group in a wireless communication system supporting sidelink includes transmitting platooning information on the first platooning group, receiving a notification message for notification of merging with a second platooning group from a first device serving as a leader of the first platooning group, and updating the platooning information on the basis of the notification message and transmitting the updated platooning information, wherein the updated platooning information includes first platooning information on the previous first platooning group, which is sub-group information, and second platooning information on the merged first and second platooning groups, and a platooning level different from a platooning level of the second platooning group is set in the first platooning information.

According to another aspect, a first device controlling platooning of a first platooning group in a wireless communication system supporting sidelink includes a radio frequency (RF) transceiver and a processor connected to the RF transceiver, wherein the processor is configured to control the RF transceiver to receive information on a second platooning group controlled by a second device from the second device, to transmit a merge request message for merging with the second platooning group on the basis of the information on the second platooning group, and to update platooning information related to the platooning on the basis of merging of the first platooning group and the second platooning group, wherein the updated platooning information includes first platooning information on the previous first platooning group, which is sub-group information, and second platooning information on the merged first and second platooning groups.

According to another aspect, a chipset controlling platooning of a first platooning group in a wireless communication system supporting sidelink includes at least one processor and at least one memory operably connected to the at least one processor, and when executed, causing the at least one processor to perform an operation, wherein the operation includes receiving information on a second platooning group controlled by a second device from the second device, transmitting a merge request message for merging with the second platooning group on the basis of the information on the second platooning group, and updating platooning information related to the platooning on the basis of merging of the first platooning group and the second platooning group, wherein the updated platooning information includes first platooning information on the previous first platooning group, which is sub-group information, and second platooning information on the merged first and second platooning groups.

Further, the processor may control a driving mode of a device connected to the chipset on the basis of the platooning information.

According to another aspect, there is provided a computer-readable storage medium storing at least one computer program causing at least one processor to perform an operation of controlling platooning of a first platooning group in a wireless communication system supporting sidelink, wherein the operation includes receiving information on a second platooning group controlled by a second device from the second device, transmitting a merge request message for merging with the second platooning group on the basis of the information on the second platooning group, and updating platooning information related to the platooning on the basis of merging of the first platooning group and the second platooning group, wherein the updated platooning information includes first platooning information on the previous first platooning group, which is sub-group information, and second platooning information on the merged first and second platooning groups.

Advantageous Effects

According to various embodiments, it is possible to easily separate an existing platooning group from another platooning group by maintaining and separating platooning information on the existing platooning group as sub-group information through a platooning level even after platooning group merging with the other platooning groups is performed.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 6 illustrates a radio protocol architecture for SL communication.

FIG. 9 illustrates a procedure in which UEs perform V2X or SL communication according to a transmission mode.

FIG. 21 and FIG. 22 are diagrams for describing a process in which the first PG is separated from the second PG according to an embodiment.

FIG. 23 and FIG. 24 are diagrams for describing a packet structure for a platooning message.

FIG. 25 and FIG. 26 are diagrams for describing a process of merging with another platoon group during platooning.

FIG. 27, FIG. 28, and FIG. 29 illustrate a method of performing merging between PGs based on mergePosition included in a merging response message.

FIG. 31 is a diagram for describing a method in which the first PL changes from a concatenated state to a merged state.

FIG. 32 is a diagram for describing a method in which the first PL in a concatenated state is separated from the second PG.

FIG. 35 is a diagram for describing a packet structure of a platoon leader recruitment message.

BEST MODE FOR DISCLOSURE

Figure 1:
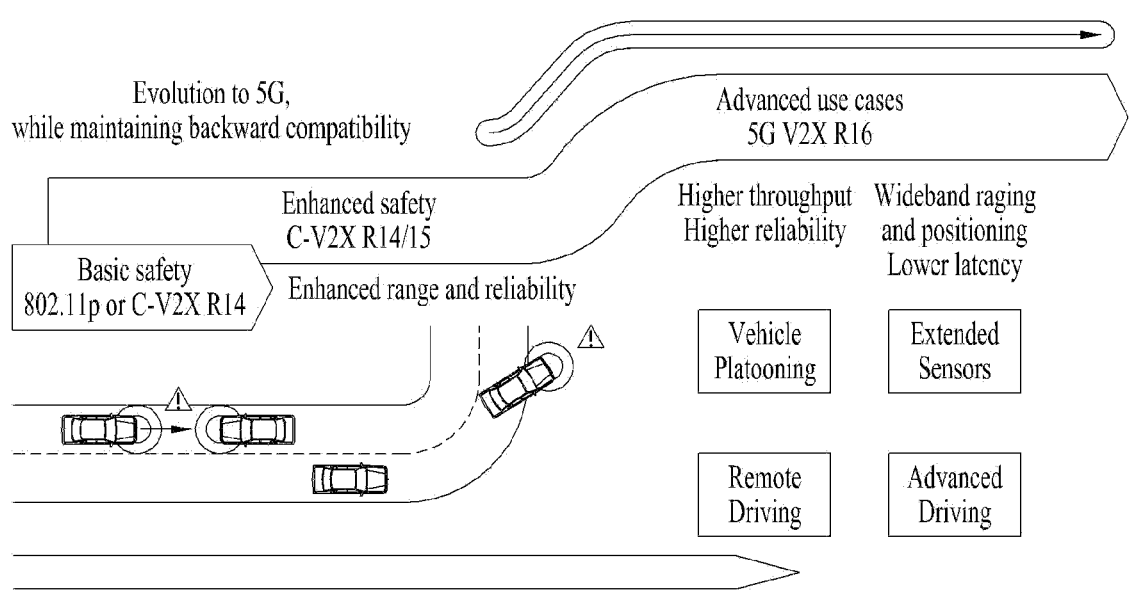
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/ wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto.

Figure 2:
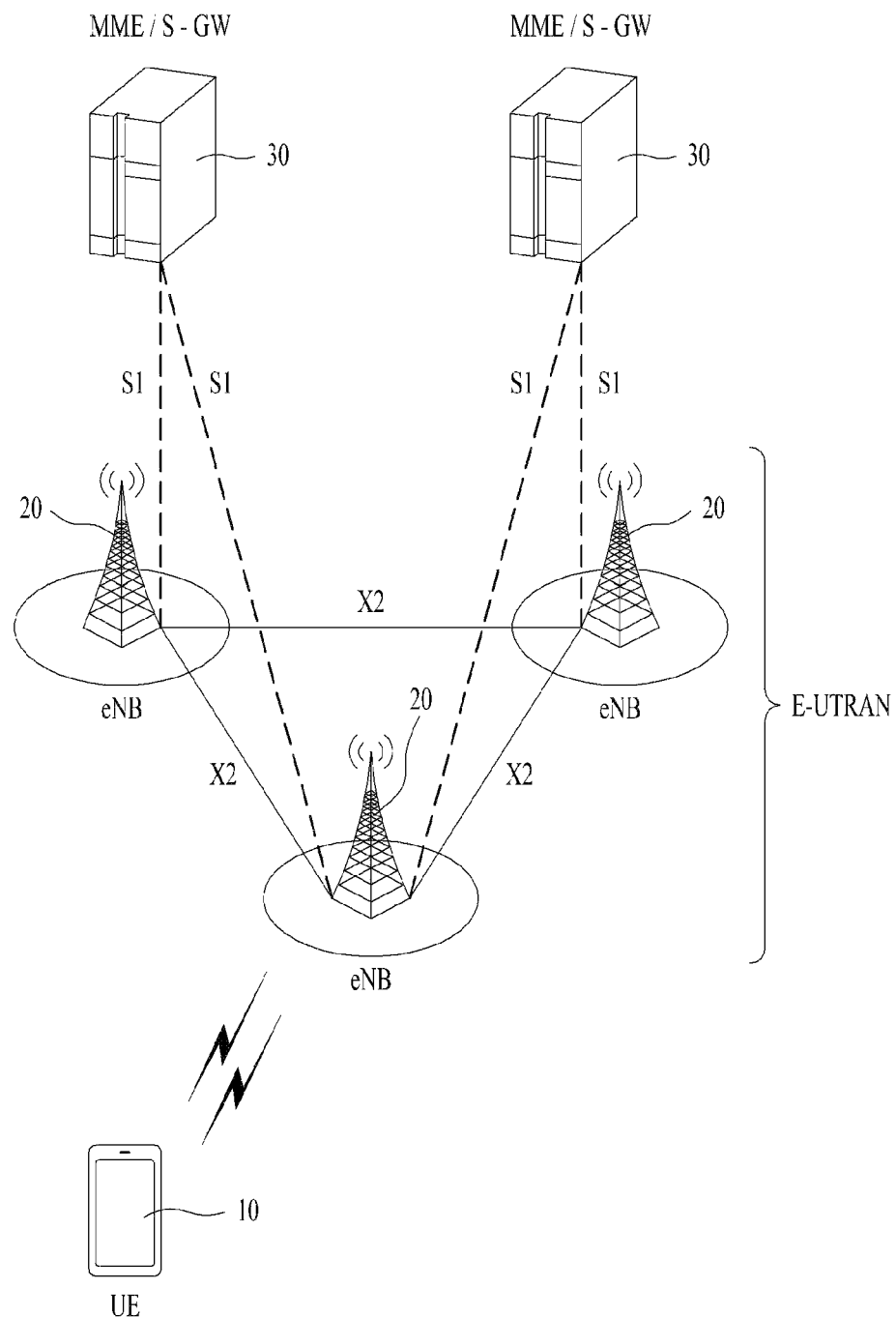
FIG. 2 illustrates the structure of an LTE system to which embodiment(s) are applicable.

FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
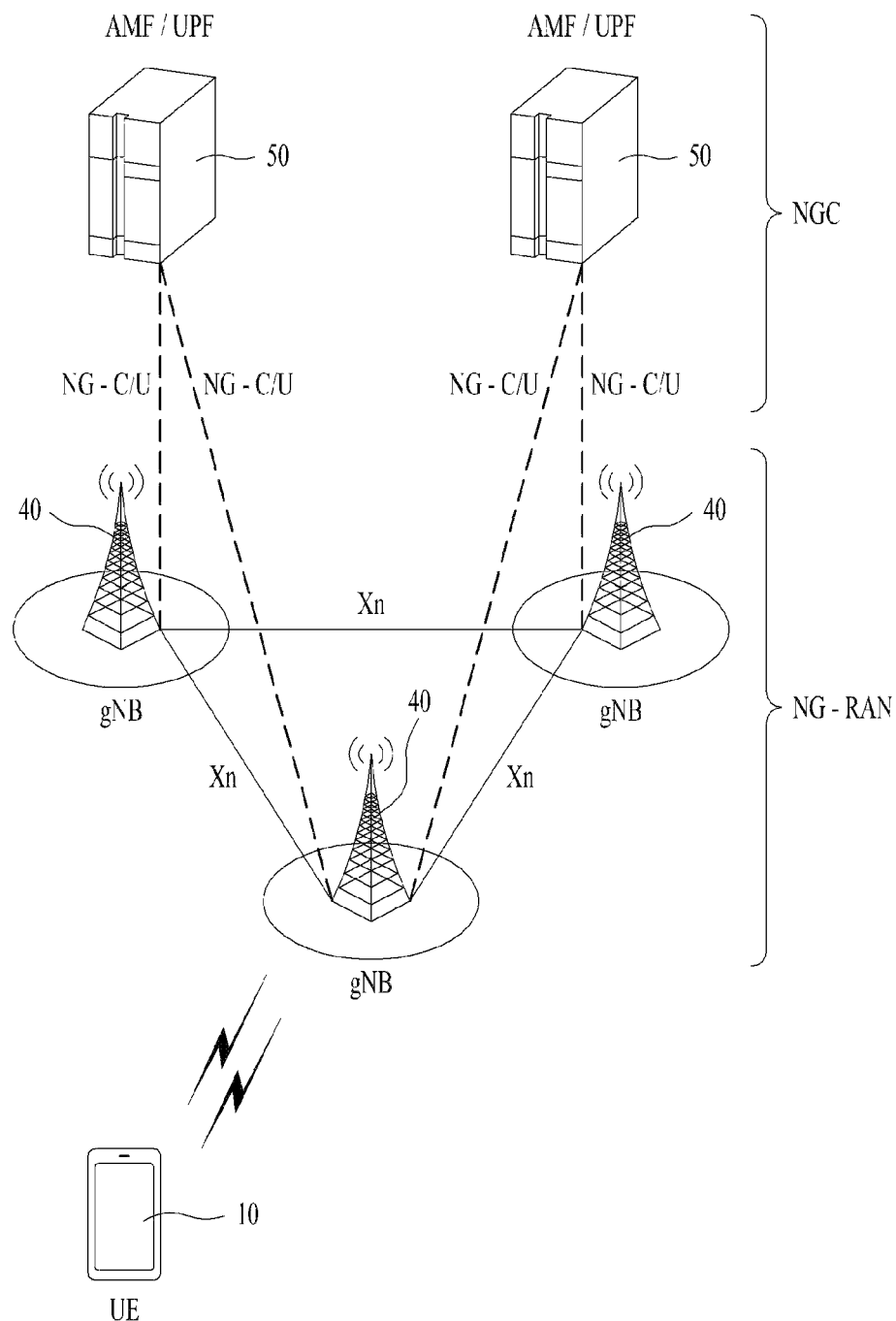
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
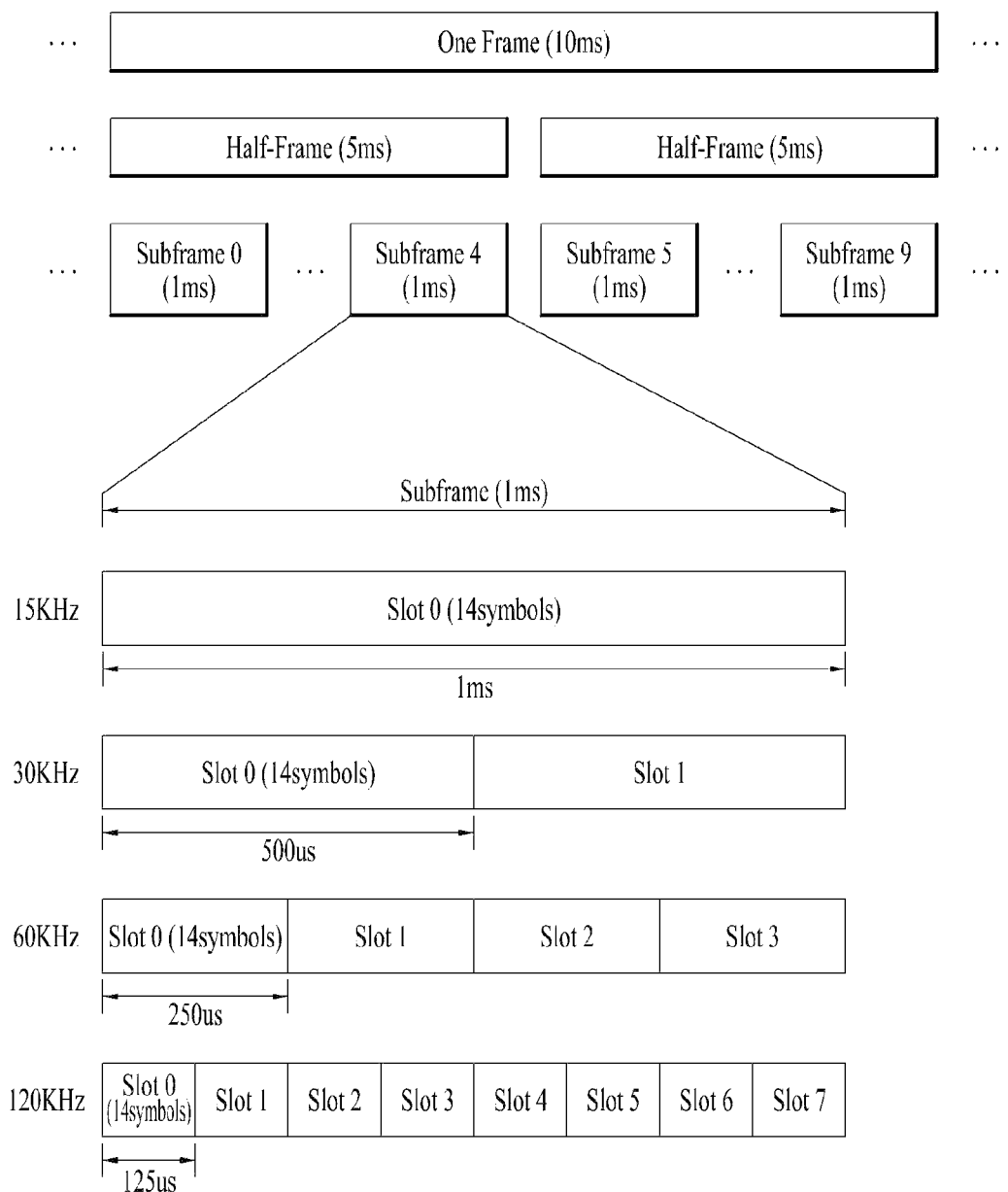
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration µ in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
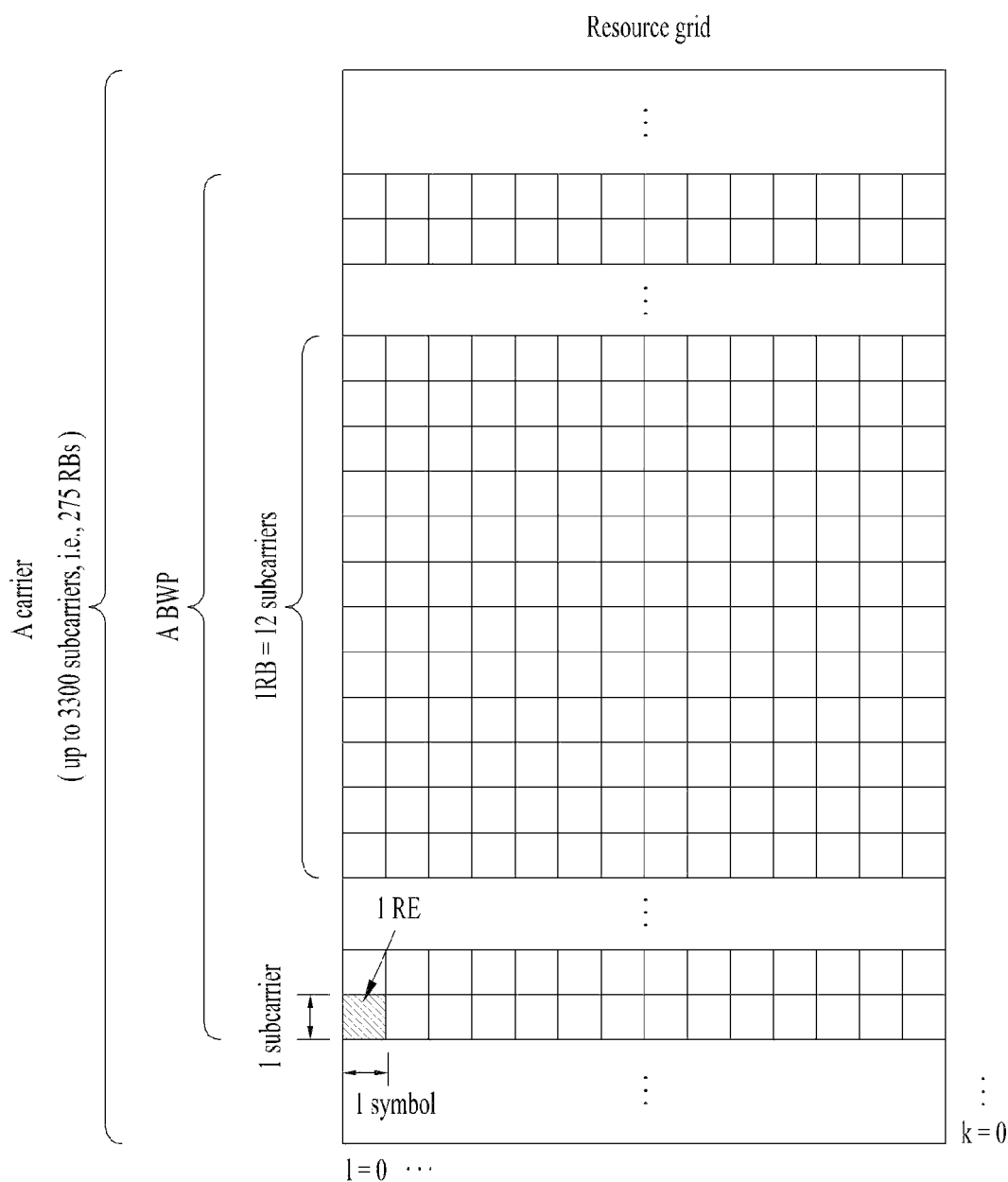
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be shortened. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
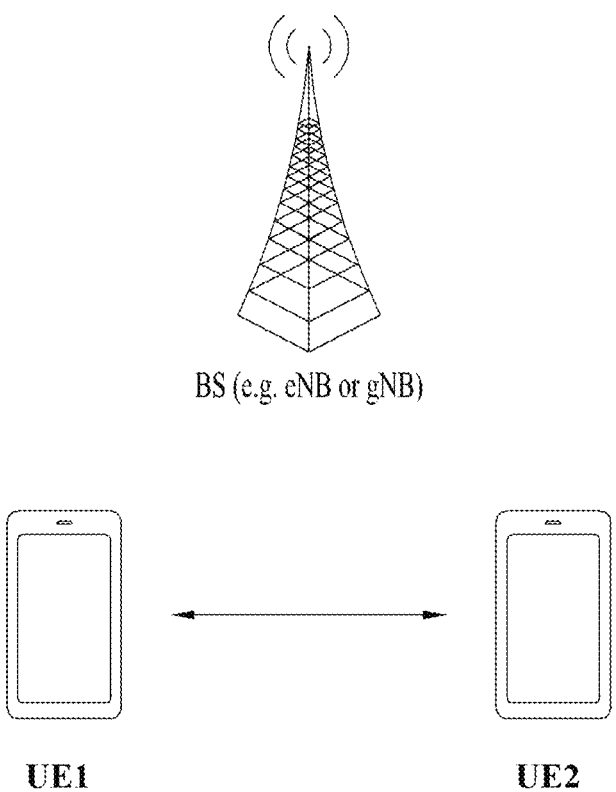
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
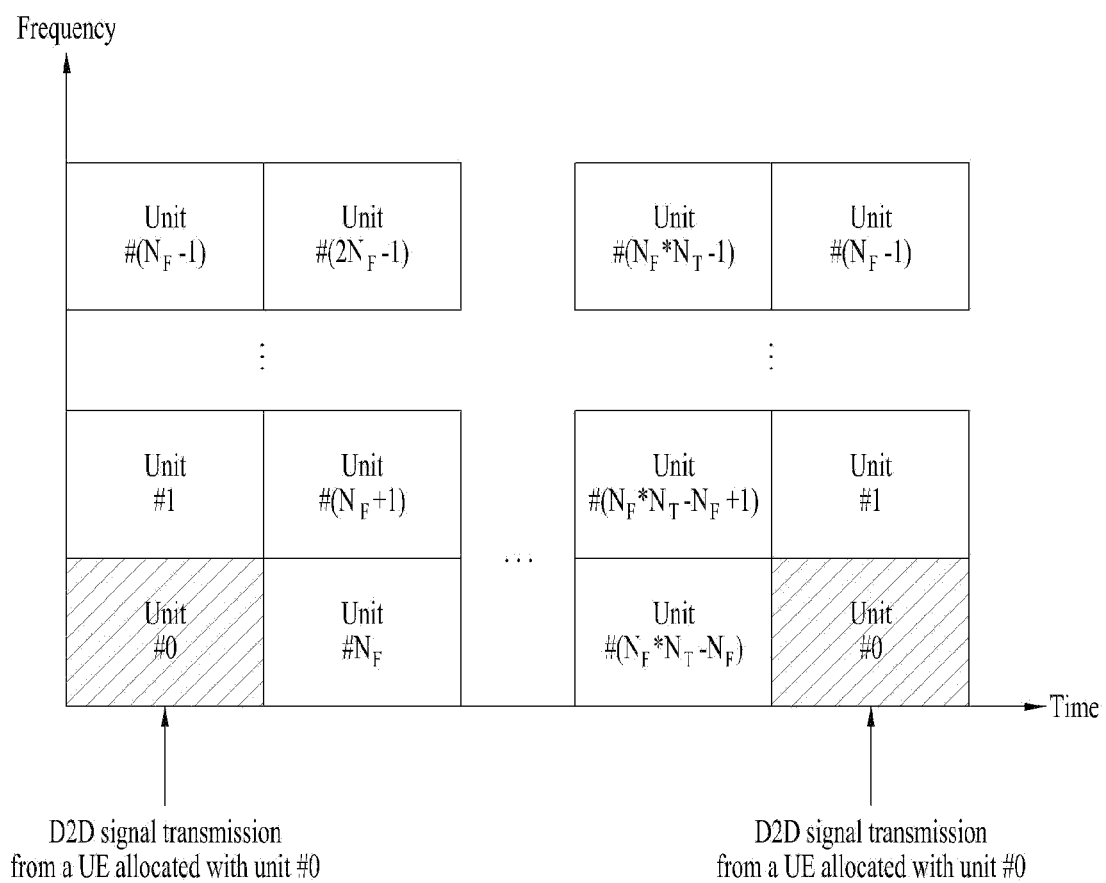
FIG. 8 illustrates resource units for V2X or SL communication.

FIG. 8 illustrates resource units for V2X or SL communication.

Referring to FIG. 8, the frequency resources of a resource pool may be divided into $N_F$ sets, and the time resources of the resource pool may be divided into $N_T$ sets. Accordingly, a total of $N_F*N_T$ resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(a) illustrates a UE operation related to LTE transmission mode 1 or LTE transmission mode 3. Alternatively, for example, FIG. 9-(a) illustrates a UE operation related to NR resource allocation mode 1. For example, LTE transmission mode 1 may be applied to general SL communication, and LTE transmission mode 3 may be applied to V2X communication.

For example, FIG. 9-(b) illustrates a UE operation related to LTE transmission mode 2 or LTE transmission mode 4. Alternatively, for example, FIG. 9-(b) illustrates a UE operation related to NR resource allocation mode 2.

Referring to FIG. 9-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

In case of using a very high frequency such as mmWave, beamforming may be used to overcome pathloss in general. To use beamforming, a best beam pair should be detected from several beam pairs between a Tx end and an Rx end. Such a process may be referred as beam acquisition or beam tracking from the perspective of the Rx end. Particularly, since mmWave uses analog beamforming, a vehicle may need to perform beam sweeping of switching a beam to a different direction in a different time using an antenna array of the vehicle in the course of beam acquisition or beam tracking.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2I), vehicle-to-pedestrian communication (V2P or P2V), and RSU-to-pedestrian communication (I2P or P2I). A vehicle, a BS, an RSU, a pedestrian, etc. as the subjects of vehicle communication are referred to as ITS stations.

Figure 10:
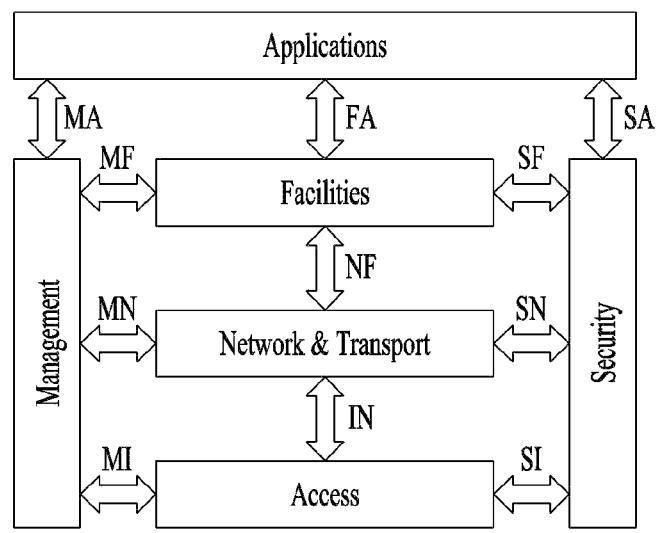
FIG. 10 is a diagram for explaining an ITS station reference architecture.

FIG. 10 is a diagram for explaining an ITS station reference architecture.

Platooning technology forms a platooning group in order to reduce fuel consumption, improve driver convenience, and improve traffic efficiency, minimizes a gap between vehicles within the group, and allows the group to be maintained while following a platooning group leader or a proceeding vehicle.

In the background technology, a group of vehicles needs to be formed for platooning. Therefore, the platooning group needs to be managed by a platooning lead vehicle, but there is no standard technology for generating and managing such a group. Accordingly, formation of a group of arbitrary vehicles, joining a group, leaving a group, merging between groups, and the like are impossible.

The ITS station reference architecture may include an access layer, a network & transport layer, a facilities layer, entities for security and management, and an application layer at the top. Basically, the ITS station reference architecture follows a layered OSI model.

Figure 11:
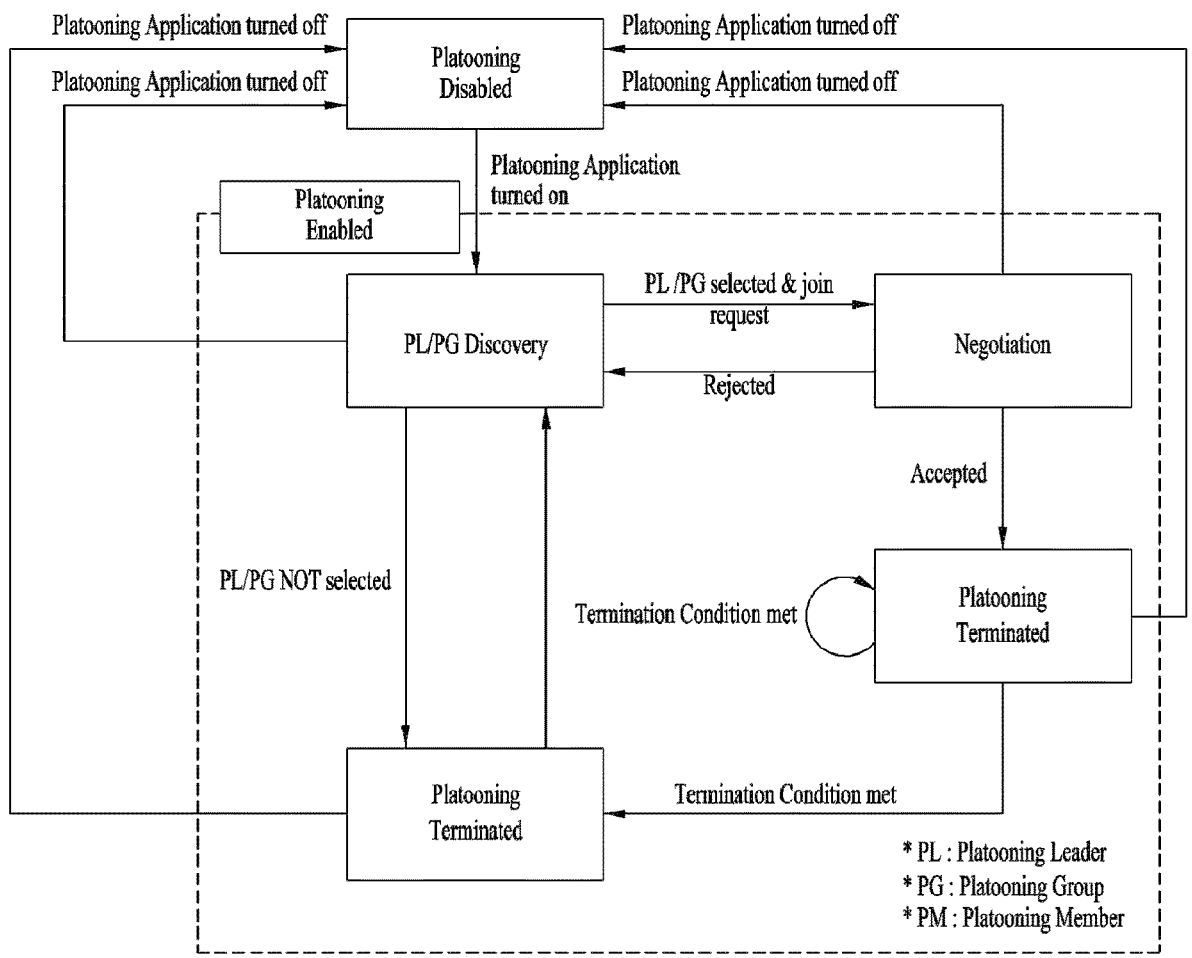
FIG. 11 is a diagram for describing a platooning state transition model.

Specifically, features of the ITS station reference architecture based on the OSI model are illustrated in FIG. 11. The access layer of the ITS station corresponds to OSI layer 1 (physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers. Each layer of the ITS station exchanges data transmitted or received through vehicle communication and additional information for various purposes through an interface. The abbreviations of various interfaces are described below.

MA: Interface between management entity and application layer

MF: Interface between management entity and facilities layer

MN: Interface between management entity and networking & transport layer

MI: Interface between management entity and access layer

FA: Interface between facilities layer and ITS-S applications

NF: Interface between networking & transport layer and facilities layer

IN: Interface between access layer and networking & transport layer

SA: Interface between security entity and ITS-S applications

SF: Interface between security entity and facilities layer

SN: Interface between security entity and networking & transport layer

SI: Interface between security entity and access layer

With respect to platooning, the application layer may include a platooning application, which is a high layer entity for enabling a platooning service.

In addition, the facility layer may include V2V messaging which is a facilities layer entity for V2V message exchange, I2V messaging which is a facilities layer entity for I2V message exchange, vehicle & vehicle & sensing information collecting which is a facilities layer entity for information collection through information and sensors of a vehicle, V2X messaging, a platooning state for the platooning service based on information of vehicle information collecting entities, platooning group management, platooning management which is a facilities layer entity for setting a target velocity, vehicle controlling which is a facilities layer entity (e.g., group management, velocity control) for controlling vehicles, and/or human-machine interface (HMI) support which is a facilities layer entity for delivering various notifications (to a driver) to an HMI module.

FIG. 11 is a diagram for describing a platooning state transition model.

Regarding platooning, hereinafter, a platooning group in which platooning is performed is defined as a PG, a platooning member within the platooning group is defined as a PM, and a leader controlling platooning of the platoon group is defined as a PL for convenience of description.

Referring to FIG. 11, the platooning state transition model may discover a PL/PG when platooning is possible, activate platooning (or join platooning) by selecting a PL/PG and/or requesting joining, and continuously monitor the reason for termination of platooning. Alternatively, when the above-described application related to platooning is terminated (or turned off), platooning may be disabled.

Hereinafter, PG may be defined as a platooning group in which platooning is performed, PL may be defined as a leader vehicle or an ITS station that leads platooning within a platooning group, and PM may be defined as a platooning member that performs platooning on the basis of a control signal or a control message of the PL within the platooning group.

Termination conditions for termination of platooning of the PM may include a case in which a PM leaves the PG (when the PM leaves the PG to which the PM belonged for the purpose of changing the PG, or the like), a case in which the PL dissolves the PG (when the PL dissolve the PG to which the PM belonged), a case of lane change (when lane change is performed and the PM does not have a function of platooning with lane change), a case of moving to an unwanted route (when the PL moves to a route that the PM does not want), a misbehavior case (when the PL does not conform to a traffic signal or a speed limit), and/or a case in which connection is lost (when a V2V signal of the PL can no longer be received).

Termination conditions for termination of platooning in the PL may include a case in which all PMs leave the PG, a case in which the PL dissolves the PG, and/or a case in which V2V signals of all PMs can no longer be received (connection lost).

Joining Platooning Group

Figure 12:
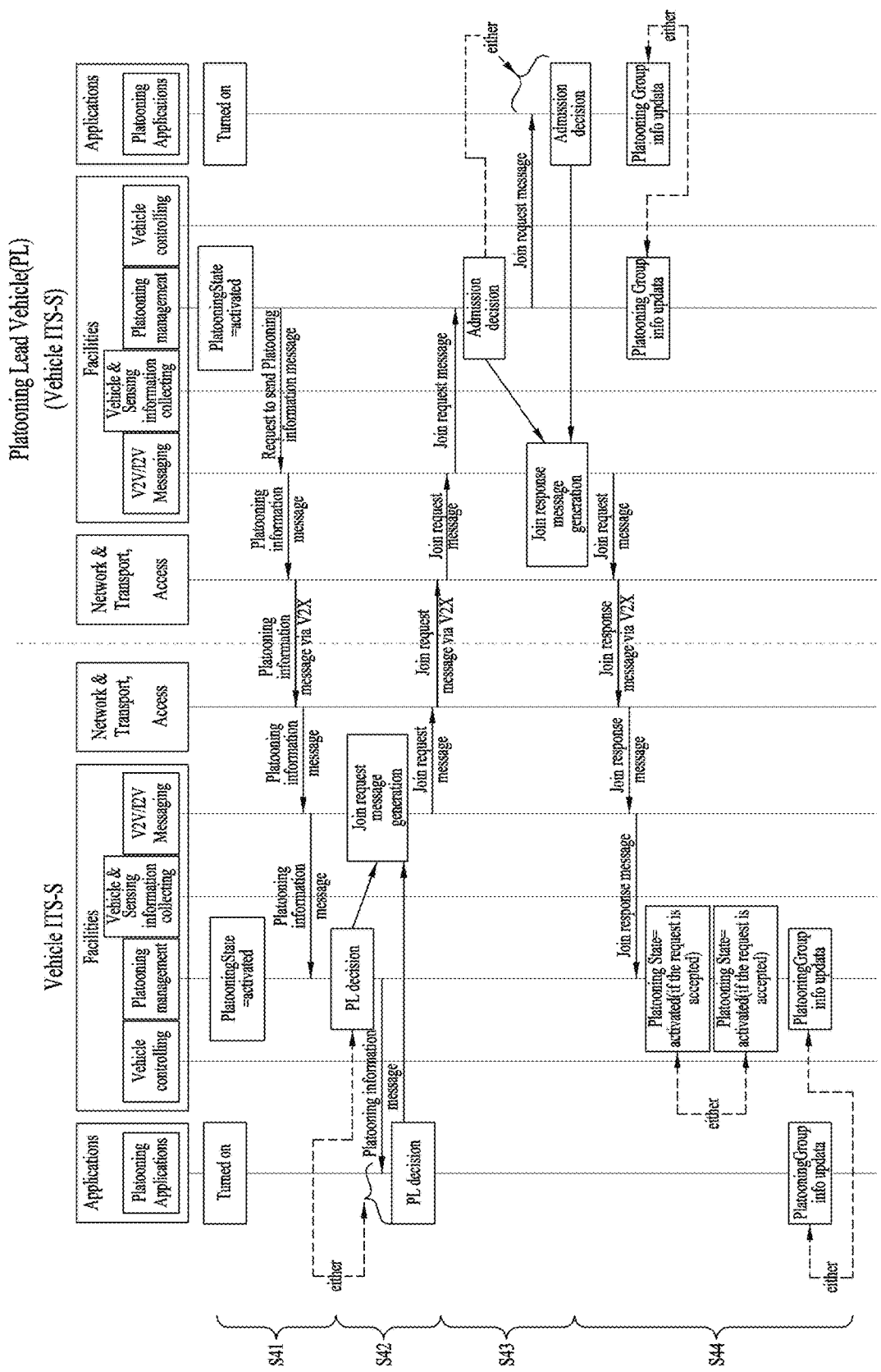
FIG. 12 is a diagram for describing a method for a vehicle to participate in a platoon.

FIG. 12 is a diagram for describing a method for a vehicle to join a platoon.

Referring to FIG. 12, in a flow when a vehicle (i.e., non-PM) that does not belong to a platooning group joins a PG, a PL or the PG may be discovered in a platooning state and a platooning information message transmitted by the PL may be received through the discovery (S41). The vehicle may determine whether to join the PL or the PG based on the platooning information message, and at the time of joining, may generate a joining request message and transmit the same to the PL (S42). In this case, the vehicle may receive a response message to the joining request message from the PL (S43). The vehicle may activate the platooning state when the response message includes approval of joining and may additionally perform the discovery process when the response message includes rejection of joining (S44).

Messages used in the join process can be defined as follows.

1. Platooning Information Message

The platooning information message may be periodically broadcast according to determination of a PL, and the repeated transmission interval may also be adjusted according to determination of the PL. Based on this message, a vehicle may obtain information about a platooning group and determine whether to join the platooning group. When information on the platooning group is changed, the message also needs to be changed and broadcast to reflect details of the change. Although the message is basically broadcast by the PL, a PM may also allow the message to be broadcast such that the platooning group information is broadcast more frequently or to a wider area. Further, when a vehicle joins or merges with a PG, a PM belonging to the PG needs to be confirmed to follow one PM. Therefore, the message must be periodically broadcast by the PM as well.

The platooning information message may be configured to include a CAM in order to transmit information such as a position or the like, or may be configured to include some of information on the CAM (position, etc.). When the platooning information message is transmitted as a part of the CAM instead of being transmitted as an independent message, it is not necessary for the message to include the CAM or some information of the CAM.

PlatooningGroupInfo included in the specific platooning information message may be configured as shown in Table 5.

TABLE 5

| Descriptive Name | PlatooningGroupInfo |
|---|---|
| Identifier | DataType_xxx |
| ASN.1 representation | PlatooningGroupInfo ::= SEQUENCE { PlatooningGroupID, VehicleID RoleInPlatooning, PlatooningMemberNumber, PlatooningDestination, PlatooningRoute, CAM optional . . . } |
| Definition | This DF (Data Frame) informs information about the PG associated with the message sender. |
| Unit | N/A |

PlatooningGroupID in the PlatooningGroupInfo may be assigned by a platooning group leader (PL) as shown in Table 6 and may be determined as an integer type random number, BIT STRING, or OCTET STRING type PL MAC address (MAC address) value.

TABLE 6

| Descriptive Name | PlatooningGroupID |
|---|---|
| Identifier | DataType_xxx |
| ASN.1 representation | PlatooningGroupID ::= INTEGER(0 . . . 1000) or PlatooningGroupID ::= BIT STRING (64) or OCTET STRING (8) |
| Definition | This DE (Data Element) identifies the Platooning Group. |
| Unit | N/A |

VehicleID is an ID of a message sender and may be a MAC address or a GeoNetworking address, as shown in Table 7. When PlatooningGroupID is the MAC address or GeoNetworking address value of the platooning group leader, and the message sender is the platooning group leader, VehicleID may not be used in PlatooningGroupInfo.

TABLE 7

| Descriptive Name | VehicleID |
|---|---|
| Identifier | DataType_xxx |
| ASN.1 representation | VehicleID ::= BIT STRING (64) or OCTET STRING (8) |
| Definition | This DE (Data Element) identifies the message sender. |
| Unit | N/A |

In addition, the platooning group information may further include details shown in Tables 8 to 11.

TABLE 8

| Descriptive Name | RoleInPlatooning |
|---|---|
| Identifier | DataType_xxx |
| ASN.1 representation | RoleInPlatooning::= INTEGER(0 . . . 10), or BOOLEAN |
| Definition | This DE (Data Element) indicates the role of the message sender in its PG. For integer, "1" means "platooning group leader" and "2" means "platooning group member". For Boolean, "1" means "platooning group leader" and "0" means "platooning group member". |
| Unit | N/A |

In the case of a platooning group leader, RoleInPlatooning=1 is applied.

TABLE 9

| | |
|---|---|
| Descriptive Name | PlatooningMemberNumber |
| Identifier | DataType_xxx |
| ASN.1 representation | PlatooningMemberNumber ::= INTEGER(0 . . . 1000) |
| Definition | This DE (Data Element) indicates the current number of platooning group members. |
| Unit | N/A |

TABLE 10

| | |
|---|---|
| Descriptive Name | PlatooningDestination |
| Identifier | DataType_xxx |
| ASN.1 representation | PlatooningDestination ::= SEQUENCE { DestinationLatitude Latitude, DestinationLongitude Longitude, DestinationAltitude Altitude } |
| Definition | This DF (Data Frame) indicates the geographical position of the destination of the PG. |
| Unit | N/A |

TABLE 11

| | |
|---|---|
| Descriptive Name | PlatooningRoute |
| Identifier | DataType_xxx |
| ASN.1 representation | PlatooningRoute ::= SEQUENCE (SIZE(1 . . . 1000)} of PlatooningDestination |
| Definition | This DF (Data Frame) indicates one or more geographical positions of the route of the PG. |
| Unit | N/A |

PlatooningRoute in Table 11 indicates the position of at least one intermediate point through which the PG passes to reach a final destination. Depending on implementation of the PL, a plurality of intermediate point positions may be represented by PlatooningRoute and broadcast through a platooning information message. This information can help a vehicle ITS-S determine whether to join the PG. If the PG changes the route before reaching the final destination, this PlatooningRoute value needs to be changed.

2-1. Join Request Message—First Option

The join request message may be configured as shown in Tables 12 to 14.

TABLE 12

| | |
|---|---|
| Descriptive Name | PlatooningMessage |
| Identifier | DataType_xxx |
| ASN.1 representation | PlatooningMessage ::= SEQUENCE { VehicleID VehicleID, PlatooningGroupID PlatooningGroupID, PlatooningMessageType PlatooningMessageType, VehicleFunctions, CAM optional, . . . } |
| Definition | This DF (Data Frame) conveys various types of messages about platooning. |
| Unit | N/A |

Here, VehicleID is the ID of a request message sender, and PlatooningGroupID is the ID of a PG that the request message sender wants to join. A cooperative awareness message (CAM) may be included in order to deliver basic information of a vehicle that sends the message.

TABLE 13

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "1" means "request to join the platooning group". |
| Unit | N/A |

In the case of the join request message, PlatooningMessageType of 1 is applied

TABLE 14

| | |
|---|---|
| Descriptive Name | VehicleFunctions |
| Identifier | DataType_xxx |
| ASN.1 representation | VehicleFunctions ::= BIT STRING { LaneKeepingFunction (0), LaneChangeAssistanceFunction (1), BrakingAssistanceFunction (2), CollisionAvoidanceFunction (3), AdaptiveCruiseControlFunction (4), CooperativeAdaptiveCruiseControlFunction (5), . . . } |
| Definition | This DE (Data Element) indicates the available functions of the vehicle sending the message. Each bit shall be set to 1 if the corresponding function is supported. |
| Unit | N/A |

The PL may determine whether to allow the vehicle that has transmitted the join request message to join the PG on the basis of vehicle function information (VehicleFunctions) included in the join request message.

2-2. Join Request Message—Second Option

The join request message may be configured as shown in Tables 15 and 16 below.

TABLE 15

| | |
|---|---|
| Descriptive Name | PlatooningJoinRequest |
| Identifier | DataType_xxx |
| ASN.1 representation | PlatooningJoinRequest ::= SEQUENCE { MessageName, VehicleID, PlatooningGroupID, VehicleFunctions, CAM optional, . . . } |
| Definition | This DF (Data Frame) conveys a message requesting to join the platooning group. |
| Unit | N/A |

TABLE 16

| | |
|---|---|
| Descriptive Name | MessageName |
| Identifier | DataType_xxx |
| ASN.1 representation | MessageName ::= INTEGER(0 . . . 100) |
| Definition | This DE (Data Element) indicates the name of message. |
| Unit | N/A |

In the case of the second option (Option #2), a field indicating a message name is required because it does not have the same format for all messages, but there may be one or more other messages having the same format, and the role of the field is platooning message type in Table 13. In this case, MessageName=1 may be configured.

VehicleID in PlatooningJoinRequest is the ID of a request message sender, and PlatooningGroupID is the ID of a PG that the request message sender wants to join.

3-1. Join Response Message—First Option

According to the first option, the join response message may be configured as shown in Tables 17 and 18 below.

TABLE 17

| | |
|---|---|
| Descriptive Name | PlatooningMessage |
| Identifier | DataType_xxx |
| ASN.1 representation | PlatooningMessage ::= SEQUENCE { <br> VehicleID, <br> PlatooningGroupID, <br> PlatooningMessageType, <br> VehicleFunctions optional, <br> CAM optional, <br> . . . <br> } |
| Definition | This DF (Data Frame) conveys various types of messages about platooning. |
| Unit | N/A |

VehicleID is the ID of a join response message sender, and PlatooningGroupID is the ID of a PG to which the response message sender belongs. In the case of the response message, VehicleFunctions of Table 14 may be unnecessary.

TABLE 18

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "1" means "request to join the platooning group", "2" means "response to a request to join the platooning group" |
| Unit | N/A |

In the join response message, PlatooningMessageType=2 can be applied.

3-2. Join Response Message—Second Option

According to the second option, the join response message may be configured as shown in Table 19 below.

TABLE 19

| | |
|---|---|
| Descriptive Name | PlatooningJoinResponse |
| Identifier | DataType_xxx |
| ASN.1 representation | PlatooningJoinResponse ::= SEQUENCE { <br> MessageName MessageName, <br> VehicleID VehicleID, <br> PlatooningGroupID PlatooningGroupID, <br> } |
| Definition | This DF (Data Frame) conveys a message responding to a request to join the platooning group. |
| Unit | N/A |

Here, MessageName=1, VehicleID is the ID of a request message sender, and PlatooningGroupID is the ID of a PG to which the response message sender belongs.

When a new PM is allowed to join the PG through the messages (1, 2-1, 2-2, 3-1, and 3-2) configured according to the above-described methods, the PL updates platooning group information. The platooning group information may include the number of platooning group members and IDs of group members.

```
Platooning group information = {
  PlatooningGroupID PlatooningGroupID,
  PlatooningLeaderID PlatooningLeaderID,
  RoleInPlatooning RoleInPlatooning,
  PlatooningMemberNumber PlatooningMemberNumber,
  PlatooningDestination PlatooningDestination,
  PlatooningRoute PlatooningRoute,
  ...
}
```

When Vehicle ITS-S becomes a new PM, it generates platooning group information. The platooning group information may be the same as the aforementioned platooning group information. The join response message may be transmitted only at the time of accepting a join request, or may be transmitted at the time of accepting or rejecting while indicating accept/reject through an additional field.

Leaving Platooning Group

When a PM leaves a PG, the PM may generate a leave notification message and transmit the generated leave message to a PL of the PG to which it belongs. The PM may receive a response message in response to the leave notification message from the PL. The PM may terminate a platooning state, perform discovery for discovering a new PG, or disable the platooning state on the basis of reception of the response message.

The leave notification message used in the leave process may be defined as PlatooningMessage in which PlatooningMessageType is defined as a specific value as shown in Tables 20 and 21, or as a newly defined PlatooningLeaveNotify message as shown in Table 22.

TABLE 20

| | |
|---|---|
| Descriptive Name | PlatooningMessage |
| Identifier | DataType_xxx |
| ASN.1 representation | PlatooningMessage ::= SEQUENCE { <br> VehicleID VehicleID, <br> PlatooningGroupID PlatooningGroupID, <br> PlatooningMessageType PlatooningMessageType, <br> VehicleFunctions VehicleFunctions optional, <br> CAM optional, <br> . . . <br> } |
| Definition | This DF (Data Frame) conveys various messages about platooning. |
| Unit | N/A |

VehicleID is the ID of a leave notification message sender, and PlatooningGroupID is the ID of a PG that the leave notification message sender wants to leave. In this case, VehicleFunctions may be unnecessary.

TABLE 21

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "1" means "request to join the platooning group", "2" means "response to a request to join the platooning group", "3" means "notify leaving from the platooning group" |
| Unit | N/A |

In the case of the leave notification message, PlatooningMessageType of 3 is applied.

TABLE 22

| | |
|---|---|
| Descriptive Name | PlatooningLeaveNotify |
| Identifier | DataType_xxx |

TABLE 22-continued

| | |
|---|---|
| ASN.1 representation | PlatooningLeaveNotify ::= SEQUENCE {<br>MessageName MessageName,<br>VehicleID VehicleID,<br>PlatooningGroupID PlatooningGroupID,<br>} |
| Definition | This DF (Data Frame) conveys a message notifying to leave the platooning group. |
| Unit | N/A |

When a PlatooningLeaveNotify message is newly defined, as shown in Table 22, MessageName=2 may be set. VehicleID is the ID of a leave notification message sender, and PlatooningGroupID is the ID of a PG that the leave notification message sender wants to leave. In this case, VehicleFunctions may be unnecessary.

When the PL receives the leave notification message from the PM, the PL may transmit a response message confirming the leave notification message.

The response message may be defined as PlatooningMessage in which PlatooningMessageType is defined as a specific value as shown in Tables 23 and 24 below, or may be defined as PlatooningLeaveResponse, which is a separate message, as shown in Table 25.

TABLE 23

| | |
|---|---|
| Descriptive Name | PlatooningMessage |
| Identifier | DataType_xxx |
| ASN.1 representation | PlatooningMessage ::= SEQUENCE {<br>VehicleID VehicleID,<br>PlatooningGroupID PlatooningGroupID,<br>PlatooningMessageType PlatooningMessageType,<br>VehicleFunctions VehicleFunctions optional,<br>CAM optional,<br>. . .<br>} |
| Definition | This DF (Data Frame) conveys various messages about platooning. |
| Unit | N/A |

VehicleID is the ID of a leave notification message sender, and PlatooningGroupID is the ID of a PG that the leave notification message sender wants to leave. In this case, VehicleFunctions may be unnecessary.

TABLE 24

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "1" means "request to join the platooning group", "2" means "response to a request to join the platooning group", "3" means "notify leaving from the platooning group", "4" means "confirm the notification of leaving from the platooning group" |
| Unit | N/A |

In the case of the leave response message, PlatooningMessageType of 4 may be applied.

TABLE 25

| | |
|---|---|
| Descriptive Name | PlatooningLeaveResponse |
| Identifier | DataType_xxx |
| ASN.1 representation | PlatooningLeaveResponse ::= SEQUENCE {<br>MessageName MessageName,<br>VehicleID VehicleID,<br>PlatooningGroupID PlatooningGroupID,<br>} |
| Definition | This DF (Data Frame) conveys a message responding to leave the platooning group. |
| Unit | N/A |

As shown in Table 25, in the PlatooningLeaveResponse message, which is a separate message, MessageName may be defined as 3. VehicleID is the ID of a leave notification message sender, and PlatooningGroupID is the ID of a PG that the sender wants to leave.

When exchange between the leave notification message and the response message is completed, the PL updates platooning group information when a PM leaves. The platooning group information may include the number of platooning group members and IDs of group members. That is, information on the PM that left is deleted from the platooning group information. Alternatively, when a PM leaves the PG, the platooning group information is updated. For example, the platooning group information may be deleted.

Meanwhile, a PM that wants to leave may retransmit the leave notification message when it does not receive the response message from the PL.

Platooning Group Dissolving

Figure 13:
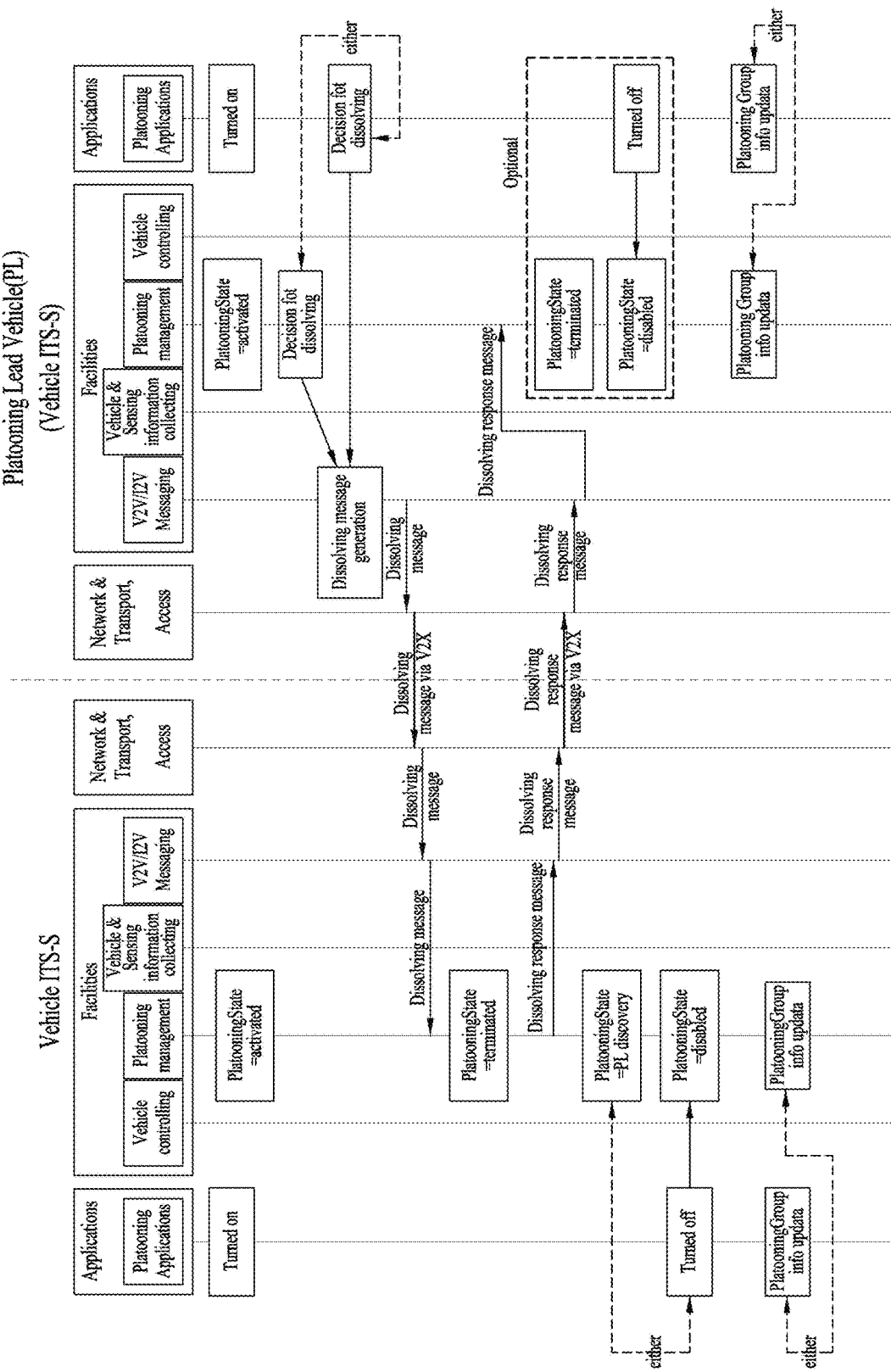
FIG. 13 is a diagram for describing a method in which a PL, which is a leader of a platooning group, dissolves the platooning group thereof.

FIG. 13 is a diagram for describing a method in which a PL, which is a leader of a platooning group, dissolves the platooning group thereof.

Referring to FIG. 13, the PL may generate a dissolving notification message for the PG thereof and transmit the generated dissolving notification message to PMs belonging to the PG. Next, the PL may receive dissolving response messages in response to the dissolving notification message from the PMs. The PL may terminate or disable a platooning state and update or delete platooning group information on the basis of the dissolving response messages.

Meanwhile, a PM that has received the dissolving message may perform a process for discovering a new PL or PG on the basis of the platooning state or disable the platooning state.

The dissolving notification message used in the dissolving process may be defined as PlatooningMessage in which PlatooningMessageType is defined as a specific value as shown in Tables 26 and 27, or may be defined as PlatooningDissolveNotify, which is a separate message as shown in Table 28.

TABLE 26

| | |
|---|---|
| Descriptive Name | PlatooningMessage |
| Identifier | DataType_xxx |
| ASN.1 representation | PlatooningMessage ::= SEQUENCE {<br>VehicleID VehicleID,<br>PlatooningGroupID PlatooningGroupID,<br>PlatooningMessageType PlatooningMessageType,<br>VehicleFunctions VehicleFunctions optional,<br>CAM optional,<br>. . .<br>} |
| Definition | This DF (Data Frame) conveys various messages about platooning. |
| Unit | N/A |

VehicleID is the ID of a dissolving notification message sender, and PlatooningGroupID is the ID of a PG to which the sender belongs. In this case, VehicleFunctions may be unnecessary.

TABLE 27

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "1" means "request to join the platooning group", "2" means "response to a request to join the platooning group", "3" means "notify leaving from the platooning group", "4" means "confirm the notification of leaving from the platooning group", "5" means "notify dissolving the platooning group" |
| Unit | N/A |

In the case of the dissolving notification message, PlatooningMessageType of 5 is applied.

TABLE 28

| | |
|---|---|
| Descriptive Name | PlatooningDissolveNotify |
| Identifier | DataType_xxx |
| ASN.1 representation | PlatooningDissolveNotify ::= SEQUENCE { MessageName MessageName, VehicleID VehicleID, PlatooningGroupID PlatooningGroupID, } |
| Definition | This DF (Data Frame) conveys a message notifying dissolution of the platooning group. |
| Unit | N/A |

In the message for PlatooningDissolveNotify defined based on Table 28, MessageName may be set to 4. VehicleID is the ID of a dissolving notification message sender, and PlatooningGroupID is the ID of a PG to which the sender belongs.

Upon receiving the dissolving notification message, a PM may transmit confirmation for the message as a dissolving response message as follows. Specifically, the dissolving response message may be defined as PlatooningMessage in which PlatooningMessageType is defined as a specific value as shown in Tables 29 and 30, or may be defined as a separate message, PlatooningDissolveResponse, as shown in Table 31.

TABLE 29

| | |
|---|---|
| Descriptive Name | PlatooningMessage |
| Identifier | DataType_xxx |
| ASN.1 representation | PlatooningMessage ::= SEQUENCE { VehicleID VehicleID, PlatooningGroupID PlatooningGroupID, PlatooningMessageType PlatooningMessageType, VehicleFunctions VehicleFunctions optional, CAM optional, . . . } |
| Definition | This DF (Data Frame) conveys various messages about platooning. |
| Unit | N/A |

VehicleID is the ID of a dissolving notification message sender, and PlatooningGroupID is the ID of a PG to which the sender belongs. In this case, VehicleFunctions may be unnecessary.

TABLE 30

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "1" means "request to join the platooning group", "2" means "response to a request to join the platooning group", "3" means "notify leaving from the platooning group", "4" means "confirm the notification of leaving from the platooning group", "5" means "notify dissolving the platooning group", "6" means "confirm the notification of dissolving the platooning group" |
| Unit | N/A |

In the case of the dissolving response message, PlatooningMessageType of 6 is applied.

TABLE 31

| | |
|---|---|
| Descriptive Name | PlatooningDissolveResponse |
| Identifier | DataType_xxx |
| ASN.1 representation | PlatooningDissolveResponse ::= SEQUENCE { MessageName MessageName, VehicleID VehicleID, PlatooningGroupID PlatooningGroupID, } |
| Definition | This DF (Data Frame) conveys a message notifying dissolution of the platooning group. |
| Unit | N/A |

As shown in Table 31, in the separately defined PlatooningDissolveResponse message, MessageName may be set to 5. VehicleID is the ID of a notification message sender, and PlatooningGroupID is the ID of a PG to which the sender belongs.

When the PG is dissolved, the PL and PM(s) update platooning group information. For example, the platooning group information itself may be deleted.

Merging of Platooning Groups

Figure 14:
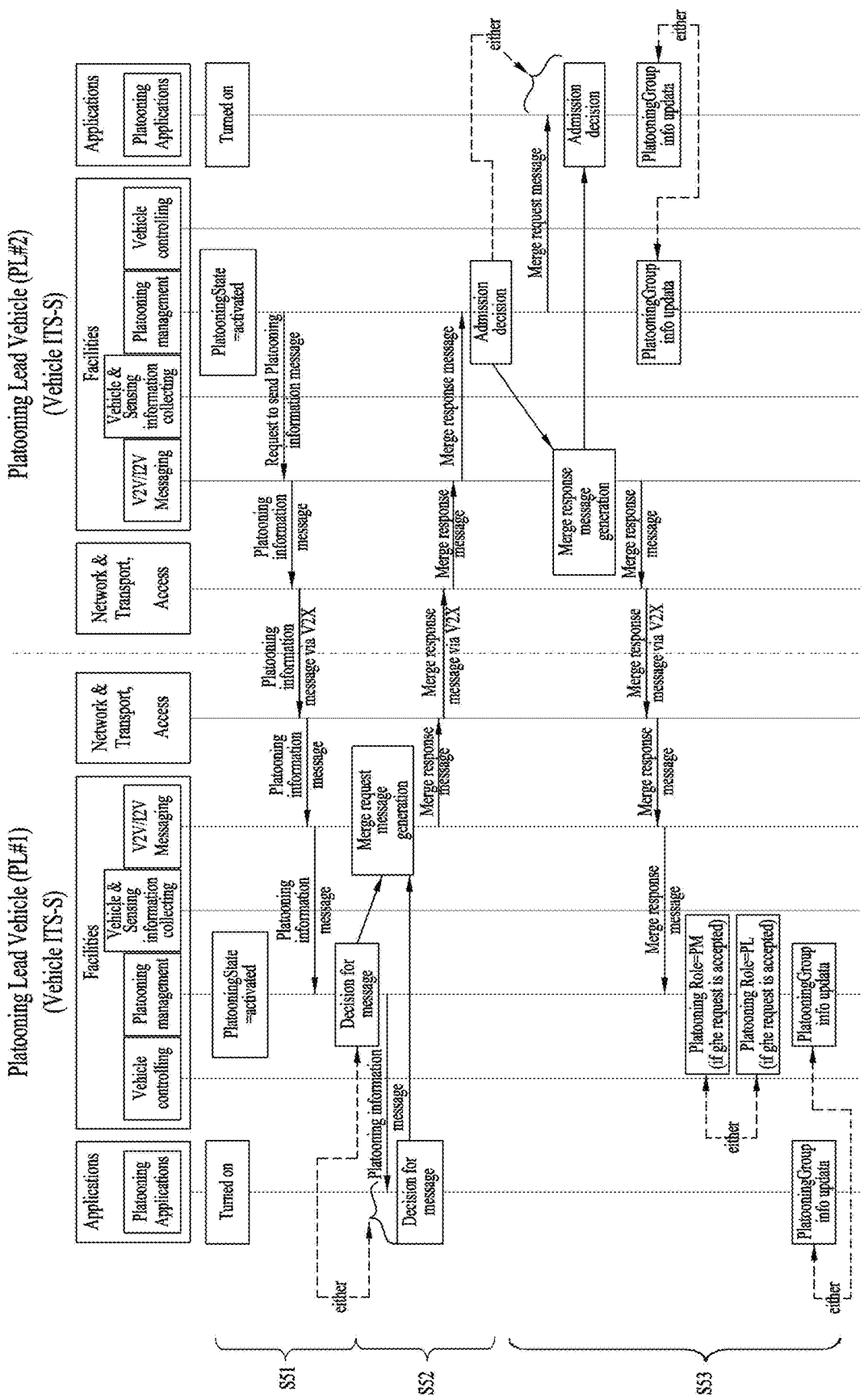
FIG. 14 is a diagram for describing a method of determining merging of platooning groups between PLs.

FIG. 14 is a diagram for describing a method of determining platooning group merging between PLs.

Referring to FIG. 14, a first PL PL #1 for a first PG may transmit a platooning information message from a second PL PL #2 for a second PG (S51). The first PL may determine whether to merge with the second PG on the basis of the platooning information message, and upon determining that merging with the second PG will be performed, transmit a first merge request message to the second PL (S52). The first PL may receive a first merge response message from the second PL and determine whether to maintain the status of the first PL with respect to the first PG or change the status to a PM of the second PG on the basis of the received first merge response message (S53). For example, the first PL belongs to the second PG as a PM of the second PG if the first merge response message includes acceptance, whereas the first PL may maintain the PL status with respect to the first PG if the first merge response message includes rejection.

The first merge request message may be defined as PlatooningMessage in which PlatooningMessageType is defined as a specific value as shown in Tables 32 and 33 below, or defined as a separate message, PlatooningMergeRequest, as shown in Table 34 below.

TABLE 32

| | |
|---|---|
| Descriptive Name | PlatooningMessage |
| Identifier | DataType_xxx |
| ASN.1 representation | PlatooningMessage ::= SEQUENCE {<br>VehicleID VehicleID,<br>PlatooningGroupID PlatooningGroupID,<br>PlatooningMessageType PlatooningMessageType,<br>VehicleFunctions VehicleFunctions,<br>CAM optional,<br>. . .<br>} |
| Definition | This DF (Data Frame) conveys various messages about platooning. |
| Unit | N/A |

VehicleID is the ID of a first merge request message sender, and PlatooningGroupID is the ID of a PG that the sender wants to merge with.

TABLE 33

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "1" means "request to join the platooning group", "2" means "response to a request to join the platooning group", "3" means "notify leaving from the platooning group", "4" means "confirm the notification of leaving from the platooning group", "5" means "notify dissolving the platooning group", "6" means "confirm the notification of dissolving the platooning group", "7" means "request to merge into the platooning group" |
| Unit | N/A |

In the first merge request message, PlatooningMessageType of 7 is applied.

TABLE 34

| | |
|---|---|
| Descriptive Name | PlatooningMergeRequest |
| Identifier | DataType_xxx |
| ASN.1 representation | PlatooningMergeRequest ::= SEQUENCE {<br>MessageName MessageName,<br>VehicleID VehicleID,<br>PlatooningGroupID PlatooningGroupID,<br>VehicleFunctions VehicleFunctions,<br>CAM optional,<br>. . .<br>} |
| Definition | This DF (Data Frame) conveys a message requesting to merge the platooning group. |
| Unit | N/A |

The message of PlatooningMergeRequest, which is a separately defined message, may have a MessageName of 2 to be distinguished from the join request message. VehicleID is the ID of a first merge request message sender, and PlatooningGroupID is the ID of a PG that the sender wants to merge with.

The first merge response message to the first merge request message may be defined as PlatooningMessage in which PlatooningMessageType is defined as a specific value as shown in Tables 35 and 36, or may be separately defined as a message of PlatooningMergeResponse as shown in Table 37.

TABLE 35

| | |
|---|---|
| Descriptive Name | PlatooningMessage |
| Identifier | DataType_xxx |
| ASN.1 representation | PlatooningMessage ::= SEQUENCE {<br>VehicleID VehicleID,<br>PlatooningGroupID PlatooningGroupID,<br>PlatooningMessageType PlatooningMessageType,<br>VehicleFunctions VehicleFunctions optional,<br>CAM optional,<br>. . .<br>} |
| Definition | This DF (Data Frame) conveys various messages about platooning. |
| Unit | N/A |

VehicleID is the ID of a first merge response message sender, and PlatooningGroupID is the ID of a PG that the sender wants to merge with. In the case of the response message, VehicleFunctions may be unnecessary.

TABLE 36

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "1" means "request to join the platooning group", "2" means "response to a request to join the platooning group", "3" means "notify leaving from the platooning group", "4" means "confirm the notification of leaving from the platooning group", "5" means "notify dissolving the platooning group", "6" means "confirm the notification of dissolving the platooning group", "7" means "request to merge into the platooning group", "8" means "response to a request to merge into the platooning group" |
| Unit | N/A |

In the first merge response message, PlatooningMessageType of 8 may be set.

TABLE 37

| | |
|---|---|
| Descriptive Name | PlatooningMergeResponse |
| Identifier | DataType_xxx |
| ASN.1 representation | PlatooningMergeResponse ::= SEQUENCE {<br>MessageName MessageName,<br>VehicleID VehicleID,<br>PlatooningGroupID PlatooningGroupID,<br>} |
| Definition | This DF (Data Frame) conveys a message responding to a request to merge into the platooning group. |
| Unit | N/A |

In the message of PlatooningMergeResponse, which is separately defined on the basis of Table 37, MessageName may be set to 6. VehicleID is the ID of a first merge response message sender, and PlatooningGroupID is the ID of a PG that the sender wants to merge with.

The first merge response message may be transmitted only at the time of accepting the first merge request message, or may be transmitted at the time of accepting or rejecting while indicating whether to accept/reject through an additional field.

Alternatively, when merging with the second PG is performed on the basis of the first merge response message, the first PL may transmit a first merge notification message for merging the platoons and changing the PLs. The first merge notification message may be transmitted to PMs included in the first PG and/or to the second PL. The PMs included in the first PG and/or the second PL, which have received the first merge notification message, may update group information on the second PG on the basis of the first merge notification message. The PMs included in the first PG and the first PL may operate as PMs in the second PG.

The first merge notification message (a message used between PLs and PM(s) of PGs to be merged after negotiation between the PLs is completed when the two PGs are merged) may be defined as PlatooningMessage in which PlatooningMessageType is defined as a specific value according to Tables 38 and 39, or may be separately defined as a message of PlatooningMergeNotify as shown in Table 40.

TABLE 38

| | |
|---|---|
| Descriptive Name | PlatooningMessage |
| Identifier | DataType_xxx |
| ASN.1 representation | PlatooningMessage ::= SEQUENCE {<br>VehicleID VehicleID,<br>PlatooningGroupID PlatooningGroupID optional,<br>PlatooningMessageType PlatooningMessageType,<br>VehicleFunctions VehicleFunctions optional,<br>NewPlatooningGroupInfo PlatooningGroupInfo optional,<br>} |
| Definition | This DF (Data Frame) conveys various messages about platooning |
| Unit | N/A |

VehicleID may be the ID of a first merge notification message sender, and PlatooningGroupID may be the ID of a PG to which the sender has previously belonged. NewPlatooningGroupInfo carries information on a new platooning group to be merged.

TABLE 39

| | |
|---|---|
| Descriptive Name | PlatooningMessageType |
| Identifier | DataType_xxx |
| ASN.1 representation | PlatooningMessageType ::= INTEGER(0 ... 100) |
| Definition | This DE (Data Element) indicates the type of message about platooning. "1" means "request to join the platooning group", "2" means "response to a request to join the platooning group", "3" means "notify leaving from the platooning group", "4" means "confirm the notification of leaving from the platooning group", "5" means "notify dissolving the platooning group", "6" means "confirm the notification of dissolving the platooning group", "7" means "request to merge into the platooning group", "8" means "response to a request to merge into the platooning group", "9" means "notify the PG is merged into another PG" |
| Unit | N/A |

In the first merge notification message, PlatooningMessageType may be set to 9.

TABLE 40

| | |
|---|---|
| Descriptive Name | PlatooningMergeNotify |
| Identifier | DataType_xxx |
| ASN.1 representation | PlatooningMergeNotify ::= SEQUENCE {<br>MessageName MessageName optional,<br>VehicleID VehicleID,<br>PlatooningGroupID PlatooningGroupID,<br>NewPlatooningGroupInfo PlatooningGroupInfo,<br>} |
| Definition | This DF (Data Frame) conveys a message requesting to merge the platooning group. |
| Unit | N/A |

VehicleID may be the ID of a first merge notification message sender, and PlatooningGroupID may be the ID of a PG to which the sender has previously belonged. NewPlatooningGroupInfo carries information on a new platooning group to be merged. In this case, MessageName may be unnecessary because there are no other messages having the same message format.

Thereafter, a PL and PM(s) belonging to a PG merged into a new PG update platooning group information into new PL and PG information.

Platooning Group Merging while Maintaining Sub-Groups

Figure 15:
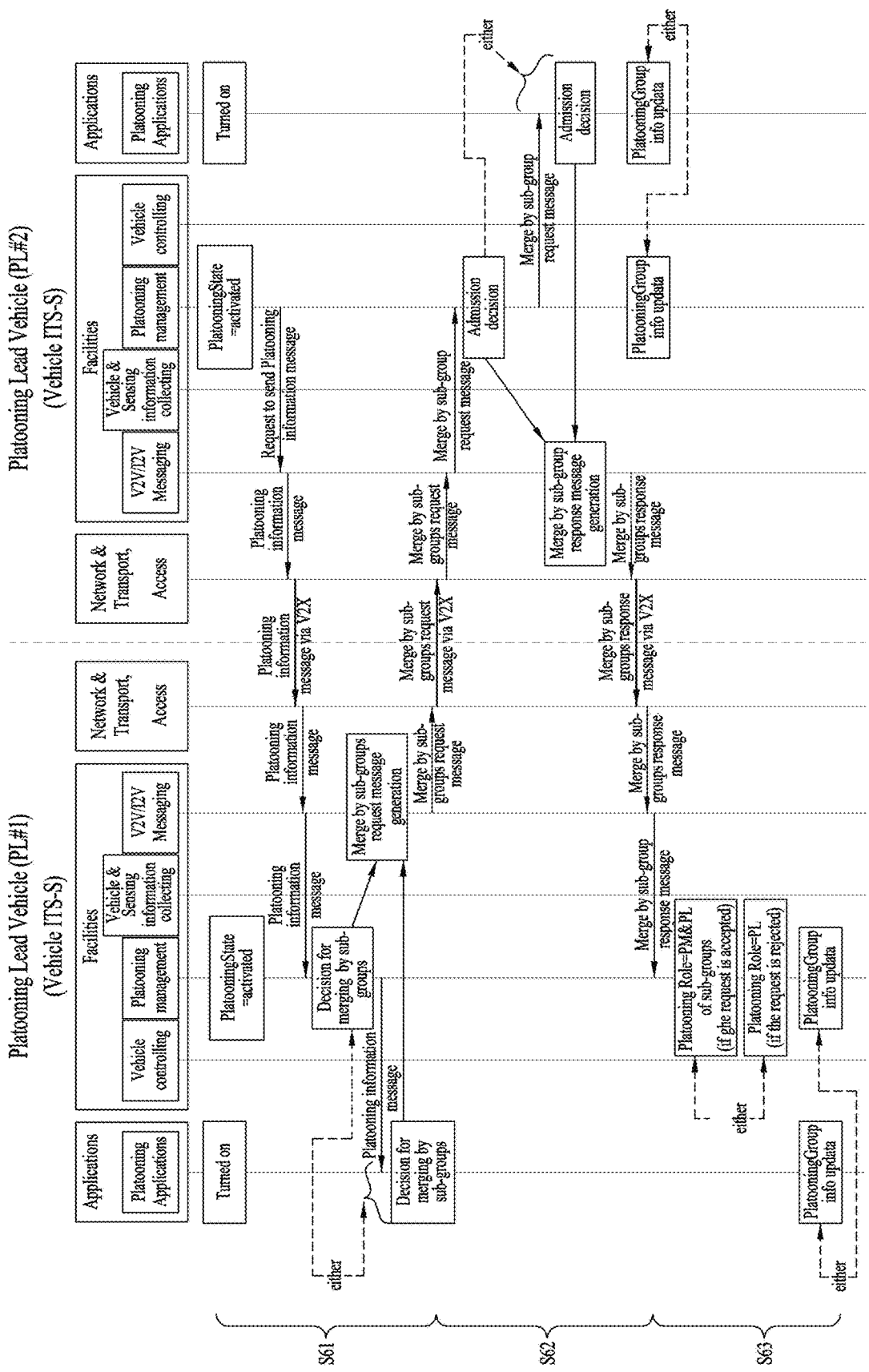
FIG. 15 and FIG. 16 are diagrams for describing a method in which a first PG and a second PG are merged while maintaining sub-groups between a first PL and a second PL.
Figure 16:
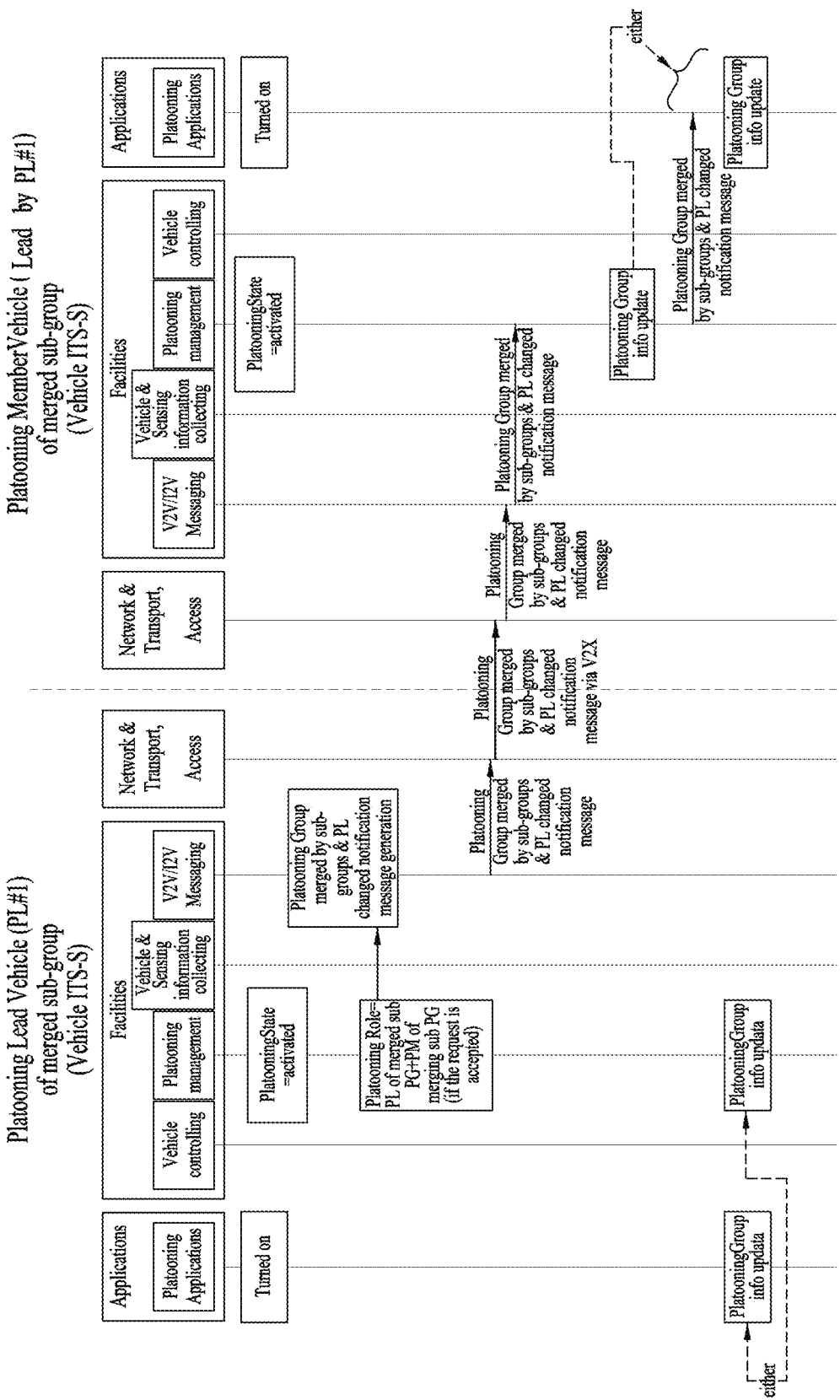

FIG. 15 and FIG. 16 are diagrams for describing a method in which a first PG and a second PG are merged while maintaining subgroups between a first PL and a second PL.

Hereinafter, for convenience of description, the first platooning leader (PL) as a leader of the first platooning group (PG) may be defined as a PL that requests merging with the second PG, and the second PL as a leader of the second PG may be defined as a PL that receives a merge request from the first PL.

Referring to FIG. 15, the first PL of the first PG may receive a platooning information message from the second PL of the second PG, and upon determining merging with the second PG while maintaining sub-groups for PMs belonging to the first PG on the basis of the received platooning information message, transmit a merge request message (hereinafter, a second merge request message) by the sub-groups to the second PL (S61). The first PL may receive a second merge response message that is a response to the second merge request message from the second PL (S63). The first PL may determine a role in the platoon on the basis of the received second merge response message. Here, the second merge request message is a message for requesting merging by a sub-group (or sub-platooning group), and the second merge response message is a message for response to merging by a sub-group (or sub-platooning group).

For example, the first PL may serve as a PM in the second PG and serve as a PL in a sub-group related to the first PG when the second merge response message includes information on acceptance. The first PL may maintain the PL role of the first PG without merging with the second PG when the second merge response message includes information about rejection.

Specifically, the first PL, which is a PL of a sub-platooning group, may serve as a PL in the sub-platooning group while serving as a PM in the second PG, which is an upper platooning group. Here, PMs for the sub-platooning group may serve as PMs for the second PG that is an upper platooning group and the sub-platooning group.

In order to enable merging of two PGs while maintaining a sub-platooning group, the aforementioned platooning group information message may be extended to or defined as a PlatooningGroupInfoList message including at least two pieces of PlatooningGroupInfo (e.g., information on an upper platooning group and information on sub-platooning groups) as shown in Table 41.

TABLE 41

| | |
|---|---|
| Descriptive Name | PlatooningGroupInfoList |
| Identifier | DataType_xxx |
| ASN.1 representation | PlatooningGroupInfoList ::= SEQUENCE (SIZE (1 ... 10)) OF PlatooningGroupInfo |
| Definition | This DF (Data Frame) informs information about the PG(s) associated with the message sender. |
| Unit | N/A |

In addition, one piece of platooning group information included in the PlatooningGroupInfoList may be extended or defined as shown in Table 42 below.

TABLE 42

| | |
|---|---|
| Descriptive Name | PlatooningGroupInfo |
| Identifier | DataType_xxx |
| ASN.1 representation | PlatooningGroupInfo ::= SEQUENCE {<br>PlatooningGroupID PlatooningGroupID,<br>ParentPlatooningGroupID PlatooningGroupID,<br>ChildrenPlatooningGroupID<br>ChildrenPlatooningGroupID,<br>PlatooningLevel PlatooningLevel,<br>VehicleID VehicleID,<br>RoleInPlatooning RoleInPlatooning,<br>PlatooningMemberNumber PlatooningMember<br>Number,<br>PlatooningDestination PlatooningDestination,<br>PlatooningRoute PlatooningRoute,<br>CAM optional<br>. . .<br>} |
| Definition | This DF (Data Frame) informs information about each PG included in the PlatooningGroupInfoList message. |
| Unit | N/A |

Information related to RoleInPlatooning, PlatooningMemberNumber, PlatooningDestination, and PlatooningRoute newly defined or extended in the platooning group information may have different values in an upper platooning group and a lower sub-group (or sub-platooning group).

ParentPlatooningGroupID indicates the ID of a parent platooning group. ChildrenPlatooningGroupID defined in Table 43 indicates the ID of a sub-group (a sub-platooning group of the parent group). There may be one or more sub-groups.

TABLE 43

| | |
|---|---|
| Descriptive Name | ChildrenPlatooningGroupID |
| Identifier | DataType_xxx |
| ASN.1 representation | ChildrenPlatooningGroupID::= SEQUENCE (SIZE (0 . . . 10)) OF PlatooningGroupID |
| Definition | This DF (Data Frame) indicates one or more PlatooningGroupIDs which are sub-platooning groups of this platooning group. |
| Unit | N/A |

A platooning level (or PlatooningLevel) indicates the level of each PG, a default value of PlatooningLevel of a PG is 0, and PlatooningLevel of the sub-group (or the sub-platooning group of the PG) may have a value obtained by adding 1 to a PlatooningLevel value of the parent PG.

TABLE 44

| | |
|---|---|
| Descriptive Name | PlatooningLevel |
| Identifier | DataType_xxx |
| ASN.1 representation | PlatooningLevel::= INTEGER (0 . . . 10) |
| Definition | This DE (Data Element) identifies the level of the Platooning Group. |
| Unit | N/A |

When a platooning group has a lower platooning group (or sub-platooning group), ParentPlatooningGroupID, ChildrenPlatooningGroupID, and PlatooningLevel may be simultaneously used or only one of the three may be used.

Here, the second merge request message may be similarly defined or configured on the basis of the first merge request message described with reference to FIG. 14 or may be defined as a new type of message.

For example, the second merge request message may be defined by adding a MergebySubgroup item to PlatooningMessage defined in Table 32, as shown in Tables 45 to 48, or may be newly defined as PlatooningMergebySubgroupRequest defined in Table 48.

TABLE 45

| | |
|---|---|
| Descriptive Name | PlatooningMessage |
| Identifier | DataType_xxx |
| ASN.1 representation | PlatooningMessage ::= SEQUENCE {<br>VehicleID VehicleID,<br>PlatooningGroupID PlatooningGroupID,<br>PlatooningMessageType PlatooningMessageType,<br>VehicleFunctions VehicleFunctions,<br>MergebySubgroup MergebySubgroup,<br>CAM optional,<br>. . .<br>} |
| Definition | This DF (Data Frame) conveys various messages about platooning. |
| Unit | N/A |

When two platooning groups are merged while maintaining a sub-platooning group, the second merge request message (platooning message) transmitted by the first PG (PG1) requesting merging may be configured as defined in Table 45. PlatooningMessageType of the second merge request message (Merging by sub-group request message) is 7, which is the same value as the first merge request message described above, and whether it is necessary to maintain a sub-platooning group may be indicated to the counterpart PL through the MergebySubgroup item. The MergebySubgroup item has a Boolean value, and when a platooning group requests merging with another platooning group while maintaining the sub-platooning group thereof, a leader (request message sender) of the merged group sets this value to TRUE and sends a merge request. VehicleID is the ID of a second merge request message sender and may indicate the ID of a PG to which the sender belongs. PlatooningGroupID is the ID of a PG that the second merge request message sender wants to merge with.

The MergebySubgroup item may be defined as shown in Table 46.

TABLE 46

| | |
|---|---|
| Descriptive Name | MergebySubgroup |
| Identifier | DataType_xxx |
| ASN.1 representation | MergebySubgroup::= BOOLEAN |
| Definition | This DE (Data Element) indicates whether the PL requests merging while keeping sub-groups. |
| Unit | N/A |

Meanwhile, as shown in Table 47, when PlatooningMessageType is newly defined as 12 and the second merge request message (merging by sub-group request) is transmitted, the MergebySubgroup item may be unnecessary.

TABLE 47

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "1" means "request to join the platooning group", "2" means "response to a request to join the platooning group", "3" means "notify leaving from the platooning group", "4" means "confirm the notification of leaving from the platooning group", "5" means "notify dissolving the platooning group", "6" |

TABLE 47-continued

| | |
|---|---|
| | means "confirm the notification of dissolving the platooning group", "7" means "request to merge into the platooning group", "12" means "request to merge into the platooning group while keeping the sub-group" |
| Unit | N/A |

Alternatively, the second merge request message may be newly defined as shown in Table 48 below.

TABLE 48

| | |
|---|---|
| Descriptive Name | PlatooningMergebySubgroupRequest |
| Identifier | DataType_xxx |
| ASN.1 representation | PlatooningMergebySubgroupRequest ::= SEQUENCE { MessageName MessageName, VehicleID VehicleID, PlatooningGroupID PlatooningGroupID, VehicleFunctions VehicleFunctions, CAM optional, . . . } |
| Definition | This DF (Data Frame) conveys a message requesting to merge while keeping the platooning sub-group. |
| Unit | N/A |

MessageName of the second merge request message may be set to 7. VehicleID is the ID of a second merge request message sender and may indicate the ID of a PG to which the sender belongs. PlatooningGroupID is the ID of a PG that the second merge request message sender wants to merge with.

Next, the second merge response message in response to the second merge request message may be defined or configured similarly (Table 49) on the basis of the first merge response message described with reference to FIG. 14 (Table 49), or defined as a new type of message (Table 50).

TABLE 49

| | |
|---|---|
| Descriptive Name | PlatooningMessage |
| Identifier | DataType_xxx |
| ASN.1 representation | PlatooningMessage ::= SEQUENCE { VehicleID VehicleID, PlatooningGroupID PlatooningGroupID, PlatooningMessageType PlatooningMessageType, VehicleFunctions VehicleFunctions, MergebySubgroup MergebySubgroup, CAM optional, . . . } |
| Definition | This DF (Data Frame) conveys various messages about platooning. |
| Unit | N/A |

In the case of the second merge response message (Merge by Sub-group response message) according to Table 49, the second merge response message may use the same PlatooningMessage as the first merge response message described above. VehicleID is the ID of a second merge request message sender, and PlatooningGroupID is the ID of a PG that the sender wants to merge with. In the second merge response message, VehicleFunctions may be unnecessary.

In the second merge response message, PlatooningMessageType may be defined as 8 as in the first merge response message, or newly defined as 13.

TABLE 50

| | |
|---|---|
| Descriptive Name | PlatooningMergebySubgroupResponse |
| Identifier | DataType_xxx |
| ASN.1 representation | PlatooningMergebySubgroupResponse ::= SEQUENCE { MessageName MessageName, VehicleID VehicleID, PlatooningGroupID PlatooningGroupID, } |
| Definition | This DF (Data Frame) conveys a message responding to a request to merge by sub-group into the platooning group. |
| Unit | N/A |

In the case of the second merge response message (merge by sub-group response message) according to Table 50, MessageName may be set to 6, which is the same value as the second merge request message (PlatooningMergeRequest). VehicleID is the ID of a second merge request message sender, and PlatooningGroupID is the ID of a PG that the sender wants to merge. Alternatively, unlike PlatooningMergebySubgroupRequest, MessageName of the second merge response message may be defined as 8.

The second merge response message (merge by sub-group response message) may be transmitted only when the second merge request message (merge by sub-group request) is accepted, or may be transmitted at the time of accepting or rejecting while indicating whether to accept/reject through an additional field.

Referring to FIG. 16, when negotiation between the first PL for the first PG and the second PL for the second PG is completed and thus the two PGs are merged, the first PL (a PL of the sub-group PG to be merged) may transmit the second merge notification message to PM(s) belonging to the first PG that is a sub-group. Also, the second merge notification message may be transmitted to the second PL.

Specifically, the second merge notification message may be defined as a (2-1)-th merge notification message (Table 51 and Table 52) or a (2-2)-th merge notification message (Table 53 and Table 54).

TABLE 51

| | |
|---|---|
| Descriptive Name | PlatooningMessage |
| Identifier | DataType_xxx |
| ASN.1 representation | PlatooningMessage ::= SEQUENCE { VehicleID VehicleID, PlatooningGroupID PlatooningGroupID, PlatooningMessageType PlatooningMessageType, VehicleFunctions VehicleFunctions, NewPlatooningGroupInfo PlatooningGroupInfo, } |
| Definition | This DF (Data Frame) conveys various messages about platooning |
| Unit | N/A |

TABLE 52

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "1" means "request to join the platooning group", "2" means "response to a request to join the platooning group", "3" means "notify leaving from the platooning group", "4" means "confirm the notification of leaving from the platooning group", "5" means "notify dissolving the platooning group", "6" means "confirm the notification of dissolvingt he platooning group", "7" means "request to merge into the platooning group", "8" means "response to a request to merge into the platooning |

TABLE 52-continued

| | |
|---|---|
| | group", "9" means "notify the PG is merged into another PG", "14" means "notify the PG is merged by sub group into another PG" |
| Unit | N/A |

VehicleID may be the ID of a (2-1)-th merge notification message sender, and PlatooningGroupID may be the ID of a PG to which the sender has previously belonged. NewPlatooningGroupInfo may include information on a new platooning group to be merged. Alternatively, the (2-1)-th merge notification message may be defined similarly to the first merge notification message.

In "Notify that the PG is merged by sub group into another PG" described in Table 52, PlatooningMessageType may be defined as 14.

TABLE 53

| | |
|---|---|
| Descriptive Name | PlatooningMergebySubgroupNotify |
| Identifier | DataType_xxx |
| ASN.1 representation | PlatooningMergebySubgroupNotify ::= SEQUENCE { MessageName MessageName optional, VehicleID VehicleID, PlatooningGroupID PlatooningGroupID, NewPlatooningGroupInfo PlatooningGroupInfo, } |
| Definition | This DF (Data Frame) conveys a message requesting to merge the platooning group. |
| Unit | N/A |

As shown in PlatooningMergebySubgroupNotify in Table 53, it may be newly defined as a notification message for a merged case in a state in which a sub-group is maintained. In this case, since it has the same message format as PlatooningMergeNotify defined in Table 40, MessageName for PlatooningMergeNotify may be set to 9, and MessageName for PlatooningMergebySubgroupNotify may be set to 10.

Meanwhile, VehicleID in Table 53 may be the ID of a (2-2)-th merge notification message sender, and PlatooningGroupID may be the ID of a PG to which the sender has previously belonged. NewPlatooningGroupInfo conveys information about a new platooning group to be merged.

Thereafter, PLs and PMs belonging to a sub-group merged into a new PG add new PL and PG information to the platooning group information list and update the information of the platooning group to which they belong.

Specific Sub-Group-Based Merging Method

Figure 17:
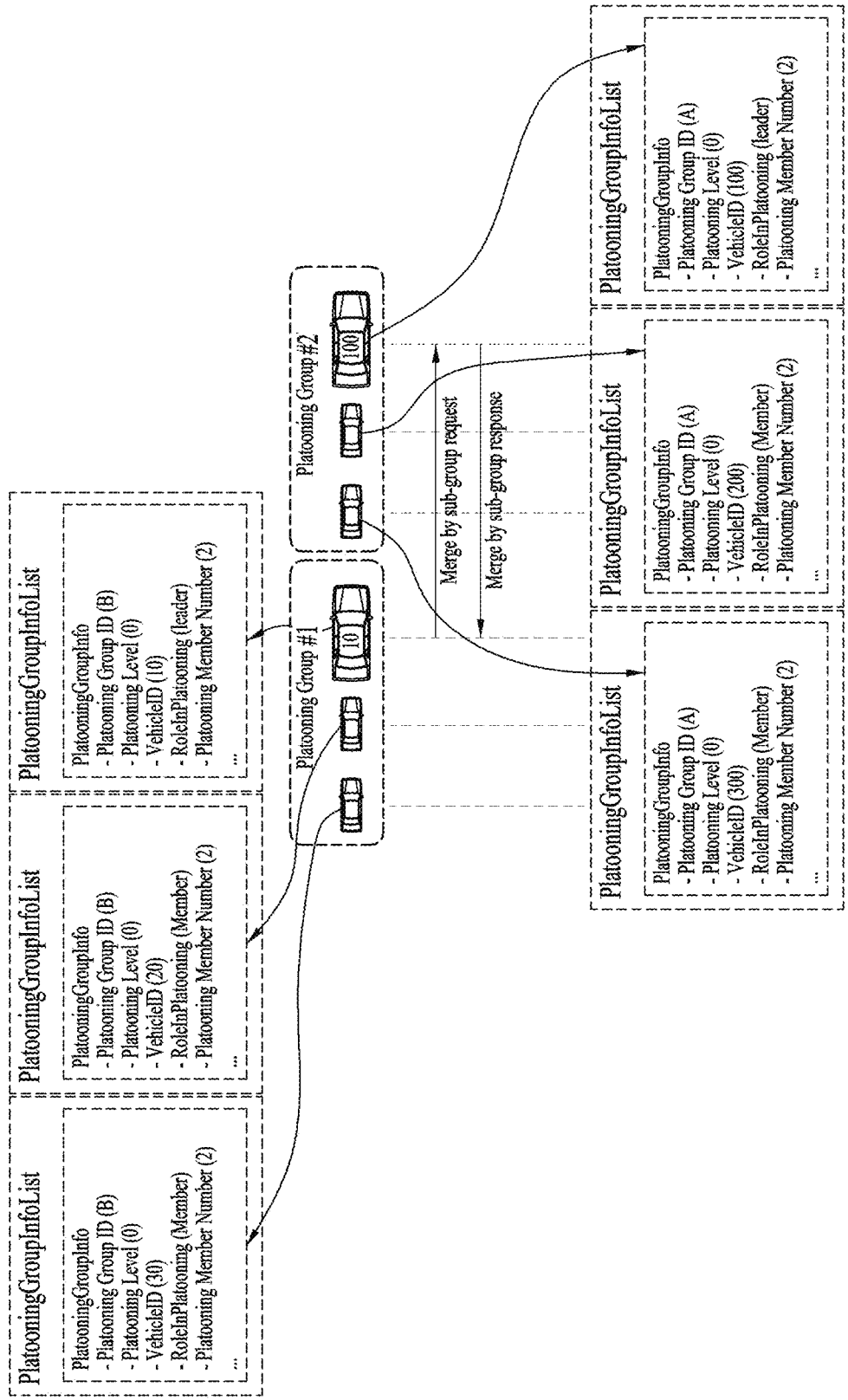
FIG. 17, FIG. 18, and FIG. 19 are diagrams for describing a method of merging the first PG into the second PG.
Figure 18:
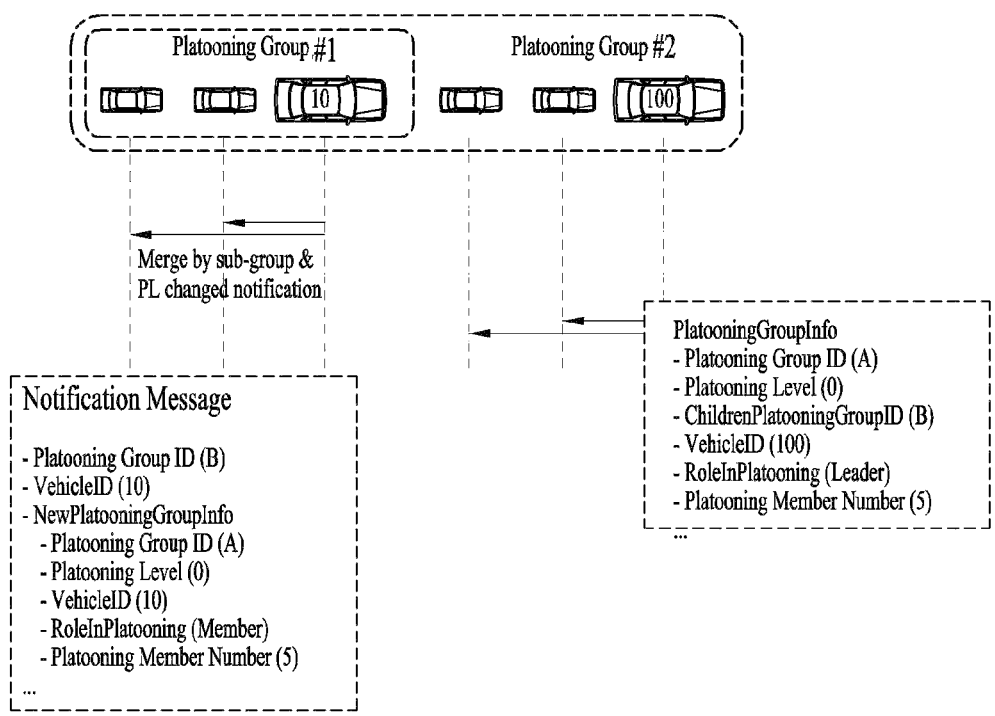
Figure 19:
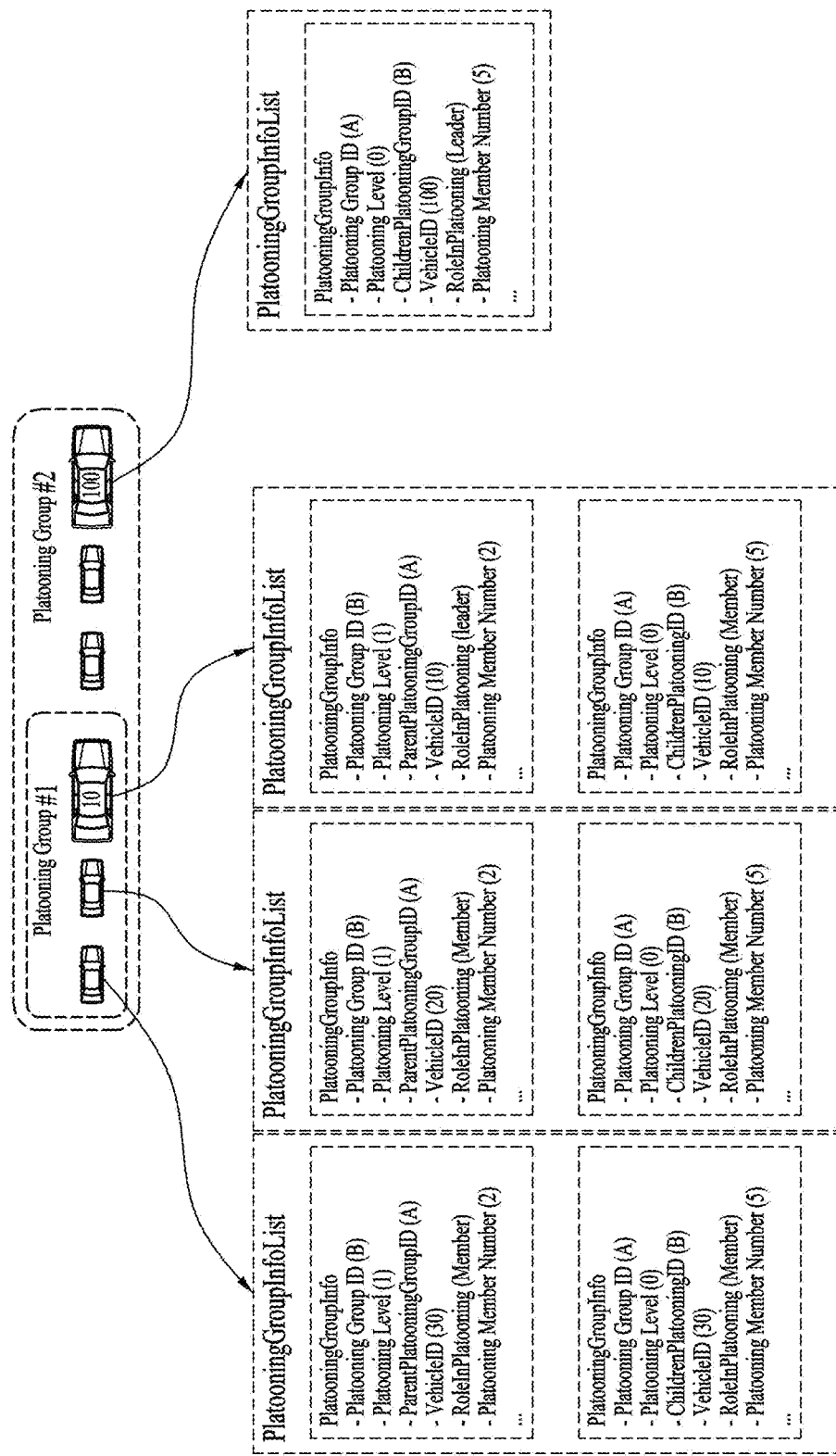

FIG. 17, FIG. 18 and FIG. 19 are diagrams for describing a method of merging a first PG PG #1 with a second PG PG #2.

Referring to FIG. 17, a first PG PG #1 may be merged with a second PG PG #2 while maintaining the first PG PG #1. Here, the first PG is assigned a group ID of B, the second PG is assigned a group ID of A, a first PL of the first PG is assigned a vehicle ID 10, and a second PL of the second PG is assigned a vehicle ID 100.

A vehicle 10 (or the first PL) that is a leader of the first PG PG #1 may transmit a merge request message (or the above-described second merge request message) to a vehicle 100 (or the second PL) that is a leader of the second PG PG #2. Upon receiving the merge request message based on the sub-group, the vehicle 100 (or the second PL) may transmit a response message (or the second merge response message described above) in response to the sub-group-based merge request message to the vehicle 10. In this case, PLs and PMs belonging to the second PG PG #2 and the first PG PG #1 include platooning group information lists managed internally. Prior to merging while maintaining the sub-group, in each platooning group information list, Platooning Level may be set to 0 (all) as shown in FIG. 11.

Referring to FIG. 18, after the first PG PG #1 is merged into the second PG PG #2 in the form of a sub-group, the vehicle 10 that was the PL (or the first PL) of the first PG PG #1 notifies the PMs (or first PMs) of a sub-platooning group that PLs and PGs have been changed. In addition, the vehicle 100 that is the leader (or the second PL) of the second PG PG #2 may update information on the second PG PG #2 and transmit the updated information to the PMs (or second PMs) of the second PG PG #2.

Referring to FIG. 19, each of platooning group information lists internally managed by the first PL and the first PMs belonging to the first PG PG #1, which are sub-platooning groups, include two pieces of platooning group information. Information on a PG to which a vehicle currently belongs may be set to a platooning level 0, a platooning level of a PG of a merged sub-group may be set to 1, and the platooning levels may be stored. In other words, each of the first PL and the first PMs may include existing platooning group information (or platooning group information on the first PG before merging) in which the platooning level of the PG is set to 1 and current platooning group information (or group information about the platooning group that performs platooning after being merged into the second PG) in which the platooning level is set to 0. Here, the current platooning group information may have a platooning group ID of B, and the existing platooning group information may have a platooning group ID of A.

In addition, the second PL of the second PG PG #2 may change the number of platooning member numbers from 2 to 5 to manage the PMs belonging to the second PG PG #2 thereof (or, the first PMs and the second PMs).

In this case, when the first PL PL #1 of the first PG PG #1 is merged with the second PG PG #2, which is another PG, while maintaining the sub-group, the merged first PL PL #1 and the first PMs may update platooning group information on the platooning group to which they currently belong on the basis of the merged platooning group. In this case, the first PG may be maintained as a sub-platooning group and be merged with the second PG, and group information on the first PG may be maintained as sub-group information within group information of the merged second PG. In this case, the first PL PL #1 of the first PG that is the existing sub-group may easily separate the existing first PG from the merged second PG.

Figure 20:
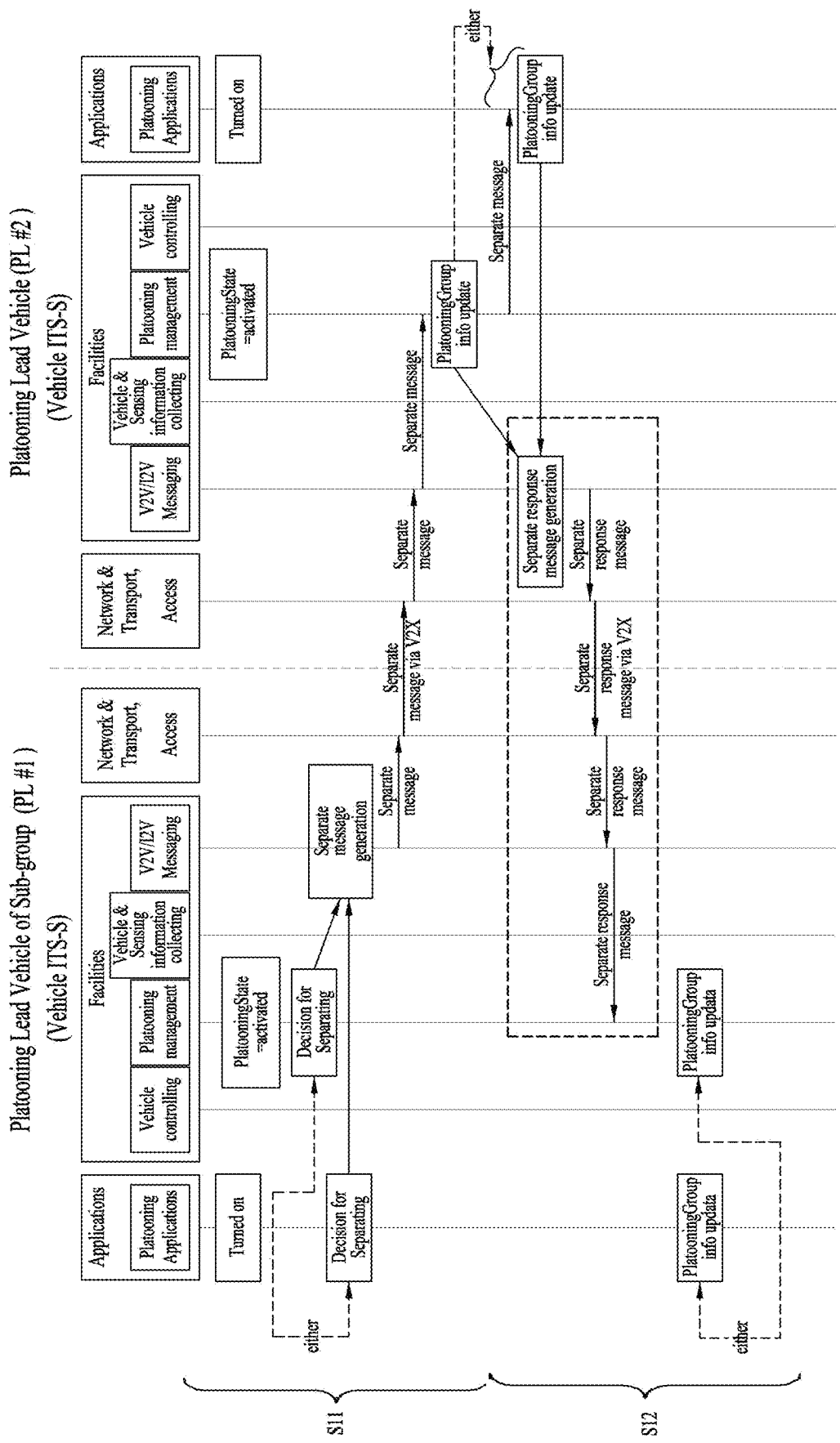
FIG. 20 is a diagram for describing a method in which the first PG merged into the second PG while maintaining subgroups is separated from the second PG.

FIG. 20 is a diagram for describing a method in which the first PG merged into the second PG is separated from the merged second PG while maintaining the sub-group.

Referring to FIG. 20, the sub-group first PG merged while maintaining the sub-group may determine separation from the merged second PG (or a third PG) when pre-configured separation conditions are satisfied, and the first PL PL #1, which is the leader of the first PG that is the sub-platooning group, may transmit a separation request message to the second PL PL #2 (S11). The first PL PL #1 may receive a separation response message as a response to the separation request message from the second PL PL #2 (S12). The first PL PL #1 may be separated from the third PG (or the merged second PG) on the basis of the separation response message and may update group information related to the separated first PG. Here, the second PL PL #2 may update group information on the second PG from which the first PG has been separated on the basis of the separation request message. Furthermore, the first PL PL #1 may transmit a separation notification message regarding the separation to the first PMs belonging to the first PG that is the sub-group and/or the second PL PL #2.

Here, the pre-configured separation conditions may include a case in which a communication range of the second PG merged with the first PG deviates from a communication range of the second PL PL #2, a case in which a movement route related to the first PG is planned to deviate from a movement route related to the second PG, and the like. Alternatively, the pre-configured separation conditions may include a case in which the second PL dissolves the second PG, a case in which the second PL executes a function that is not supported by the first PL (e.g., a case in which the second PL changes lanes although a Platooning with Lane Change function is not supported), a case of moving to an unwanted route (a case in which the second PL moves to a route that the first PL does not want), a case of misbehavior (a case in which the second PL does not follow a traffic signal or a speed limit), and/or a case in which connection is lost (a case in which a V2V signal of a PL can no longer be received).

The first PL PL #1 may use a first separation request message defined based on Table 54 and/or Table 55 or a second separation request message defined based on Table 56 as the separation request message.

TABLE 54

| | |
|---|---|
| Descriptive Name | PlatooningMessage |
| Identifier | DataType_xxx |
| ASN.1 representation | PlatooningMessage ::= SEQUENCE { VehicleID VehicleID, PlatooningGroupID PlatooningGroupID, PlatooningMessageType PlatooningMessageType, Vehicle functions Vehicle functions optional, CAM optional, SubPlatooningGroupInfo PlatooningGroupInfo, ... } |
| Definition | This DF (Data Frame) conveys various messages about platooning. |
| Unit | N/A |

TABLE 55

| | |
|---|---|
| Descriptive Name | PlatooningMessageType |
| Identifier | DataType_xxx |
| ASN.1 representation | PlatooningMessageType ::= INTEGER(0..100) |
| Definition | This DE (Data Element) indicates the type of message about platooning. "15" means "request to separate by sub-group from the Platooning group" |
| Unit | N/A |

The first separation request message may be defined as shown in Table 54 and/or Table 55. VehicleID is the ID of a first separation request message sender, and PlatooningGroupID is the ID of a PG from which the sender wants to separate. Vehicle functions may be unnecessary in this case. The first separation request message sender needs to convey information on the first PG, which is a sub-group that the sender leads and intends to separate from, as "SubPlatooningGroupInfo". Alternatively, in the first separation request message, PlatooningMessageType may be defined or applied as 15.

TABLE 56

| | |
|---|---|
| Descriptive Name | PlatooningSeparatebySubgroupRequest |
| Identifier | DataType_xxx |
| ASN.1 representation | PlatooningSeparatebySubgroupRequest ::= SEQUENCE { MessageName MessageName, VehicleID VehicleID, PlatooningGroupID PlatooningGroupID, SubPlatooningGroupInfo PlatooningGroupInfo, ... } |
| Definition | This DF (Data Frame) conveys a message notifying to leave the Platooning group. |
| Unit | N/A |

The second separation request message may be defined as a separate (or new) message type as shown in Table 56. In this case, MessageName of the second separation request message may be defined as or set to 11. VehicleID is the ID of a sender (or the first PL) of the second separation request message, and PlatooningGroupID is the ID of a PG from which the sender (or the first PL) wants to separate (or the ID of the first PG). In this case, vehicle functions may be unnecessary. The first PL may transmit information on the second PG, which is information on the sub-group PG from which the first PL intends to separate, as "SubPlatooningGroupInfo".

When the first PL, which is a PL of the sub-group, separates or receives the separation request message, the second PL may update platooning group information on the second PG thereof. The platooning group information may include the number of platooning group members and IDs of group members. That is, the second PL may delete information on the second PMs included in the separated sub-group from the platooning group information on the second PG. In addition, when the first PL leading the sub-group is separated from the second PG, the first PL may update platooning group information on the platooning group to lead on the basis of information on the first PG maintained as sub-group information.

The first PL may receive a separation response message that is a response message for the separation request message from the second PL.

Alternatively, the first PL may transmit the separation notification message instead of the separation request message (or in response to the separation response message). As the separation notification message, a first separation notification message defined as shown in Table 57 and/or Table 58 or a second separation notification message defined as shown in Table 59 may be used.

TABLE 57

| | |
|---|---|
| Descriptive Name | PlatooningMessage |
| Identifier | DataType_xxx |
| ASN.1 representation | PlatooningMessage ::= SEQUENCE { VehicleID VehicleID, PlatooningGroupID PlatooningGroupID, PlatooningMessageType PlatooningMessageType, Vehicle functions Vehicle functions optional, CAM optional, SubPlatooningGroupInfo PlatooningGroupInfo, ... } |
| Definition | This DF (Data Frame) conveys various messages about platooning. |
| Unit | N/A |

TABLE 58

| | |
|---|---|
| Descriptive Name | PlatooningMessageType |
| Identifier | DataType_xxx |
| ASN.1 representation | PlatooningMessageType ::= INTEGER(0..100) |
| Definition | This DE (Data Element) indicates the type of message about platooning. "17" means "notify separating by sub group from the Platooning group" |
| Unit | N/A |

The first separation notification message according to Table 57 and/or Table 58 uses the existing PlatooningMessage and may be distinguished through PlatooningMessageType. That is, the first separation notification message can be distinguished or identified from other PlatooningMessages by defining PlatooningMessageType included in PlatooningMessage as 17.

TABLE 59

| | |
|---|---|
| Descriptive Name | PlatooningSeparatebySubgroupNotify |
| Identifier | DataType_xxx |
| ASN.1 representation | PlatooningSeparatebySubgroupNotify ::= SEQUENCE { MessageName MessageName, VehicleID VehicleID, PlatooningGroupID PlatooningGroupID, SubPlatooningGroupInfo PlatooningGroupInfo, ... } |
| Definition | This DF (Data Frame) conveys a message notifying to leave the Platooning group. |

The second separation notification message according to Table 59 may be defined in a new format, and MessageName may be set or defined as 13. VehicleID is the ID of a second separation notification message sender, and PlatooningGroupID is the ID of a PG from which the notification message sender wants to separate (the ID of the second PG). Vehicle functions may be unnecessary in this case. Information on the sub-group PG that it leads and wants to separate from needs to be transmitted as "SubPlatooningGroupInfo".

The second PL updates platooning group information on the second PG when the first PL leading the sub-group requests separation and is separated. Here, the platooning group information on the second PG may include the number of platooning group members and IDs of group members. That is, information on the PL of the separated sub-group and the second PMs included in the sub-group is deleted from the platooning group information.

When the first PL of the sub-group is separated from the second PG, platooning group information of the sub-group is updated.

The first PL may receive a separation response message that is a response message for the separation request message or the separation notification message. The separation response message may include information about confirmation for the separation notification message and/or the separation request message.

The separation response message may be a first separation response message defined based on Table 60 and/or Table 61 or a second separation response message defined based on Table 62.

TABLE 60

| | |
|---|---|
| Descriptive Name | PlatooningMessage |
| Identifier | DataType_xxx |

TABLE 60-continued

| | |
|---|---|
| ASN.1 representation | PlatooningMessage ::= SEQUENCE { VehicleID VehicleID, PlatooningGroupID PlatooningGroupID, PlatooningMessageType PlatooningMessageType, Vehicle functions Vehicle functions optional, CAM optional, ... } |
| Definition | This DF (Data Frame) conveys various messages about platooning. |
| Unit | N/A |

TABLE 61

| | |
|---|---|
| Descriptive Name | PlatooningMessageType |
| Identifier | DataType_xxx |
| ASN.1 representation | PlatooningMessageType ::= INTEGER(0..100) |
| Definition | This DE (Data Element) indicates the type of message about platooning. "16" means "response to a request or confirm the notification of separating by sub-group from the Platooning group" |
| Unit | N/A |

The first separation response message according to Table 60 and/or Table 61 uses the existing PlatooningMessage and may be distinguished through PlatooningMessageType. That is, the first separation notification message can be distinguished or identified from other PlatooningMessages by defining the PlatooningMessageType included in the PlatooningMessage as 16. Here, VehicleID is the ID of a separate request/notification message sender, and PlatooningGroupID is the ID of a PG from which the separate request/notification message sender wants to separate. Vehicle functions may be unnecessary in this case.

TABLE 62

| | |
|---|---|
| Descriptive Name | PlatooningSeparatebySubgroupResponse |
| Identifier | DataType_xxx |
| ASN.1 representation | PlatooningSeparatebySubgroupResponse ::= SEQUENCE { MessageName MessageName, VehicleID VehicleID, PlatooningGroupID PlatooningGroupID, } |
| Definition | This DF (Data Frame) conveys a message responding to separate by sub-group from the Platooning group. |
| Unit | N/A |

The second separation response message according to Table 62 may be defined in a new format, and MessageName may be set or defined as 12. VehicleID is the ID of a separation request/separation notification message sender, and PlatooningGroupID is the ID of a PG from which the separation request/separation notification message sender wants to separate.

The separation response message (or separate by sub-group response message) may be transmitted only at the time of accepting separation according to the separation request message (or separate by sub-group request message), or may be transmitted at the time of accepting or rejecting while indicating accept/reject through an additional field.

On the other hand, when the first PL (PL of the sub-group to be separated) does not receive the separation notification message and/or a response or confirmation message corresponding to the separation request message from the second PL, the separation request/notification A separate request/notification message may be retransmitted to the second PL.

Figure 21:
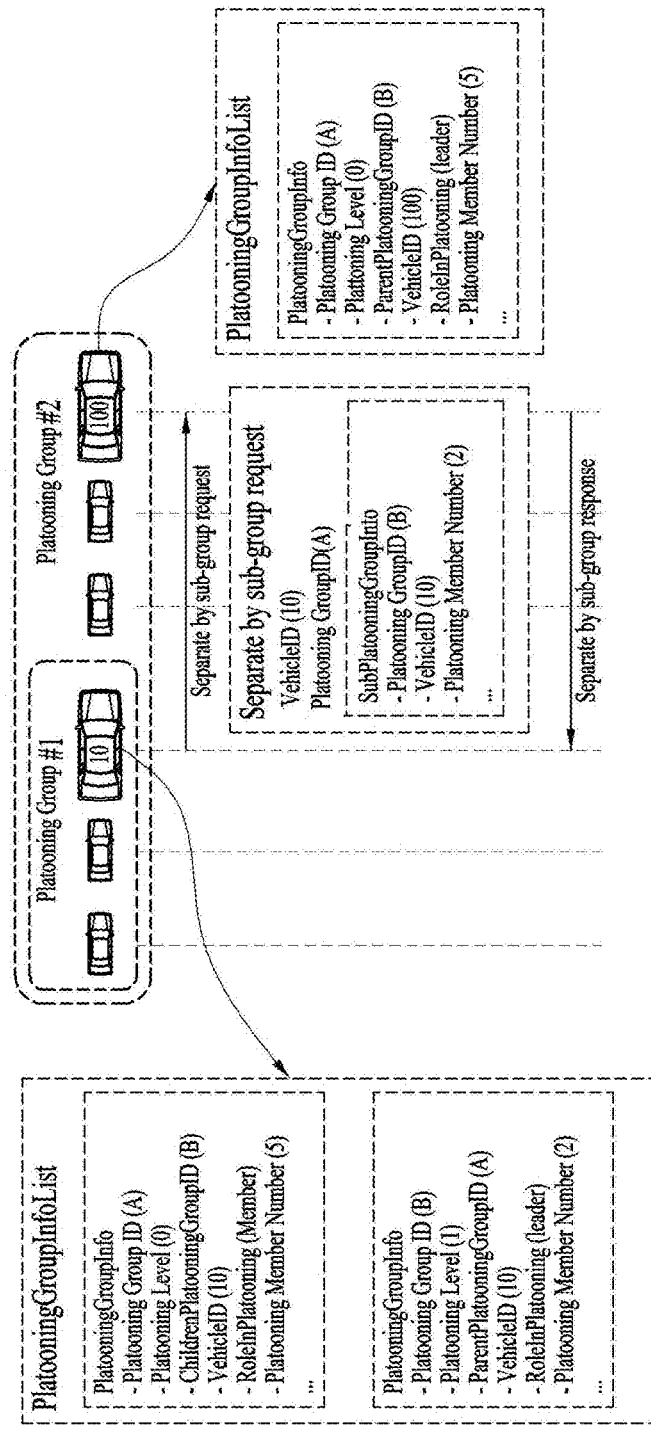

FIG. 21 and FIG. 22 are diagrams for describing a process in which the first PL is separated from the second PG according to an embodiment.

Referring to FIG. 21, the first PG (or platooning group 1) has been merged into the second PG (platooning group 2) while maintaining the sub-group. Here, the first PG is assigned a group ID of B, the second PG is assigned a group ID of A, the first PL of the first PG is assigned a vehicle ID 10, and the second PL of the second PG is assigned a vehicle ID 100.

When the vehicle 10 (or the first PL) that was a PL of the first PG intends to separate in the form of a sub-group, the vehicle 10 (or the first PL) may transmit a separation request message (separate by sub-group request message) to the second PL (or the second PL), as shown in FIG. 21. The vehicle 100 that is the second PL can recognize from the separation request message (separate by sub-group request message) that the vehicle 10 (the first PL) will be separated from the second PG thereof and can obtain sub-group information on the sub-group from which the vehicle 10 (first PL) intends to separate from SubPlatooningGroupInfo included in the separation request message. In this case, the vehicle 100, which is the second PL, may transmit a separation response message as a response to the separation request message.

Here, the separation request message may be at least one of the first separation request message, the second separation request message, the first separation notification message, and the second separation notification message, and the separation response message may be at least one of the above-described first separation response message and second separation response message.

Referring to FIGS. 22 (a) and (b), the first PL (or vehicle 10) of the first PG may notify first PMs belonging to the first PG of updated platooning information (on the first PG) and/or the fact that sub-group-based separation has been completed. Further, the second PL of the second PG may also notify the second PMs belonging to the second PG of updated platooning information on the second PG and/or the fact that sub-group-based separation has been completed.

In this case, the group information (information on a parent group) of the second PG may be deleted from a group information list of the first PG, and the previous platooning level of the first PG may be changed from 1 to 0. Specifically, a group information list for the first PG in FIG. 21 may be changed to a group information list for the first PG in FIG. 22.

Figure 24:
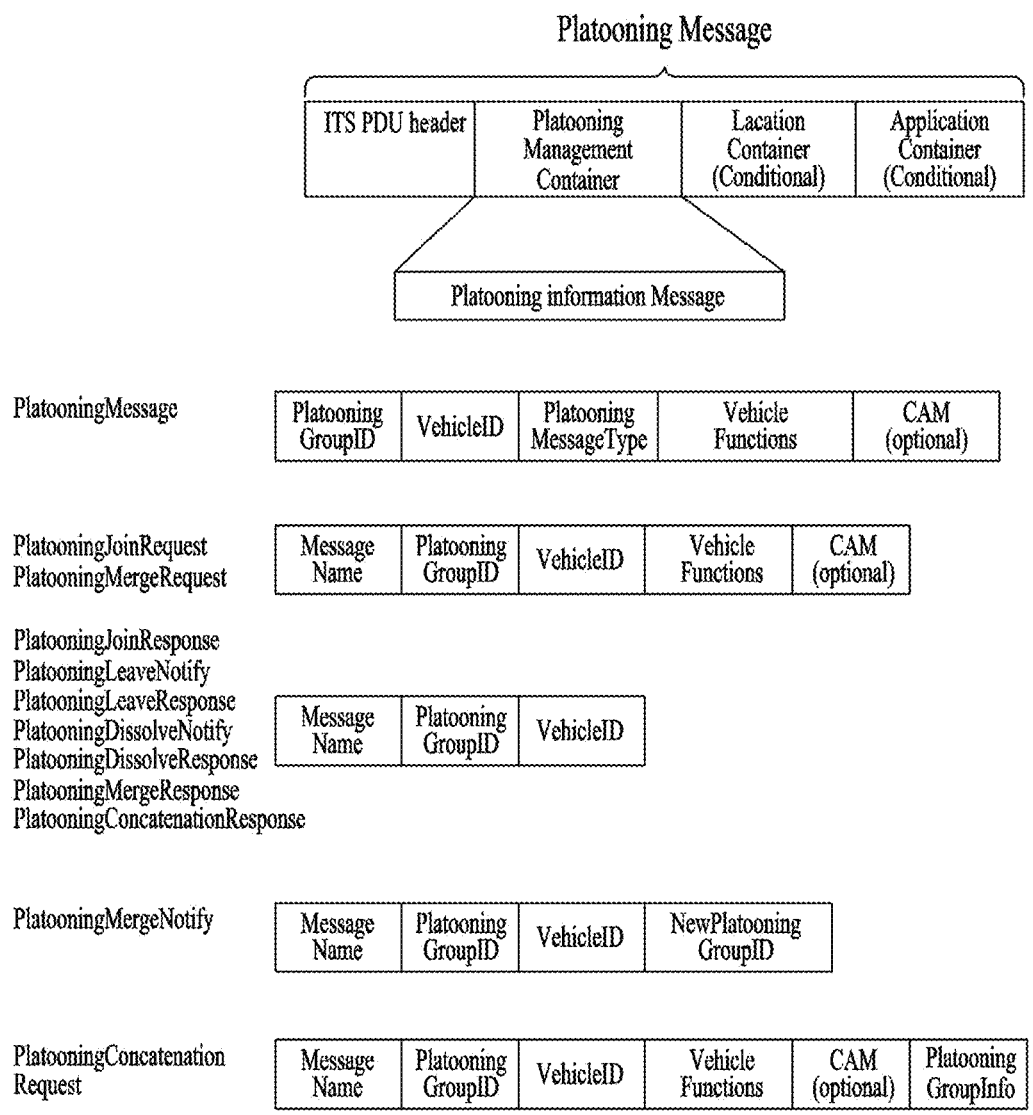

FIG. 23 and FIG. 24 are diagrams for describing a packet structure for a platooning message.

Referring to FIGS. 23 (a) and (b), the platooning message may have any one of two packet structures: a platooning dedicated structure and an extension of the existing ITS message. Here, the existing ITS message may be CAM, DEMN, or the like, and fields or subfields corresponding to the platooning message may be included in the extension field of the existing ITS message.

The platooning message may include the following fields.
ITS PDU header: Common header field for all ITS message formats
Platooning Management Container: includes information required for platooning management and the operation of platooning
Location Container: describes the location of the vehicle transmitting this message
Application Container: includes application-specific information.

Referring to FIG. 24, a platooning management container may be defined in various formats according to the type of the platooning message. As shown in FIG. 24, the fields of the platooning management container may be configured differently depending on a join request, a join response, leave notification, leave response, dissolution notification, dissolution response, merging request, merging response, merging notification, and the like for a platooning group as described above. In addition, the platooning message may optionally include CAM-related information, and for example, the platooning message may further include location information and mobility information as CAM-related information.

Figure 25:
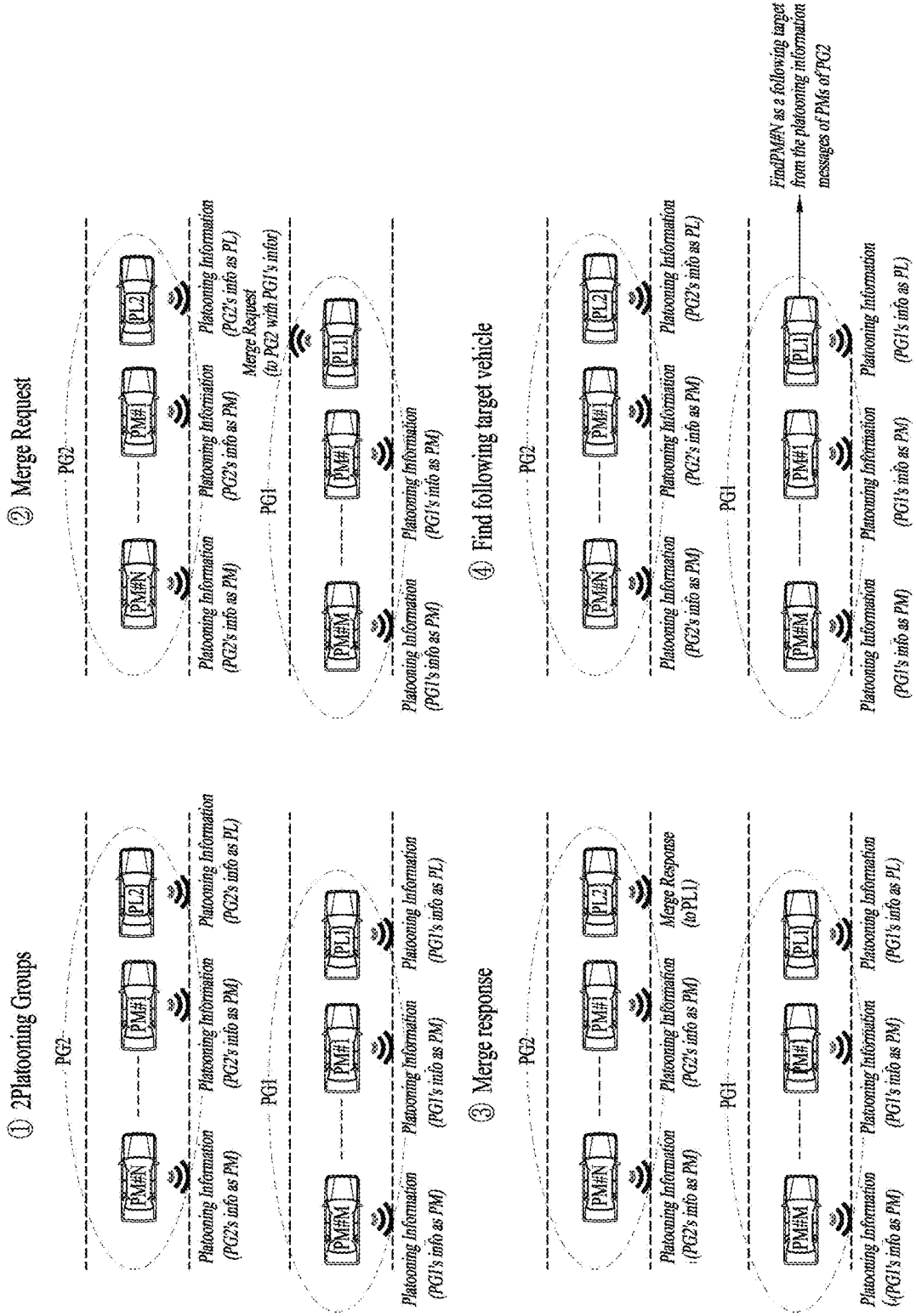

FIG. 25 and FIG. 26 are diagrams for describing a process of merging with another platooning group during platooning.

Referring to FIG. 25, platooning groups of the second PG PG #2 and the first PG PG #1 are illustrated, and the second PL PL #2 that is a group leader of the second PG and the first PG PL #1 that is a group leader of the first PG are illustrated (①). The first PL may receive first platooning information from the second PL, determine whether to merge with the second PG on the basis of the received first platooning information, and when merging with the second PG is required, transmit a merge request message to the second PL (②). The first PL may receive a merge response message, which is a response signal to the merge request message, from the second PL, and the merge response message may include information on acceptance or rejection according to the merge request (③). When the merge response message accepts the merge request, the first PL may determine and search for a vehicle (PM #N) to follow on the basis of the first platooning information (④).

Referring to FIG. 26, the first PL may perform adaptive cruise control (ACC) or cooperative adaptive cruise control (CACC) functions on the basis of the searched and determined vehicle to follow (⑤). When following the second PG by the first PL is completed, the first PG is merged into the second PG based on the second PG (⑥).

Meanwhile, in a platooning group, a PL requires more functions than a PM and needs to have higher performance Even if there is a driver in each vehicle, a PM driver does not need to drive personally if there is an automation function. In this case, when one PG is merged with another PG, the number of PLs is reduced, and thus resources for the role of PLs can be reduced and user convenience can be maximized.

If a PL is no longer able to play the role thereof during platooning (failure, etc.), it is possible to merge with another PG to maintain platooning instead of stopping platooning. When merge is accepted, the first PL PL #1 needs to search for and select one of the second PMs of the second PG to follow. For example, it is possible to search for, select, and follow a second PM located last among the second PMs belonging to the second PG. Here, the first PL may identify or select the second PM located last among the second PMs belonging to the second PG through a platooning information message and/or CAM information broadcast from at least one of the second PMs included in the second PG.

A specific method in which the first PG is merged into the second PG will be described with reference to FIG. 27 to FIG. 29.

FIG. 27, FIG. 28 and FIG. 29 illustrate a method of performing merging between PGs on the basis of mergePosition included in a merge response message.

When merging is performed, the first PG may not be merged after the last vehicle of the second PG. In consideration of this case, the merge response message may be extended to a first extended form (Table 63) or a second extended form (Table 64).

TABLE 63

| | |
|---|---|
| Descriptive Name | PlatooningMessage |
| Identifier | DataType_xxx |
| ASN.1 representation | PlatooningMessage ::= SEQUENCE { <br> VehicleID VehieleID, <br> PlatooningGroupID PlatooningGroupID, <br> PlatooningMessageType PlatooningMessageType, <br> (value=8) <br> Vehicle functions Vehicle functions optional, <br> CAM optional, <br> AllowedmergePosition AllowedmergePosition, <br> ... <br> } |
| Definition | This DF (Data Frame) conveys various messages about platooning. |
| Unit | N/A |

TABLE 64

| | |
|---|---|
| Descriptive Name | PlatooningmergeResponse |
| Identifier | DataType_xxx |
| ASN.1 representation | PlatooningmergeResponse ::= SEQUENCE { <br> MessageName MessageName, <br> VehicleID VehicleID, <br> PlatooningGroupID PlatooningGroupID, <br> AllowedmergePosition AllowedmergePosition, <br> } |
| Definition | This DF (Data Frame) conveys a message responding to a request to merge into the Platooning group. |
| Unit | N/A |

TABLE 65

| | |
|---|---|
| Descriptive Name | AllowedmergePosition |
| Identifier | DataType_xxx |
| ASN.1 representation | AllowedmergePosition ::= SEQUENCE {SIZE(0..1000)} of mergePosition |
| Definition | This DF (Data Frame) indicates zero or more allowed mergePositions. |
| Unit | N/A |

TABLE 66

| | |
|---|---|
| Descriptive Name | mergePosition |
| Identifier | DataType_xxx |
| ASN.1 representation | mergePosition ::= INTEGER(0..1000) |
| Definition | This DE (Data Element) indicates a merging position of the PG. |

In Table 63 to Table 66, mergePosition may have a value of 1, 2, or 3. Here, "1" may indicate merging behind the last vehicle, "2" may indicate merging before a PL, and "3" may indicate merging to the middle of a PG.

The second PL requesting merging may be informed of a plurality of allowable merge positions in the form of a sequence of mergePosition through AllowedmergePosition. The first PL may select a position from AllowedmergePosition, search for and select a vehicle in the second PG corresponding to the selected position, and perform merging.

Specifically, referring to FIG. 27, the first PL may receive a merge response message in which AllowedmergePosition is set to 1 from the second PL. In this case, the first PL may select or determine the last vehicle (PM #N) of the second PG as a vehicle to follow. Referring to FIG. 28, the first PL may receive a merge response message in which AllowedmergePosition is set to 2 from the second PL. In this case, the first PL may select or determine a foremost vehicle (second PL) of the second PG as a vehicle to follow. AllowedmergePosition may be a bitmap having a length corresponding to the number of second PMs included in the second PG and may indicate positions of second PMs that can be followed through the bitmap. For example, when the number of second PMs included in the second PG is 5, the bitmap may indicate the positions of the second PMs that can be followed in the form of 01001 (here, a bit value of 1 indicates the position of a second PM that can be followed).

Alternatively, the first PL may receive a merge response message in which the AllowedmergePosition is set to 3 from the second PL. Referring to FIG. 29, the first PL may select a vehicle (PM #1 of the second PG) located in the middle of the second PG on the basis of the first platooning information and/or CAM received from the second PG and follow the selected vehicle.

Further, mergePosition can indicate a position more specifically. For example, mergePosition may have a value of 0 to N (N: the number of members of PG1), and the definition for each integer is as follows.

"1": merge behind the first vehicle
"2": merge behind the second vehicle
"3 to N": merge behind vehicles located in corresponding order
"0": merge in front of the first vehicle For this mechanism, the first PL needs to know the numeric positions of the second PMs of the second PG. Each second PM of the second PG may include the numeric position thereof in the second PG in a platooning information message and broadcast the same, and the first PL may ascertain the positions of PMs of the second PG on the basis of platooning information of the second PG and ascertain the corresponding numeric position of each PM.

Concatenation Method

Figure 30:
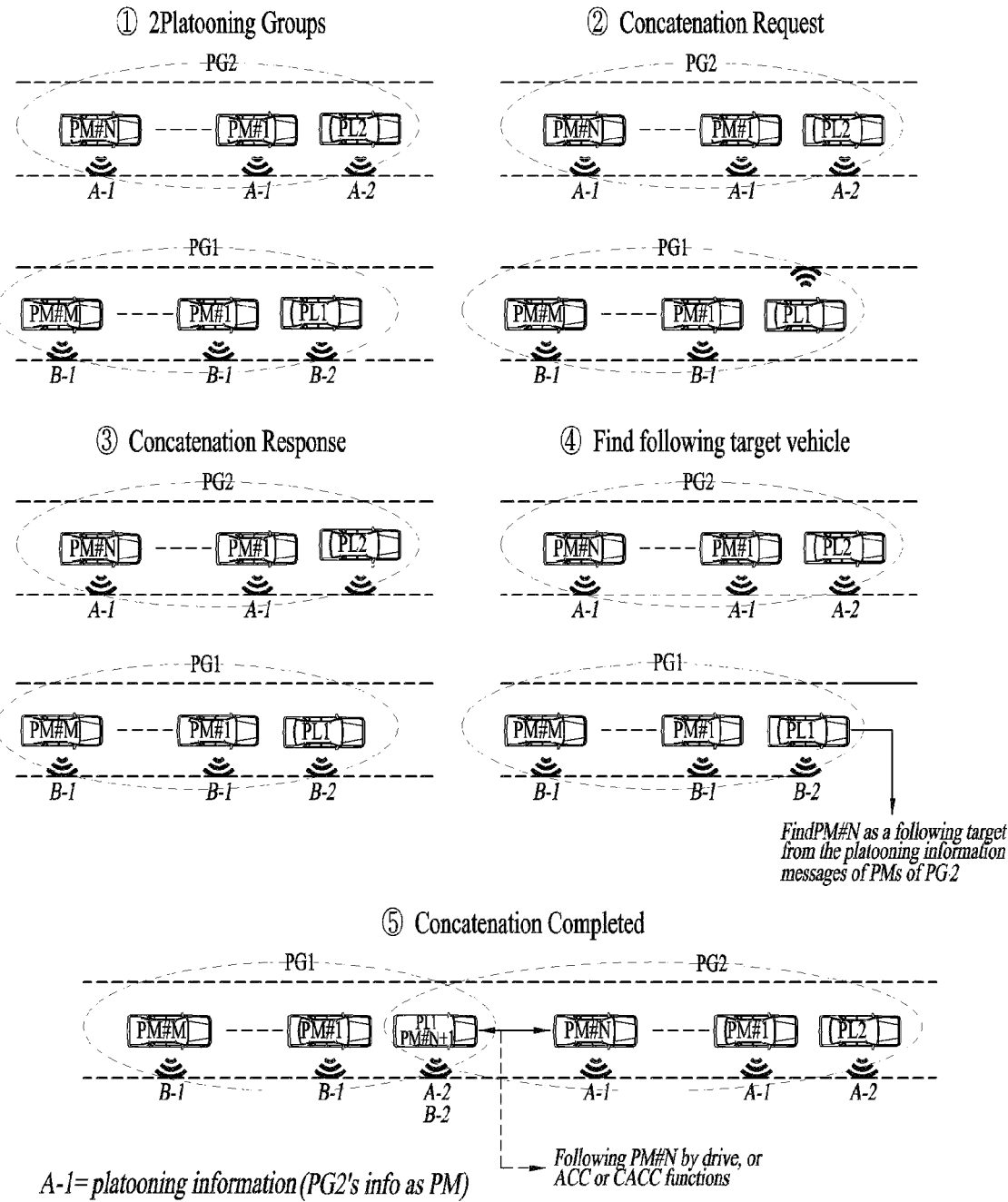
FIG. 30 is a diagram for describing a method of performing concatenation between PGs.

FIG. 30 is a diagram for describing a method of performing concatenation between PGs.

FIG. 30 is a diagram for describing a method of performing concatenation between PGs.

Referring to FIG. 30, the first PG (or PG #1) and the second PG (or PG #2) may be concatenated with each other while maintaining their platooning information to perform platooning.

Concatenation is a platooning method in which the first PL of the first PG joins the second PG, but PMs of the first PG do not belong to the second PG and continuously belong to the first PG. Such platooning may be performed in such a manner that the first PL transmits a concatenation request message to a second PL, which is a leader of the second PG, and receives a concatenation response message that is a response to the concatenation request message.

Specifically, the concatenation request message may be a (1-1)-th concatenation request message defined based on Table 67 or a (1-2)-th concatenation request message defined based on Table 68.

TABLE 67

| | |
|---|---|
| Descriptive Name | PlatooningMessage |
| Identifier | DataType_xxx |
| ASN.1 representation | PlatooningMessage ::= SEQUENCE { <br> VehicleID VehicleID, <br> PlatooningGroupID PlatooningGroupID, <br> PlatooningMessageType PlatooningMessageType, <br> Vehicle (function)s Vehicle (function)s, |

TABLE 67-continued

| | |
|---|---|
| | CAM optional,<br>PlatooningGroupInfo PlatooningGroupInfo,<br>...<br>} |
| Definition | This DF (Data Frame) conveys various messages about platooning. |
| Unit | N/A |
| Descriptive Name<br>Identifier | PlatooningMessageType<br>DataType_xxx |
| ASN.1<br>representation | PlatooningMessageType ::= INTEGER(0..100) |
| Definition | This DE (Data Element) indicates the type of message about platooning. "1" means "request to join the Platooning group", "2" means "response to a request to join the Platooning group", "3" means "notify leaving from the Platooning group", "4" means "confirm the notification of leaving from the Platooning group", "5" means "notify dissolving the Platooning group", "6" means "confirm the notification of dissolving the Platooning group", "7" means "request to merge into the Platooning group", "8" means "response to a request to merge into the Platooning group", "9" means "notify the PG is merged into another PG", "10" means "request to concatenate the Platooning groups" |
| Unit | N/A |

VehicleID is the ID of a (1-1)-th concatenation request message sender, and PlatooningGroupID is the ID of a PG that the sender wants to concatenate. The sender that transmits the (1-1)-th concatenation request message needs to send information on the PG led thereby as "PlatooningGroupInfo".

In the (1-1)-th concatenation request message, PlatooningMessageType may be defined as 10.

TABLE 68

| | |
|---|---|
| Descriptive Name<br>Identifier | PlatooningConcatenationRequest<br>DataType_xxx |
| ASN.1 representation | PlatooningConcatenationRequest ::= SEQUENCE {<br>  MessageName MessageName optional,<br>  VehicleID VehicleID,<br>  PlatooningGroupID PlatooningGroupID,<br>  Vehicle (function) s Vehicle(function)s,<br>  CAM optional,<br>  PlatooningGroupInfo PlatooningGroupInfo,<br>  ...<br>} |
| Definition | This DF (Data Frame) conveys a message requesting to concatenate its Platooning group into another Platooning group |
| Unit | N/A |

In the case of the (1-2)-th concatenation request message according to Table 68, since there are no other messages having the same message format, MessageName may be unnecessary. VehicleID is the ID of a (1-2)-th concatenation request message sender, and PlatooningGroupID is the ID of a PG that the sender wants to concatenate.

The second PL that is a PL in the second PG may receive the (1-1)-th concatenation request message or the (1-2)-th concatenation request message from the first PL that is the PL in the first PG and transmit a concatenation response message on the basis of the received (1-1)-th concatenation request message or the (1-2)-th concatenation request message.

The concatenation response message may be defined as a (1-1)-th concatenation response message defined by Table 69 and Table 70 and a (1-2)-th concatenation response message defined by Table 71.

TABLE 69

| | |
|---|---|
| Descriptive Name<br>Identifier | PlatooningMessage<br>DataType_xxx |
| ASN.1 representation | PlatooningMessage ::= SEQUENCE {<br>  VehicleID VehicleID,<br>  PlatooningGroupID PlatooningGroupID,<br>  PlatooningMessageType PlatooningMessageType,<br>  Vehicle functions Vehicle functions optional,<br>  CAM optional,<br>  PlatooningGroupInfo PlatooningGroupInfo optional,<br>  ...<br>} |
| Definition | This DF (Data Frame) conveys various messages about platooning. |
| Unit | N/A |

TABLE 70

| | |
|---|---|
| Descriptive Name<br>Identifier | PlatooningMessageType<br>DataType_xxx |
| ASN.1 representation | PlatooningMessageType ::= INTEGER(0 . . . 100) |
| Definition | This DE (Data Element) indicates the type of message about platooning. "1" means "request to join the Platooning group", "2" means "response to a request to join the Platooning group", "3" means "notify leaving from the Platooning group", "4" means "confirm the notification of leaving from the Platooning group", "5" means "notify dissolving the Platooning group", "6" means "confirm the notification of dissolving the Platooning group", "7" means "request to merge into the Platooning group", "8" means "response to a request to merge into the Platooning group", "9" means "notify the PG is merged into another PG", "10" means "request to concatenate the Platooning groups", "11" means "response to a request of concatenation" |
| Unit | N/A |

VehicleID in the (1-1)-th concatenation response message is the ID of a concatenation request message sender (or ID of the first PL), and PlatooningGroupID is the ID of a PG that the sender wants to concatenate. Vehicle functions may be unnecessary in the (1-1)-th concatenation response message (or the (1-2)-th concatenation response message). PlatooningMessageType in the (1-1)-th concatenation response message may be defined or configured as 11.

Alternatively, the second PL may use or transmit a (1-2)-th concatenation response message in a newly defined format as shown in Table 71 below.

TABLE 71

| | |
|---|---|
| Descriptive Name<br>Identifier | PlatooningConcatenationResponse<br>DataType_xxx |
| ASN.1 representation | PlatooningConcatenationResponse ::= SEQUENCE {<br>  MessageName MessageName,<br>  VehicleID VehicleID,<br>  PlatooningGroupID PlatooningGroupID,<br>} |
| Definition | This DF (Data Frame) conveys a message responding to a request to concatenation. |
| Unit | N/A |

MessageName in the (1-2)-th concatenation response message may be defined as 7. VehicleID is the ID of a concatenation request message sender, and PlatooningGroupID is the ID of a PG that the sender wants to concatenate.

Meanwhile, the concatenation response message (the (1-1)-th concatenation response message or the (1-2)-th concatenation response message) may be transmitted only when a concatenation request is accepted, or may be transmitted at the time of accepting or rejecting the concatenation request while indicating acceptance/rejection through an additional field.

When the first PG and the second PG are concatenated by exchanging a concatenation request message and a concatenation response message between the first PL and the second PL, the first PL may simultaneously have the status (role) of a PL of the first PG and the status (role) of a PM in the second PG. In this case, a platooning information message of the first PL may be defined as shown in Table 72 and Table 73.

TABLE 72

| | |
|---|---|
| Descriptive Name | PlatooningGroupInfo |
| Identifier | DataType_xxx |
| ASN.1 representation | PlatooningGroupInfo ::= SEQUENCE { PlatooningGroupID PlatooningGroupID, VehicleID VehicleID RoleInPlatooning RoleInPlatooning, PlatooningMemberNumber PlatooningMemberNumber, PlatooningDestination PlatooningDestination, PlatooningRoute PlatooningRoute, . . . } |
| Definition | This DF (Data Frame) informs information about the PG associated with the message sender having the VehicleID. |
| Unit | N/A |

TABLE 73

| | |
|---|---|
| Descriptive Name | RoleInPlatooning |
| Identifier | DataType_xxx |
| ASN.1 representation | RoleInPlatooning::= BIT STRING { PlatooningLeadVehicle (0), PlatooningMemberVehicle (1), . . . } |
| Definition | This DE (Data Element) indicates the role of the message sender in its PG. Each bit shall be set to 1 if the corresponding role is supported. |
| Unit | N/A |

In a platooning group, a PL requires more functions than a PM and needs to have higher performance Even if there is a driver in each vehicle, a PM driver does not need to drive personally if there is an automation function. When the first PG is concatenated with the second PG, the first PL also has an advantage in that the driver thereof need not drive personally by using an automation function such as ACC. In addition, resources used by the PL to manage the PG may increase as the number of PMs increases. If concatenation is used, there is an advantage that such resources are distributed to the first PL and the second PL.

Further, since a platooning group needs to be coordinated by a PL, all PMs need to be present within the physical communication range of the PL. In this case, the number of PMs is greatly limited due to the physical communication range of the PL. However, when concatenation is used, the communication range also increases through concatenation, enabling platooning in a wider range. That is, the load of the first PL is completely transferred to the second PL in the case of merge, whereas some of the load (group management) of the first PL remains in the first PL in the case of concatenation.

For example, if the PL (or the first PL) needs to take a break from driving during platooning and thus wants to merge into another PG instead of stopping platooning, or if the platooning range is too wide to be merged, the first PL may maintain platooning while taking a break by changing a driving mode to ACC or CACC based on concatenation with the second PL.

If concatenation is accepted, the first PL needs to select one of the second PMs of the second PG and follow the same. For example, the first PL may follow the PM located last among the second PMs of the second PG. The first PL may identify or recognize which PM is located last through a platooning information message broadcast by at least one of the second PMs of the second PG and/or information of the CAM.

When concatenation is performed, the first PG may not be concatenated behind the last vehicle of the second PG. For this case, the concatenation response message may be extended based on Table 74 or Table 75.

TABLE 74

| | |
|---|---|
| Descriptive Name | PlatooningMessage |
| Identifier | DataType_xxx |
| ASN.1 representation | PlatooningMessage ::= SEQUENCE { VehicleID VehicleID, PlatooningGroupID PlatooningGroupID, PlatooningMessageType PlatooningMessageType, (value = 8) Vehicle functions Vehicle functions optional, CAM optional, AllowedConcatenationPosition AllowedConcatenationPosition AllowedmergePosition, . . . } |
| Definition | This DF (Data Frame) conveys various messages about platooning. |
| Unit | N/A |

TABLE 75

| | |
|---|---|
| Descriptive Name | PlatooningmergeResponse |
| Identifier | DataType_xxx |
| ASN.1 representation | PlatooningmergeResponse ::= SEQUENCE { MessageName MessageName, VehicleID VehicleID, PlatooningGroupID PlatooningGroupID, AllowedConcatenationPosition AllowedmergePosition, } |
| Definition | This DF (Data Frame) conveys a message responding to a request to merge into the Platooning group. |
| Unit | N/A |

In Table 74 and Table 75, ConcatenationPosition may have a value of 1, 2, or 3. Here, "1" may indicate concatenation behind the last vehicle, "2" may indicate concatenation in front of a PL, and "3" may indicate concatenation in the middle of a PG.

The second PL requesting concatenation may be informed of a plurality of allowed concatenation positions in the form of a sequence of ConcatenationPosition through AllowedConcatenationPosition. The first PL may select a position in AllowedConcatenationPosition, search for and select a vehicle (or a second PM) in the second PG corresponding to the selected position, and perform concatenation.

Alternatively, ConcatenationPosition may indicate a position more specifically. For example, ConcatenationPosition may have a value of 0 to N (N: the number of members of PG1), and the definition for each integer is as follows.

"1": Concatenation behind the first vehicle
"2": Concatenation behind the second vehicle
"3 to N": Concatenation behind vehicles located in corresponding order
"0": Concatenation in front of the first vehicle For this mechanism, the first PL needs to know the numeric positions of the PMs of the second PG. Each second PM of the second PG may include the numeric position thereof in the second PG in a platooning information message and broadcast the same, and the first PL may ascertain the position of each second PM of the second PG on the basis of platooning information of the second PG and ascertain the corresponding numeric position of each second PM.

FIG. 31 is a diagram for describing a method in which the first PL changes from a concatenated state to a merged state.

Referring to FIG. 31, the first PL may change a concatenated state to a merged state according to circumstances.

For example, if the first PL wants to be merged with the second PG but selects concatenation because of the communication range of the second PL, some PMs of the first PG may leave during concatenation. In this case, when the first PL determines that merging into the second PG is possible based on the communication range of the second PL, the first PL may send the above-described second merge request message to the second PL to perform merging with the second PG.

FIG. 32 is a diagram for describing a method in which the first PL is separated from the second PG in a concatenated state.

Referring to FIG. 32, PGs may need to be separated from each other according to circumstances. For example, final destinations of the first PG and the second PG may be different. Upon arrival at an overlapping intermediate point of the first PG and the second PG, the first PL may perform an operation of separating from the second PG. In this case, the first PL may easily separate the first PG from the second PG by sending a notification or a request message related to leaving or separation to the second PL.

Summarizing the above, the following operations and definitions may be considered with respect to platooning.

Platooning Architecture
Platooning state transition model
Joining platooning group
Leaving platooning group
Platooning group dissolution
Merging between platooning groups
Concatenation between platooning groups
Merging between platooning groups while maintaining sub-groups
Merging between platooning groups with group division while maintaining sub-groups Next, a method for forming the first PG and/or the second PG will be described later.

Figure 33:
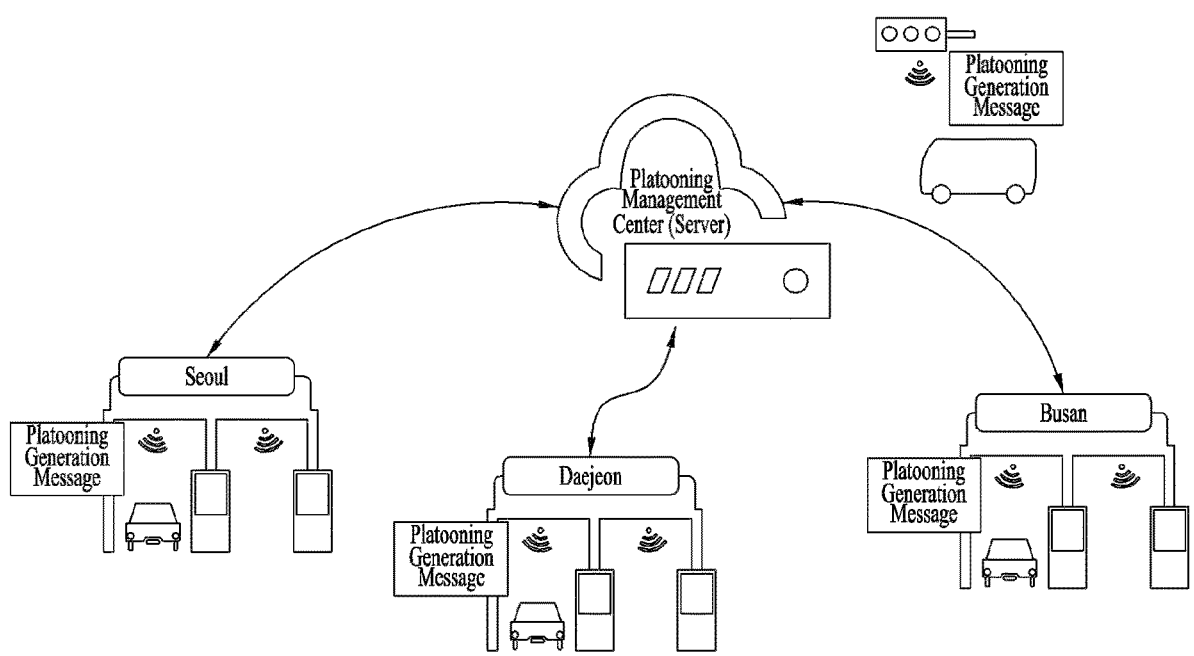
FIG. 33 is a diagram for describing a system for forming a platoon.

FIG. 33 is a diagram for describing a system for forming a platoon.

Platooning technology forms a platooning group in order to reduce fuel consumption, improve driver convenience, and improve traffic efficiency, minimizes a gap between vehicles within the group, and allows the group to be maintained while following a platooning group leader or a proceeding vehicle. In the background technology, a group of vehicles needs to be formed for platooning. Therefore, the platooning group needs to be managed by a platooning lead vehicle, but there is no standard technology for generating and managing such a group. Accordingly, formation of a group of arbitrary vehicles, joining a group, leaving a group, merging between groups, and the like are impossible. Therefore, a method for generating a platooning group and an apparatus supporting the same are proposed according to an embodiment of the present invention.

Referring to FIG. 33, a platooning management center may be a database server that stores and manages information related to platooning (e.g., the ID of each platooning group, movement routes, final destinations, vehicle IDs of PLs, etc.), and a platooning generation message may be a message exchanged for platooning group generation.

Figure 34:
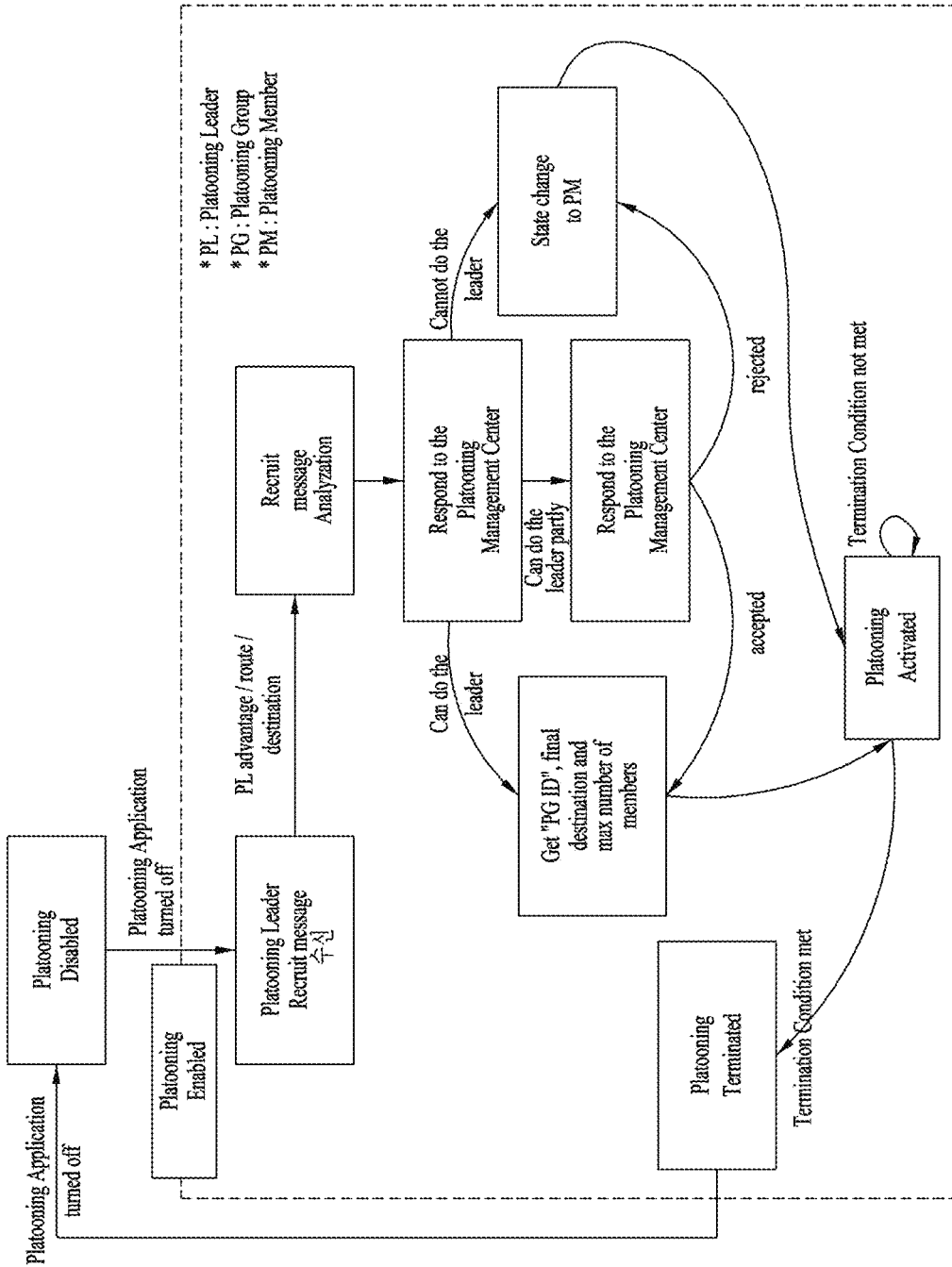
FIG. 34 is a diagram for describing a platoon leader applicant state transition model.

FIG. 34 is a diagram for describing a group leader applicant state transition model.

Referring to FIG. 34, a vehicle may receive a platooning leader recruit message (or recruit message) transmitted from the platooning management center. The vehicle may receive the platooning leader recruit message in a state where platooning is Enabled. The platooning leader recruit message may include information on advantages that can be received at the time of serving as a PL, a platooning route, and platooning final destination information.

Next, the vehicle may analyze the platooning leader recruit message. Specifically, the vehicle may determine whether or not to form a PG as a PL by analyzing a destination, a route, and advantages that can be received when serving as a PL.

Next, the vehicle may transmit a response message for the message to the platooning management center. The vehicle may send a response regarding whether it can serve as a PL according to the route and destination suggested by the platooning management center through the response message. Here, the response message may include information on "yes", "partly yes" or "no", and when it includes information on "partly yes", the response message further includes information on an intermediate point.

Next, when the vehicle transmits the response message including information on rejection of the PL, the vehicle may change a platooning state to a PM. The vehicle may wait for reception of a message related to the platooning group from another vehicle serving as a PL in the PM state.

FIG. 35 is a diagram for describing a packet structure of the group leader recruit message.

For the packet structure for the platooning generation message, two methods, i.e. a platooning dedicated structure and an extension of the existing ITS message, are possible. Here, the existing ITS message may be CAM, DENM, TNM, or the like.

Referring to FIG. 35(a), a platooning message may include fields or information with respect to ITS PDU header (Common header field for all ITS message formats), a platooning generation container (including information required for platooning generation (group creation) of platooning), a platooning management container (including information required for platooning management and the operation of platooning), a location container (describing the location of the vehicle transmitting this message) and an application container (including application-specific information). Alternatively, referring to FIG. 35(b), information related to the platooning message may be included in an extension of the CAM, which is the existing ITS message.

Further, devices (e.g., a toll and a traffic light) associated with the platooning management center may transmit a platooning generation message to recruit a platooning leader serving as a subject of the platooning operation.

Figure 36:
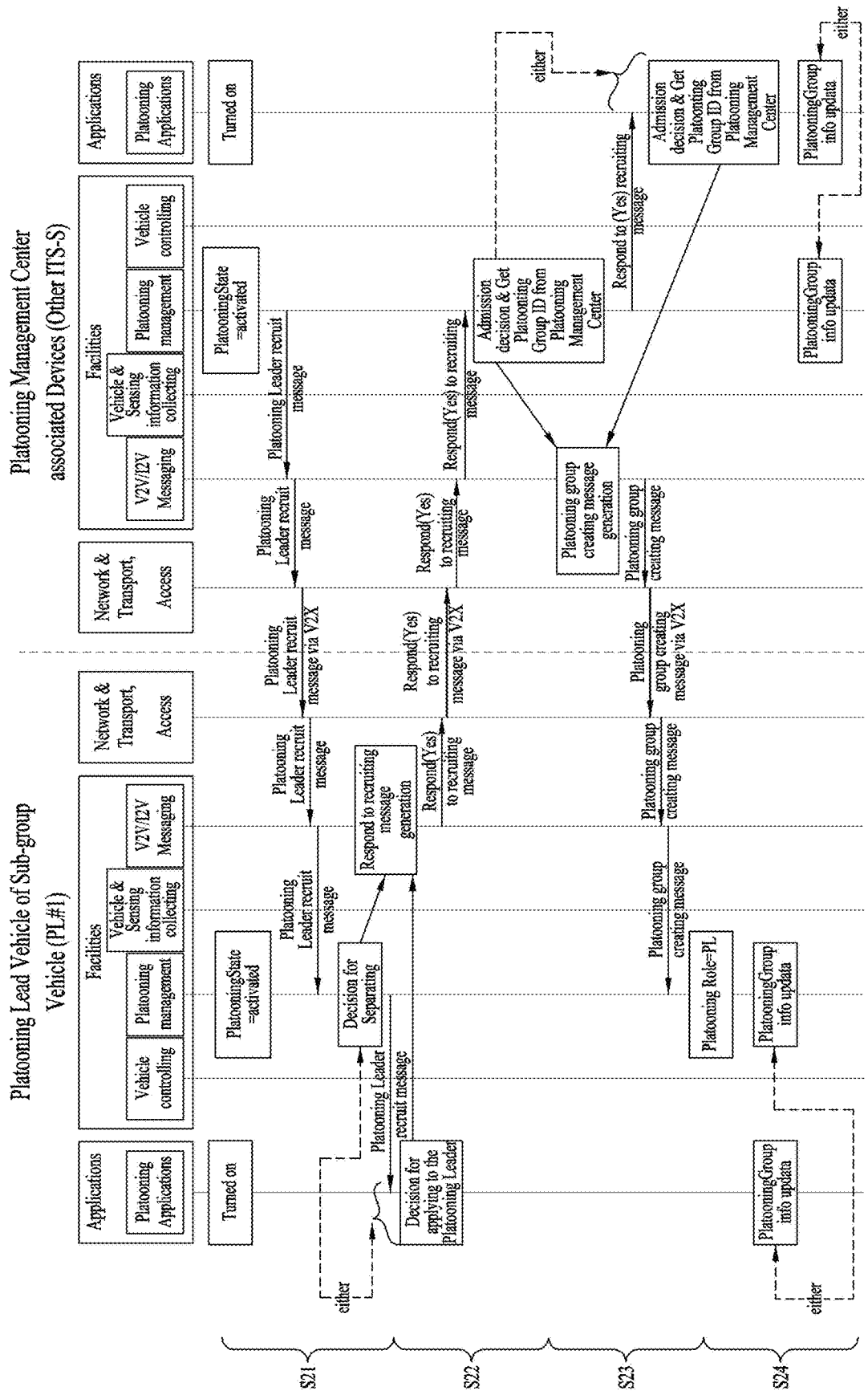
FIG. 36 is a diagram for describing a method in which a vehicle forms a platooning group based on the platoon leader recruitment message.

FIG. 36 is a diagram for describing a method in which a vehicle forms a platooning group on the basis of a platooning leader recruit message.

Referring to FIG. 36, the vehicle may receive a platooning leader recruit message from the platooning management center or ITS devices related to the platooning management center and determine whether to serve as a platooning leader (PL) of a platooning group (PG) on the basis of the received platooning leader recruit message (S21). Upon accepting the role as the PL, the vehicle may transmit a recruit response message including information related to the acceptance (S22).

Next, the vehicle may receive a message for generating a platooning group including an ID related to the PG and information related to a destination of the PG (S23). The vehicle may define platooning information on the platooning group on the basis of the message for generating the platooning group and serve as the PL of the PG (S24).

On the other hand, when the vehicle transmits a recruit response message for rejecting the role as the PL of the PG, the vehicle may switch to a PM state and receive platooning information related to joining the PG from another vehicle serving as the PL.

Alternatively, when the vehicle agrees to serve as the PL of the PG up to a specific intermediate point, the vehicle may receive, from the platooning management center or ITS devices related to the platooning management center, a message for generating a platooning group for rejection or a message for generating a platooning group including information on the specific intermediate point.

Hereinafter, the platooning generation message, the recruit response message, and the message for generating a platooning group will be described in detail.

The platooning generation message for recruiting a platooning leader (PL) may be defined based on Table 76 to Table 82, or may be defined as a new type of message based on Table 83 and Table 84.

TABLE 76

| | |
|---|---|
| ASN.1 representation | PlatooningMessage ::= SEQUENCE { <br> PlatooningMessageType PlatooningMessageType, <br> Expiration TimestampIts, <br> Destination Destination <br> Route Route, <br> AdvantagesOfLeader AdvantagesOfLeader, <br> . . . <br> } |
| Definition | This DF (Data Frame) conveys various types of messages about platooning. |
| Unit | N/A |

TABLE 77

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "51" means "recruit platooning leader(s)". |
| Unit | N/A |

TABLE 78

| | |
|---|---|
| Descriptive Name | TimestampIts |
| Identifier | DataType_xxx |
| ASN.1 representation | TimestampIts ::= INTEGER {utcStartOf2004(0), oneMillisecAfterUTCStartOf2004(1)} (0 . . . 4398046511103) |
| Definition | This DE (Data Element) indicates the expiration time of recruiting the platooning leader(s) messsage. |
| Unit | N/A |

TABLE 79

| | |
|---|---|
| Descriptive Name | Destination |
| Identifier | DataType_xxx |
| ASN.1 representation | Destination: := SEQUENCE { <br> Latitude Latitude, <br> Longitude Longitude, <br> Altitude Altitude <br> } |
| Definition | This DE (Data Element) indicates the reference position of the final destination to lead by the platooning leader. |
| Unit | N/A |

TABLE 80

| | |
|---|---|
| Descriptive Name | Route |
| Identifier | DataType_xxx |
| ASN.1 representation | Route::= SEQUENCE(SIZE(0 . . . 10)) OF Destination |
| Definition | This DE (Data Element) indicates the sequence of reference position(s) to connected to the Destination. |
| Unit | N/A |

TABLE 81

| | |
|---|---|
| Descriptive Name | Advantages OfLeader |
| Identifier | DataType_xxx |
| ASN.1 representation | AdvantagesOfLeader::= SEQUENCE(SIZE(1 . . . 10)) OF Advantage |
| Definition | This DE (Data Element) indicates the sequence of leader's advantage, if any vehicle would be a leader of platooning. |
| Unit | N/A |

TABLE 82

| | |
|---|---|
| Descriptive Name | Advantage |
| Identifier | DataType_xxx |
| ASN.1 representation | Advantage::= UTF8String (SIZE (1 . . . 50)) |
| Definition | This DE (Data Element) describes the advantage for platooning leader to get. |
| Unit | N/A |

TABLE 83

| | |
|---|---|
| Descriptive Name | PlatooningLeaderRecruit |
| Identifier | DataType_xxx |
| ASN.1 representation | PlatooningLeaderRecruit ::= SEQUENCE { <br> MessageName MessageName, <br> Expiration Expiration, <br> Destination Destination <br> Route Route, <br> Advantages OfLeader AdvantagesOfLeader, <br> . . . <br> } |
| Definition | This DF (Data Frame) conveys a message recruiting the platooning group leader(s). |
| Unit | N/A |

TABLE 84

| | |
|---|---|
| Descriptive Name | MessageName |
| Identifier | DataType_xxx |
| ASN.1 representation | MessageName ::= INTEGER(0 . . . 100) |
| Definition | This DE (Data Element) indicates the name of message. |
| Unit | N/A |

Platooning leader candidate vehicles that have received the platooning leader recruit message from devices linked to the platooning management center may determine whether they will serve as a leader on the basis of advantage, route, and destination information included in the platooning leader recruit message and transmit a recruit response message on the basis of determination results.

The recruit response message may be defined as PlatooningMessage in which PlatooningMessageType is defined as a specific value as shown in Table 85 to Table 89, or may be defined as a newly defined PlatooningLeaderResponsetoRecruit message as shown in Table 90 and Table 91.

TABLE 85

| | |
|---|---|
| Descriptive Name | PlatooningMessage |
| Identifier | DataType_xxx |
| ASN.1 representation | PlatooningMessage ::= SEQUENCE { <br> PlatooningMessageType PlatooningMessageType, <br> VehicleID VehicleID, <br> Response ResponseType, <br> PartOfRoutetoLead PartOfRoutetoLead, <br> . . . <br> } |
| Definition | This DF (Data Frame) conveys various types of messages about platooning. |
| Unit | N/A |

TABLE 86

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "52" means "respond to platooning leader recruiting message". |
| Unit | N/A |

TABLE 87

| | |
|---|---|
| Descriptive Name | VehicleID |
| Identifier | DataType_xxx |
| ASN.1 representation | VehicleID ::= BIT STRING (64) or OCTET STRING (8) |
| Definition | This DE (Data Element) identifies the message sender. |
| Unit | N/A |

VehicleID is the ID of a vehicle that transmits the recruit response message and may be a MAC address or a GeoNetworking address.

TABLE 88

| | |
|---|---|
| Descriptive Name | ResponseType |
| Identifier | DataType_xxx |
| ASN.1 representation | ResponseType ::= ENUMERATED {yes(0), partlyYes(1), no(2) . . . } |
| Definition | This DE (Data Element) indicates the response type. |
| Unit | N/A |

When the vehicle transmitting the recruit response message transmits the response type as partially yes(1), the message may further include information on a part of a path that the vehicle will lead.

TABLE 89

| | |
|---|---|
| Descriptive Name | PartOfRoutetoLead |
| Identifier | DataType_xxx |
| ASN.1 representation | PartOfRoutetoLead::= SEQUENCE(SIZE(0 . . . 10)) OF Destination |
| Definition | This DE (Data Element) indicates the sequence of reference position(s) to connected to the Destination. |
| Unit | N/A |

The route shown in this route may be different from the route suggested in the message for recruiting the platooning leader, or it may be a partial route of the first proposed route.

TABLE 90

| | |
|---|---|
| Descriptive Name | PlatooningLeaderResponsetoRecruit |
| Identifier | DataType_xxx |
| ASN.1 representation | PlatooningLeaderResponsetoRecruit::= SEQUENCE { <br> MessageName MessageName, <br> VehicleID VehicleID, <br> Response ResponseType, <br> PartOfRoutetoLead PartOfRoutetoLead, <br> . . . <br> } |
| Definition | This DF (Data Frame) conveys a message responding to recruit the platooning group leader. |
| Unit | N/A |

TABLE 91

| | |
|---|---|
| Descriptive Name | MessageName |
| Identifier | DataType_xxx |
| ASN.1 representation | MessageName ::= INTEGER(0 . . . 100) |
| Definition | This DE (Data Element) indicates the name of message. |
| Unit | N/A |

Next, a creating message related to platooning group creating may be defined as PlatooningMessage in which PlatooningMessageType is defined as a specific value as shown in Table 92 to Table 96, or may be separately defined as a PlatooningGroupCreation message as shown in Table 97 and Table 98.

TABLE 92

| | |
|---|---|
| Descriptive Name | PlatooningMessage |
| Identifier | DataType_xxx |
| ASN.1 representation | PlatooningMessage ::= SEQUENCE { <br> PlatooningMessageType PlatooningMessageType, <br> PlatooningGroupID PlatooningGroupID, <br> LeaderVehicleID VehicleID, <br> Destination Destination, <br> Route Route, <br> . . . <br> } |
| Definition | This DF (Data Frame) conveys various types of messages about platooning. |
| Unit | N/A |

TABLE 93

| | |
|---|---|
| Descriptive Name | PlatooningMessageType |
| Identifier | DataType_xxx |
| ASN.1 representation | PlatooningMessageType ::= INTEGER(0 . . . 100) |
| Definition | This DE (Data Element) indicates the type of message about platooning. "53" means "platooning group creating message". |
| Unit | N/A |

TABLE 94

| | |
|---|---|
| Descriptive Name | PlatooningGroupID |
| Identifier | DataType_xxx |
| ASN.1 representation | PlatooningGroupID ::= INTEGER(0 . . . 1000) or<br>PlatooningGroupID ::= BIT STRING (64) or OCTET STRING (8) |
| Definition | This DE (Data Element) identifies the Platooning Group. |
| Unit | N/A |

TABLE 95

| | |
|---|---|
| Descriptive Name | VehicleID |
| Identifier | DataType_xxx |
| ASN.1 representation | VehicleID ::= BIT STRING (64) or OCTET STRING (8) |
| Definition | This DE (Data Element) identifies the platooning group leader vehicle. |
| Unit | N/A |

VehicleID is the ID of a vehicle that will be a leader of a platooning group and may be a MAC address or a GeoNetworking address.

TABLE 96

| | |
|---|---|
| Descriptive Name | Destination |
| Identifier | DataType_xxx |
| ASN.1 representation | Destination::= SEQUENCE {<br>Latitude Latitude,<br>Longitude Longitude,<br>Altitude Altitude<br>} |
| Definition | This DE (Data Element) indicates the reference position of the final destination to lead by the platooning leader. |
| Unit | N/A |

The route shown in this route may be different from the route suggested in the message for recruiting a platooning leader, or it may be a partial route of the first proposed route.

TABLE 97

| | |
|---|---|
| Descriptive Name | PlatooningGroupCreation |
| Identifier | DataType_xxx |
| ASN.1 representation | PlatooningGroupCreation::= SEQUENCE {<br>MessageName MessageName,<br>PlatooningGroupID PlatooningGroupID,<br>LeaderVehicleID VehicleID,<br>Destination Destination,<br>Route Route,<br>. . .<br>} |
| Definition | This DF (Data Frame) conveys a message creating a platooning group. |
| Unit | N/A |

TABLE 98

| | |
|---|---|
| Descriptive Name | Route |
| Identifier | DataType_xxx |
| ASN.1 representation | Route::= SEQUENCE(SIZE(0 . . . 10)) OF Destination |
| Definition | This DE (Data Element) indicates the sequence of reference position(s) to connected to the Destination. |

According to an embodiment, a first device that controls platooning of a first platooning group may merge the first platooning group with another platooning group while maintaining the first platooning group as a sub-group. Specifically, the first device may receive information on a second platooning group from a second device that controls platooning of the second platooning group. The information on the second platooning group may include information on the number of platooning members (or platooning vehicles) included in the second platooning group, a destination (or movement route) of the second platooning group, identification information of the second device, and ID information of the second platooning group.

The first device may determine whether to merge the second platooning group and the first platooning group on the basis of the information on the second platooning group. For example, when the movement route of the second platooning group matches (or partially overlaps with) the movement route of the first platooning group, the first device may determine merging with the second platooning group. Alternatively, the first device may determine merging with the second platooning group when the destination or an intermediate point of the first platooning group matches the destination or an intermediate point of the second platooning group.

The first device may transmit a merge request message for merging to the second device upon determining merging with the second platooning group. In other words, the first device may transmit a merge request message for merging with the second platooning group on the basis of the information on the second platooning group. The first device may receive, from the second device, a response message (or a merge response message) for approval or partial approval for merging with the second platooning group. The first device may update group information of platooning according to merging of the first platooning group and the second platooning group on the basis of the received response message. Since the first device is merged into the second platooning group while maintaining the group information of the first platooning group, which is the platooning group thereof, the group information of the first platooning group may be configured as sub-group information of the merged platooning group. That is, the first device may update platooning information for platooning such that the platooning information includes first platooning information on the previous first platooning group, which is sub-group information, and second platooning information on the merged first and second platooning groups.

Alternatively, the first device may determine whether to update, as sub-group information, the first platooning information on the first platooning group, which is the previous platooning group, in platooning information for platooning after merging on the basis of a degree of matching between the movement route of the first platooning group and the movement route of the second platooning group. For example, when the routes of the second platooning group and the first platooning group partially match (or the routes match up to a specific intermediate point), the first device may configure the first platooning information on the first platooning group that is the previous platooning group as the platooning information for the platooning group after merging as sub-group information. On the other hand, when the routes of the second platooning group and the first platooning group completely match, the first device does not maintain the first platooning information on the first platooning group (that is, does not configure sub-group information) and may configure only the platooning information for the merged platooning group. In this case, the platooning information may include only platooning information on the merged first and second platooning groups.

Alternatively, the first device may set different platooning levels for the first platooning information and the second platooning information to maintain the first platooning information that is reference platooning information as sub-group information. For example, the first device may include the first platooning information and the second platooning information in which different platooning levels are set in the platooning information for the merged platooning group and may be controlled by the second device for platooning or may control platooning members included in the first platooning group on the basis of the platooning levels. Here, the first device may set a higher platooning level for the first platooning information than the platooning level set for the second platooning information. For example, a platooning level of "0" may be set for the second platooning information, and a platooning level of "1" may be set for the first platooning information.

Alternatively, the first device may notify the platooning members included in the first platooning group of merging and/or change of a leader device that controls current platooning (or change of devices controlling platooning from the first device to the second device) using the platooning levels set in the first platooning information and the second platooning information. For example, the first device may transmit platooning information including platooning information in which a first platooning level is set and platooning information in which a second platooning information different from the first platooning information is set to the platooning members included in the first platooning group, and the platooning members may recognize that the first platooning group has been merged into the second platooning group as a sub-group of the second platooning group on the basis of the different platooning levels.

Alternatively, the platooning members of the first platooning group may recognize change of a platooning leader on the basis of information on the platooning leader included in platooning information corresponding to a specific platooning level (e.g., platooning level=0), previously configured on the basis of the platooning levels. Alternatively, the first device may transmit a separate merge notification message for notification of merging of the first platooning group into the second platooning group and change of the platooning leader to the second device.

Alternatively, the first device may transmit the merge request message using a platooning message set to a predefined PlatooningMessageType as described above.

Alternatively, the first device may determine which platooning member to follow from among the platooning members included in the second platooning group on the basis of the received merge response message. For example, the first device may determine a platooning member to follow from among the platooning members belonging to the second platooning group on the basis of a value set in mergePosition defined in the merge response message. As described above, when the mergePosition has a value of 1, the first device may determine the last platooning member (based on the moving direction) among the platooning members belonging to the second platooning group as a target to follow. A value for the mergePosition may be determined on the basis of a port number of a DMRS included in the merge response message. For example, if the port number of the DMRS included in the merge response message is an odd number, the first device may be instructed to follow the last platooning member of the second platooning group, and if the port number of the DMRS included in the merge response message is an even number, the first device may be instructed to follow the first platooning member (or the second device that is the platooning leader). Alternatively, the merge response message may include information on a sub-ID for the first platooning group that is the sub-platooning group, and if the sub-ID is an odd number, the first device may be instructed to follow the last platooning member, and if the sub-ID is an even number, the first device may be instructed to follow the first platooning member.

Alternatively, when a plurality of values are set in the mergePosition, the first device may determine a platooning member to follow from among platooning members belonging to the second platooning group on the basis of a communication range of the second device.

Further, when preset separation conditions are satisfied, the first device may transmit a separation request message to the second device to separate the first platooning group from the second platooning group. Specifically, in a case where a movement route related to the second platooning group does not match a movement route related to the first platooning group, in a case where the first platooning group deviates from the communication range of the second device, in a case where the second device executes a platooning function that is not supported by the first device, and in a case where the second device travels at a speed that is out of a threshold speed set in the first platooning group, the first device may perform a process of separating the first platooning group from the second platooning group. For example, the first device may perform a process of separating the first platooning group from the second platooning group at a point where matching movement routes of the second platooning group and the first platooning group ends. Here, the process for separation from the second platooning group may be performed by the first device transmitting the above-described separation request message for platooning group separation to the second device and receiving the separation response message.

Alternatively, when the first device is separated from the second platooning group through the separation process, the first device may change the platooning level for the first platooning information and transmit information on the changed platooning level to the platooning members included in the first platooning group to notify the platooning members of separation from the second platooning group. For example, the first device may notify the platooning members included in the first platooning group that the first platooning group has been merged into the second platooning group as a sub-platooning group of the second platooning group by setting the platooning level for the first platooning information to 1 and transmitting the first platooning information in which the platooning level of 1 is set, and may notify the platooning members included in the first platooning group that the first platooning group has been separated from the second platooning group to become an independent platooning group by setting the platooning level for the first platooning information to 0 and transmitting the first platooning information in which the platooning level of 0 is set.

Further, the merge request message may use the packet structure of the platooning message as described above. That is, the merge request message may include an ITS PDU header, a platooning management field, a location field, and an application field, and information related to the merge request may be included in the platooning management field.

Further, the merge request message may be transmitted through an extension field of a cooperative awareness message (CAM) or a decentralized environmental notification message (DENM).

Meanwhile, the first device may serve as a platooning leader that commands or controls platooning of the first platooning group by a decision to serve as the leader of the first platooning group on the basis of a platooning leader recruit message of the platooning management center.

Further, from the point of view of the platooning members included in the first platooning group, a third device that is a platooning member may perform platooning under the control of the first device. The third device may periodically transmit platooning information on the first platooning group. The third device may receive a merge notification message for notification of merging from the first device to a second platooning group that is another platooning group. In this case, the third device may update platooning information on the merged platooning group on the basis of the merge notification message and periodically transmit the updated platooning information. The updated platooning information may include first platooning information on the previous first platooning group, which is sub-group information, and second platooning information on the merged first and second platooning groups, and a different platooning level from that for the second platooning group may be set for the first platooning information.

Communication System Example to which the Present Invention is Applied

Although not limited thereto, various descriptions, functions, procedures, proposals, methods, and/or operational flow charts of the present invention disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 37:
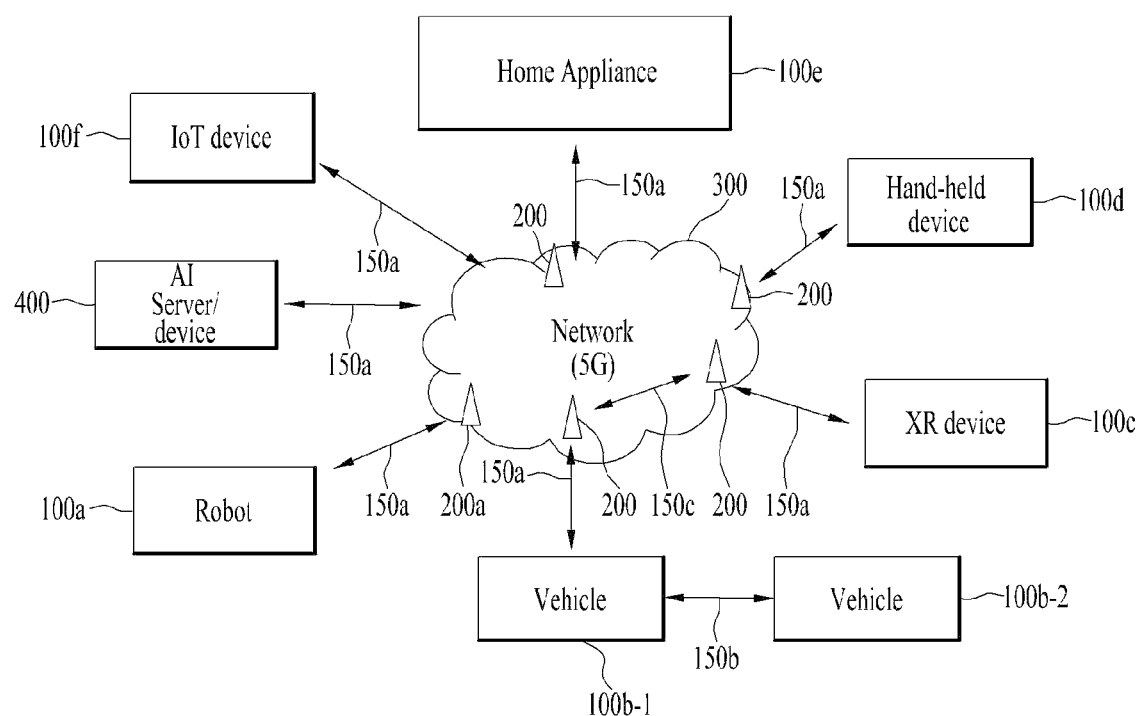
FIG. 37 illustrates a communication system applied to the present invention.

FIG. 37 illustrates a communication system applied to the present invention.

Referring to FIG. 37, a communication system 1 applied to the present invention includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present invention.

Examples of Wireless Devices to which the Present Invention is Applied

Figure 38:
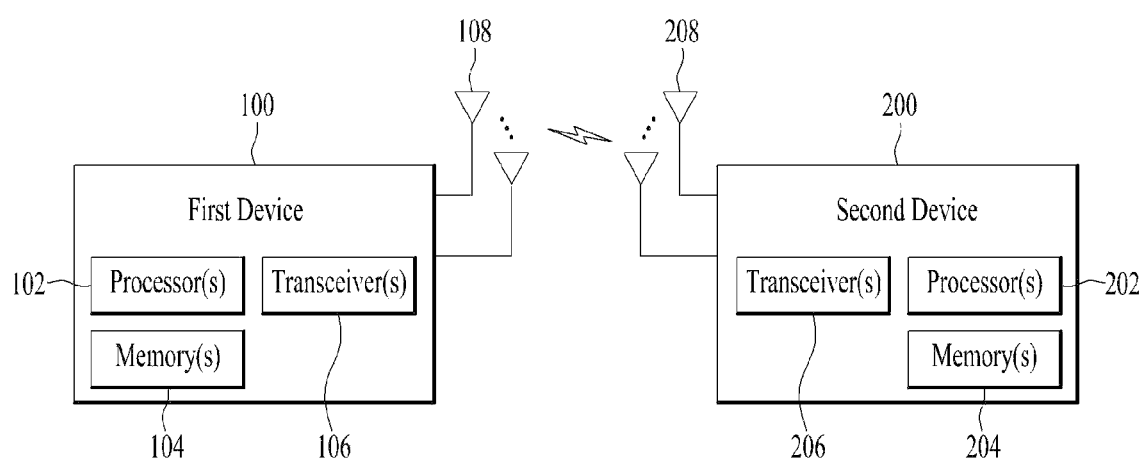
FIG. 38 illustrates wireless devices applicable to the present invention.

FIG. 38 illustrates a wireless device applicable to the present invention.

Referring to FIG. 38, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 37.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s)

104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present invention, the wireless device may represent a communication modem/circuit/chip Specifically, the UE may include a processor 102 and a memory 104 coupled to the RF transceiver. The memory 104 may include at least one program capable of performing operations related to the embodiments described with reference to FIGS. 10 to 36.

The processor 102 may control the RF transceiver to receive information on a second platooning group controlled by a second device from the second device, transmit a merge request message for merging with the second platooning group on the basis of information on the second platooning group, update platooning information on platooning on the basis of merging of the first platooning group and the second platooning group, and update the updated platooning information such that it includes first platooning information on the previous platooning group, which is sub-group information, and second platooning information on the merged first and second platooning groups. The processor 102 may control platooning for the first platooning group according to the embodiments of controlling platooning of the first platooning group described with reference to FIGS. 10 to 36 on the basis of the program stored in the memory 104.

Further, a chipset including the processor 102 and the memory 104 may be configured. In this case, the chipset may include at least one processor and at least one memory operably connected to the at least one processor and, when executed, may cause the at least one processor to perform an operation, wherein the operation includes receiving information on a second platooning group controlled by a second device from the second device, transmitting a merge request message for merging with the second platooning group on the basis of the information on the second platooning group, and updating platooning information on platooning on the basis of merging of the first platooning group and the second platooning group, wherein the updated platooning information may include first platooning formation on the previous first platooning group, which is sub-group information, and second platooning information on the merged first and second platooning groups. The processor 102 may control platooning for the first platooning group according to the embodiments of controlling the platooning of the first platooning group described with reference to FIGS. 10 to 36 on the basis of the program stored in the memory 104.

Further, a computer-readable storage medium including at least one computer program causing the at least one processor to perform an operation is provided, wherein the operation includes receiving information on a second platooning group controlled by a second device from the second device, transmitting a merge request message for merging with the second platooning group on the basis of the information on the second platooning group, and updating platooning information on platooning on the basis of merging of the first platooning group and the second platooning group, wherein the updated platooning information may include first platooning information on the previous first platooning group, which is sub-group information, and second platooning information on the merged first and second platooning groups. The operation may control platooning for the first platooning group according to the embodiments of controlling the platooning of the first platooning group described with reference to FIGS. 10 to 36 on the basis of the program stored in the memory 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Invention is Applied

Figure 39:
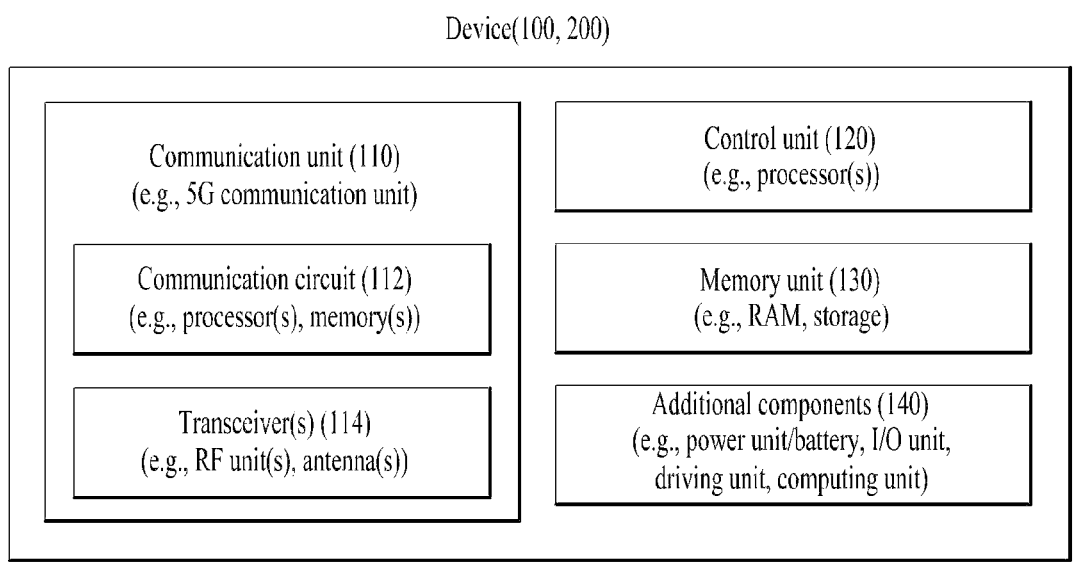
FIG. 39 illustrates another example of a wireless device to which the present invention is applied.

FIG. 39 illustrates another example of a wireless device applied to the present invention. The wireless device may be implemented in various forms according to a use-case/service (refer to FIG. 37)

Referring to FIG. 39, wireless devices 100 and 200 may correspond to the wireless devices 100 and 200 of FIG. 38 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 38. For example, the transceiver(s) 114 may include the one or more transceivers 106 and 206 and/or the one or more antennas 108 and 208 of FIG. 38. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 37), the vehicles (100b-1 and 100b-2 of FIG. 37), the XR device (100c of FIG. 37), the hand-held device (100d of FIG. 37), the home appliance (100e of FIG. 37), the IoT device (100f of FIG. 37), a digital broadcast terminal, a hologram device, a public safety device, an MTC device, a medicine device, a fintech device (or a finance device), a security device, a climate/environment device, the AI server/ device (400 of FIG. 37), the BSs (200 of FIG. 37), a network node, etc. The wireless device may be used in a mobile or fixed place according to a use-example/service.

In FIG. 39, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 40:
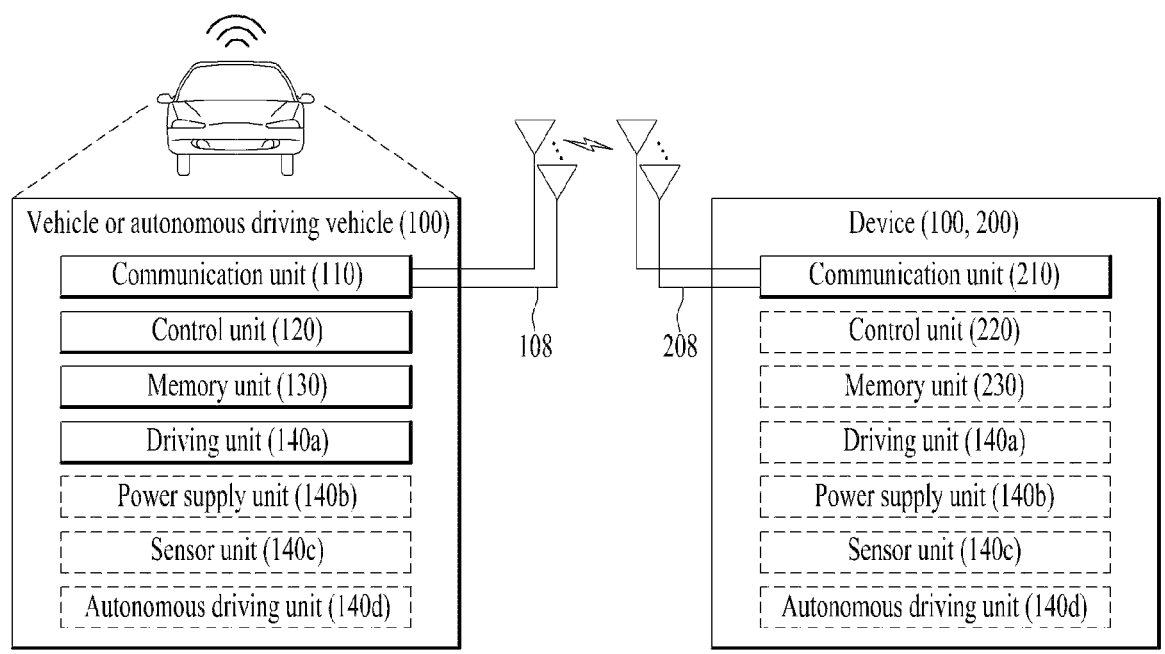
FIG. 40 illustrates a vehicle or an autonomous driving vehicle applied to the present invention.

Examples of Vehicles or Autonomous Vehicles to which the Present Invention is Applied FIG. 40 illustrates a vehicle or an autonomous driving vehicle applied to the present invention. The vehicle or autonomous driving vehicle may be implemented by a mobile robot, a car, a train, a manned/unmanned Aerial Vehicle (AV), a ship, etc.

Referring to FIG. 40, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 39, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present invention are combined in a predetermined form. Each component or feature should be considered optional unless explicitly stated otherwise. Each component or feature may be implemented in a form that is not combined with other components or features. In addition, it is also possible to constitute an embodiment of the present invention by combining some components and/or features. The order of operations described in the embodiments of the present invention may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present invention have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

What is claimed is:

1. A method for controlling, by a first device, platooning of a first platooning group in a wireless communication system, the method comprising:

receiving first information on a second platooning group controlled by a second device from the second device;

transmitting a merge request message for merging with the second platooning group based on partial or all of a match between a second path of the second platooning group included in the first information and a first path of the first platooning group;

transmitting, to devices included in the first platooning group, platooning information for a merged platooning group in which the first platooning group and the second platooning group are merged ; and receiving a response message including a bitmap including a number of bits corresponding to the number of devices belonging to the second platooning group from the second device; and determining a target device to follow among the devices belonging to the second platooning group based on a position of a specific bit having a value of 1 in the bitmap, wherein, based on the first path partially matching the second path, the platooning information further includes first platooning information for the first platooning group as sub-platooning information.

2. The method of claim 1, wherein a platooning level different from a platooning level of the merged platooning information is set in the first platooning information.

3. The method of claim 2, wherein the first device separates the first platooning group from the second platooning group by sending a separation request message to the second device when preset separation conditions are satisfied.

4. The method of claim 3, wherein the first device notifies platooning members included in the first platooning group of separation from the second platooning by changing the platooning level of the first platooning information.

5. The method of claim 3, wherein the preset separation conditions include at least one of a case where the second path related to the second platooning group does not match the first path related to the first platooning group, a case where the first platooning group deviates from a communication range of the second device, a case where the second device executes a platooning function that is not supported by the first device, or a case where the second device travels at a speed out of a threshold speed set in the first platooning group.

6. The method of claim 1, wherein the merge request message is transmitted using a platooning message set to a predefined Platooning Message Type.

7. The method of claim 1, wherein the merge request message is transmitted through a platooning message including an ITS PDU (Intelligent Transportation System protocol data unit) header, a platooning management field, a location field, and an application field.

8. The method of claim 1, wherein the merge request message is transmitted through an extension field of CAM (Cooperative Awareness Messages) or DENM (Decentralized Environmental Notification Message).

9. The method of claim 1, wherein the first device is determined to serve as a leader of the first platooning group on the basis of a platooning leader recruit message from a platooning management center.

10. A first device controlling platooning of a first platooning group in a wireless communication system, the first device comprising:

a radio frequency (RF) transceiver; and
a processor connected to the RF transceiver,
wherein the processor is configured to control the RF transceiver to receive first information on a second platooning group controlled by a second device from the second device, to transmit a merge request message for merging with the second platooning group based on partial or all of a match between a second path of the second platooning group included in the first information and a first path of the first platooning group, to transmit, to devices included in the first platooning group, platooning information for a merged platooning group in which the first platooning group and the second platooning group are merged , to receive a response message including a bitmap including a number of bits corresponding to the number of devices belonging to the second platooning group from the second device, and to determine a target device to follow among the devices belonging to the second platooning group based on a position of a specific bit having a value of 1 in the bitmap,
wherein based on the first path partially matching the second path, the platooning information further includes first platooning information for the first platooning group as sub-platooning information.

* * * * *